US012160911B2

(12) United States Patent
Li et al.

(10) Patent No.: US 12,160,911 B2
(45) Date of Patent: Dec. 3, 2024

(54) METHODS FOR A MULTI-HOP RELAY IN 5G NETWORK

(71) Applicant: InterDigital Patent Holdings, Inc., Wilmington, DE (US)

(72) Inventors: Hongkun Li, Malvern, PA (US); Michael F. Starsinic, Newtown, PA (US); Quang Ly, North Wales, PA (US); Jiwan L. Ninglekhu, Royersford, PA (US); Catalina Mihaela Mladin, Hatboro, PA (US); Pascal M. Adjakple, Great Neck, NY (US); Lakshmi R. Iyer, King of Prussia, PA (US); Joseph M. Murray, Schwenksville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 442 days.

(21) Appl. No.: 17/607,229

(22) PCT Filed: May 1, 2020

(86) PCT No.: PCT/US2020/031019
§ 371 (c)(1),
(2) Date: Oct. 28, 2021

(87) PCT Pub. No.: WO2020/223629
PCT Pub. Date: Nov. 5, 2020

(65) Prior Publication Data
US 2022/0225448 A1      Jul. 14, 2022

Related U.S. Application Data

(60) Provisional application No. 62/841,455, filed on May 1, 2019.

(51) Int. Cl.
*H04W 76/14*     (2018.01)
*H04W 8/00*      (2009.01)
(Continued)

(52) U.S. Cl.
CPC .......... *H04W 76/14* (2018.02); *H04W 8/005* (2013.01); *H04W 60/04* (2013.01); *H04W 68/005* (2013.01); *H04W 92/18* (2013.01)

(58) Field of Classification Search
None
See application file for complete search history.

(56) References Cited

U.S. PATENT DOCUMENTS

2012/0322449 A1*  12/2012  Shimizu ............ H04W 36/0007
                                                    455/436
2017/0055149 A1*   2/2017  Lehtovirta ........ H04W 12/0431
(Continued)

FOREIGN PATENT DOCUMENTS

WO       2016/073984 A2     5/2016
WO       2018/129543 A1     7/2018

OTHER PUBLICATIONS

Philips International B V: "Further discussion slides about multi-hop", 3GPP Draft; S1-191109 FS REFEC Further Discussion Slides Multi-Hop, 3RD Generation Partnership Project (3GPP), Mobile Competence Centre ; 650, Route Des Lucioles ; F-06921 Sophia-Antipolis Cedex ; FRA vol. SA WG1, No. Suzhou, China;May 6, 2019-May 10, 2019 Apr. 26, 2019 (Apr. 26, 2019), XP051719054.

*Primary Examiner* — Anh Ngoc M Nguyen
(74) *Attorney, Agent, or Firm* — Flaster Greenberg P.C.

(57) ABSTRACT

A method of multi-hop relay chain formation in a wireless communication network includes discovering, via a remote electronic device, one or more other electronic devices in communication range of the remote electronic device; selecting one of the discovered electronic devices as an relay electronic device for communicating in the multi-hop relay chain; after selecting the relay electronic device, transmitting, via the remote electronic device, a request to establish a PC5 link; and establishing the PC5 link with the remote (Continued)

electronic device to join or form the multi-hop relay chain within the wireless communication network.

20 Claims, 27 Drawing Sheets

(51) Int. Cl.
 *H04W 60/04* (2009.01)
 *H04W 68/00* (2009.01)
 *H04W 92/18* (2009.01)

(56) References Cited

U.S. PATENT DOCUMENTS

| | | | |
|---|---|---|---|
| 2018/0020442 A1* | 1/2018 | Nair | H04W 72/20 |
| 2019/0349951 A1* | 11/2019 | Ahmad | H04W 76/14 |
| 2020/0059292 A1* | 2/2020 | Kim | H04W 74/08 |
| 2021/0195666 A1* | 6/2021 | Luo | H04W 88/04 |
| 2021/0297842 A1* | 9/2021 | Shrivastava | H04W 28/24 |

* cited by examiner

Non-Roaming 5G System Architecture in reference point representation

METHODS FOR A MULTI-HOP RELAY IN 5G NETWORK

CROSS-REFERENCE TO RELATED APPLICATIONS

This application is the National Stage Application of International Patent Application No. PCT/US2020/031019, filed May 1, 2020 which claims the benefit of U.S. Provisional Application No. 62/841,455, filed on May 1, 2019, the entire contents of which are incorporated by reference herein.

FIELD

The present disclosure relates generally to wireless communications, and more particularly to wireless communications systems, devices, methods, and computer readable medium with a multi-hop relay in a 5G network.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

There are currently architectures and mechanisms for relaying and incorporating multi-hop relays into 5G intended to help to improve the energy efficiency and the coverage of the 5G system. However, many issues related to multi-hop relay exist for 5G. For example, current methods do not address how to form a multi-hop relay chain and to what degree the network manages, or controls, the multi-hop relay chain formation, especially when some of the UEs in the chain can be out of coverage. Additionally, regarding multi-hope relay chain maintenance, there are no solutions on how to switch the affected UEs to a new or an existing relay chain, and whether and how the relay UE is given a certain degree of freedom to manage the relay chain in a distributed manner with multi-hop relay chain formation and multi-hop relay chain maintenance. Accordingly, new methods are desired to address these issues.

SUMMARY

An exemplary embodiment of the present disclosure provides a method of multi-hop relay chain formation in a wireless communication network includes discovering, via a remote user equipment (UE), one or more other UEs in communication range of the remote UE; selecting one of the discovered UEs as an intermediate UE for communicating in the multi-hop relay chain; after selecting the intermediate UE, transmitting, via the remote UE, a request to establish a PC5 link; and establishing the PC5 link with the remote UE to join or form the multi-hop relay chain within the wireless communication network.

An exemplary embodiment of the present disclosure provides a method for registering a user equipment (UE) to enable a multi-hop relay service in a wireless communication network includes transmitting a registration request message to the wireless communication network directly or via an intermediate UE, the registration request message requesting that the network enable the multi-hop relay service; providing an indication to the network of a role that the UE requests to perform in the multi-hop relay service, the role being one of a remote UE and an intermediate UE; in a condition that the role for the UE is to be the remote UE, transmitting from the UE a first set of predetermined information regarding remote UE characteristics; and in a condition that the role for the UE is to be the intermediate UE, transmitting from the UE a second set of predetermined information regarding intermediate UE characteristics.

An exemplary embodiment of the present disclosure provides a method of maintaining a multi-hop relay chain in a wireless communication network includes reorganizing the multi-hop relay chain by an intermediate user equipment (UE), the reorganizing including sending a PC5 link establishment message to include at least another intermediate UE in the multi-hop relay chain; and relaying information from a remote UE to a network via the at least another intermediate UE.

A method of maintaining a multi-hop relay chain in a wireless communication network includes selecting an alternative user equipment (UE) to replace an existing intermediate UE in providing communications from a remote UE to the wireless communication network via the multi-hop relay chain, the selecting including selecting from remaining UEs in the multi-hop relay chain or UEs that are outside of the multi-hop relay chain, wherein the selecting includes selecting by at least one of a core network entity, a base station, and the remaining UEs.

A method of registration management and connection management in a wireless communication network includes in response to a registration request for a new multi-hop relay chain formation or for joining an existing multi-hop relay chain, updating connection management and registration management parameters at a core network asset; sending a configuration update to an intermediate user equipment (UE); storing, by the intermediate UE, connection management and registration management parameters; and sending, from the intermediate UE, the connection management and registration management parameters to other UEs in the new or existing multi-hop relay chain.

A method to assist a remote UE, which is more remote than the UE with respect to a signal coverage range of a wireless communication network, to have access to a relay service provided by the wireless communication network. The method includes: receiving a PC5-link-establishment request message from the remote user equipment, determining whether there is a relay chain association for the remote UE including by determining whether to accept the remote UE to join a relay chain or determining whether to take on the role of a relay UE for the requesting remote UE. The method includes transmitting, to the remote UE, a PC5-link-establishment response message based upon the relay chain association determination.

A method including communicating with a relay UE to assist a remote UE, to have access to a relay service that enables access to other services provided by the wireless communication network. The method further includes receiving a registration request message with information that originated from a PC5-link-establishment request message transmitted by the remote UE, the registration request message including remote UE new chain information for a request to establish a new relay chain for use by the remote UE, and remote UE registration information to request to register the remote UE with the wireless communication network. The method further includes processing a registration procedure for the remote UE based on the remote UE registration information, and processing a new relay chain formation procedure for the remote UE based on the remote UE new chain information, including obtaining a relay chain configuration including information identifying a role for the UE and the remote UE, and obtaining service application information for the new relay chain. The method further includes transmitting the relay chain configuration information, to the UE, including an accepted role for the UE and the remote UE including a multi-hop relay policy obtained via a non-access stratum (NAS) connection.

A method for a remote UE to gain access to a relay service provided by the wireless communication network. The method includes: discovering one or more potential relay UEs capable of providing access to a relay chain service, selecting one of the one or more potential relay UEs as a target relay UE, transmitting a join-relay-chain request message to the target relay UE, and receiving a join-relay-chain response from the target relay UE that originates from wireless communication network via a non-access stratum (NAS) connection This Summary is provided to introduce a selection of embodiments described herein in a simplified form that are further described below in the Detailed Description along with other embodiments. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

The term "UE" can be interchanged in this specification with the broader term "electronic device" and vice versa.

BRIEF DESCRIPTION OF THE DRAWINGS

The scope of the present disclosure is best understood from the following detailed description of exemplary embodiments when read in conjunction with the accompanying drawings, wherein.

Figure 1A:
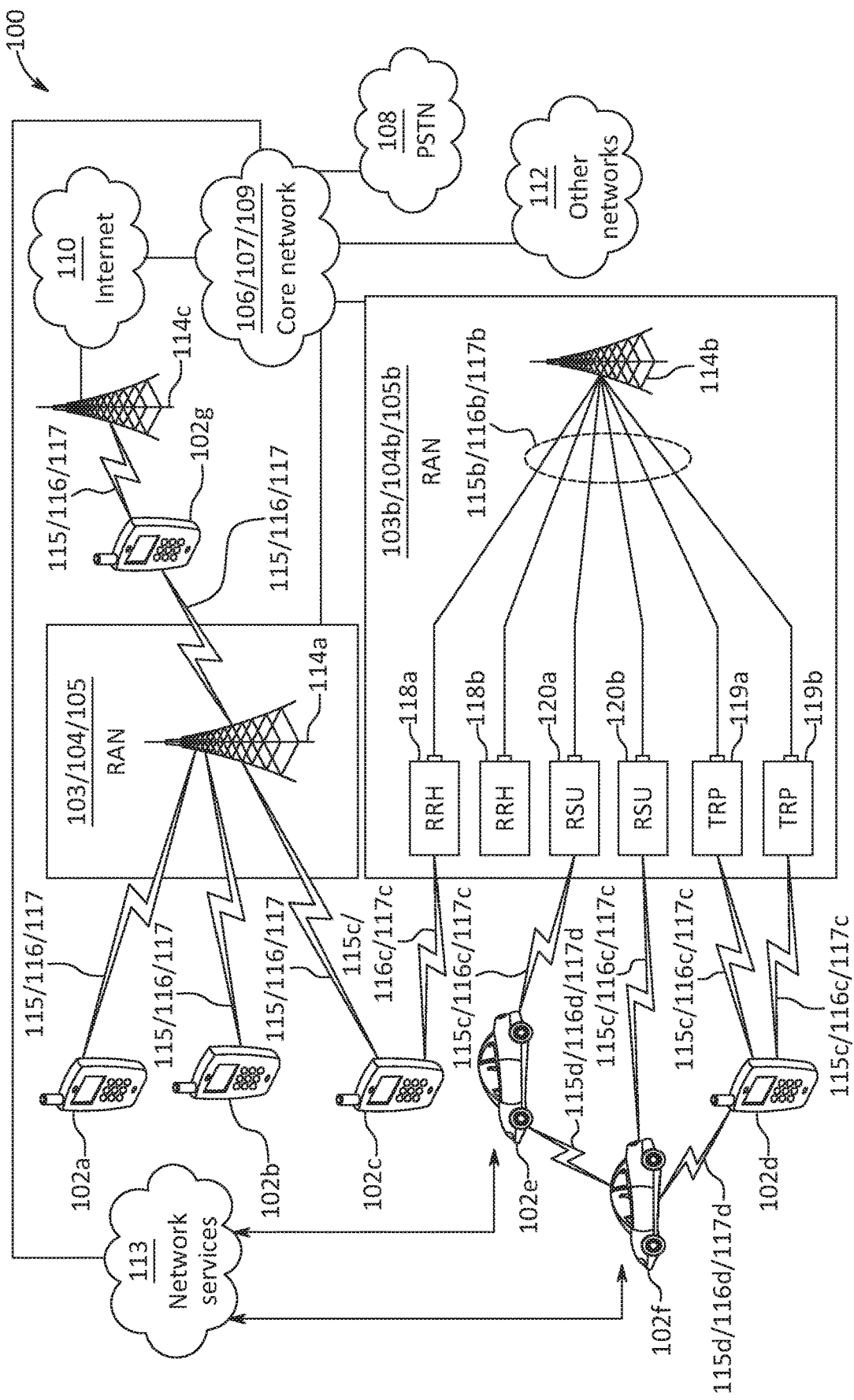
FIG. 1A is a system diagram that illustrates an example 3rd Generation Partnership Project (3GPP) architecture.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include Wideband Code Division Multiple Access (WCDMA) (commonly referred as 3G), Long Term Evolution (LTE) (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that can be multiplexed together in the same spectrum to address a broad set of 3GPP NR use cases with diverging requirements. Ultra-mobile broadband is expected to include cmWave and mmWave spectrum that will provide the opportunity for ultra-mobile broadband access for, e.g., indoor applications and hotspots. In particular, ultra-mobile broadband is expected to share a common design framework with flexible radio access below 7 GHz, with cmWave and mmWave specific design optimizations.

3GPP has identified a variety of use cases that New Radio (NR) is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which can include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensing networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

The following is a list of acronyms relating to service level and core network technologies that may appear in the below description. Unless otherwise specified, the acronyms used herein refer to the corresponding term listed below.

Abbreviations

| | |
|---|---|
| 3GPP | 3rd Generation Partnership Project |
| 5G-GUTI | 5G Globally Unique Temporary Identifier |
| 5G-S-TMSI | 5G S-Temporary Mobile Subscription Identifier |
| 5GS | 5G System |
| AF | Application Function |
| AMF | Access and Mobility Management Function |
| ANDSP | Access Network Discovery and Selection Policy |
| AP | Access Point |
| API | Application Programming Interface |
| APN | Access Point Name |
| AS | Application Server |
| ASICs | Application Specific Integrated Circuits |
| AUSF | Authentication Server Function |
| BTS | Base Transceiver Station |
| CIoT | Cellular Internet of Things |
| CM | Connection Management |
| CN | Core Network |
| CP | Control Plane |
| DL | Downlink |
| DN | Data Network |
| DRX | Discontinuous Reception |
| DSP | Digital Signal Processor |
| DVD | Digital Versatile Disks |
| ECM | EPS Connection Management |
| EM | Electro-Magnetic |
| EMM | EPS Mobility Management |
| EPC | Evolved Packet Core |
| EPS | Evolved Packet System |
| E-UTRAN | Evolved Universal Terrestrial Radio Access Network |
| FPGAs | Field Programmable Gate Array |
| FS_REFEC | FS Relays for Energy Efficiency and Extensive Coverage |
| GGSN | Gateway GPRS (General Packet Radio Service) Support Node |

-continued

| | |
|---|---|
| GPRS | General Packet Radio Service |
| GMLC | Gateway Mobile Location Centre |
| gNode-B | Next Generation Node-B |
| GPS | Global Positioning System |
| GUI | Graphical User Interface |
| GUTI | Globally Unique Temporary UE Identity |
| HeNB | Home Evolved Node-B |
| HPLMN | Home Public Land Mobile Network |
| HSS | Home Subscriber Server |
| IC | Integrated Circuit |
| ICCID | Integrated Circuit Card Identifier |
| IE | Information Element |
| IMS | IP Multimedia System |
| IMSI | International Mobile Subscriber Identity |
| IP | Internet Protocol |
| IRTU | Inactive Registration Timer Update |
| LCD | Liquid Crystal Display |
| LCS | Location Service |
| LTE | Long Term Evolution |
| MGW | Media Gateway |
| MM | Mobility Management |
| MME | Mobility Management Entity |
| MNO | Mobile Network Operator |
| MSC | Mobile Switching Center |
| N3IWF | Non-3GPP Interworking Function |
| NAS | Non-Access Stratum |
| NEF | Network Exposure Function |
| NF | Network Function |
| NIDD | Non-IP Data Delivery |
| NRF | Network Repository Function |
| NSI | Network Slice Instance |
| NW | Network |
| NWDAF | Network Data Analytics Function |
| OLED | Organic Light Emitting Diode |
| P-GW | PDN (Packet Data Network) Gateway |
| PCF | Policy Control Function |
| PCRF | Policy and Charging Rules Function |
| PCI | Peripheral Component Interconnect |
| PDN | Packet Data Network |
| PDU | Packet Data Unit |
| ProSe | Proximity Service |
| PSM | Power Saving Mode |
| QoS | Quality of Service |
| RAM | Random Access Memory |
| RAN | Radio Access Network |
| RAT | Radio Access Technology |
| RM/CM | Registration Management and Connection Management |
| RM | Registration Management |
| RNC | Radio Network Controller |
| RRC | Radio Resource Control |
| RRH | Remote Radio Head |
| RSUs | Road Side Units |
| SCS | Service Capability Server |
| SCEF | Service Capability Exposure Function |
| SD | Secure Digital |
| S-GW | Serving Gateway |
| SGSN | Serving General Packet Radio Service (GPRS) Support Node |
| SIM | Subscriber Identity Module |
| SM | Session Management |
| SMF | Session Management Function |
| SMS | Short Message Service |
| SMSF | Short Message Service Function |
| S-NSSAI | Single Network Slice Selection Assistance Information |
| SSC | Session and Service Continuity |
| SUPI | Subscription Permanent Identifier |
| TMSI | Temporary Mobile Subscription Identifier |
| TRP | Transmission and Reception Points |
| UDM | User Data Management Function |
| UDR | User Data Repository |
| UE | User Equipment |
| UL | Uplink |
| UP | User Plane |
| UPF | User Plane Function |
| URSP | User Route Selection Policy |
| USB | Universal Serial Bus |
| USIM | Universal Subscriber Identity Module |
| V2I | Vehicle to Infrastructure |
| V2N | Vehicle-to-Network |

-continued

| V2P | Vehicle to Person |
| WTRUs | Wireless Transmit/Receive Units |

Example Communication System and Networks

FIG. 1A illustrates an example communications system 100 in which the systems, methods, and apparatuses described and claimed herein can be used. The communications system 100 can include wireless transmit/receive units (WTRUs) 102a, 102b, 102c, 102d, 102e, 102f, and/or 102g, which generally or collectively can be referred to as WTRU 102 or WTRUs 102. The communications system 100 can include, a radio access network (RAN) 103/104/105/103b/104b/105b, a core network 106/107/109, a public switched telephone network (PSTN) 108, the Internet 110, other networks 112, and Network Services 113. Network Services 113 can include, for example, a V2X server, V2X functions, a Proximity Service (ProSe) server, ProSe functions, IoT services, video streaming, and/or edge computing, etc.

Embodiments disclosed herein can be used with any number of WTRUs, base stations, networks, and/or network elements. Each of the WTRUs 102 can be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU can comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 can also include a base station 114a and a base station 114b. In the example of FIG. 1A, each base stations 114a and 114b is depicted as a single element. In practice, the base stations 114a and 114b can include any number of interconnected base stations and/or network elements. Base stations 114a can be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b can be any type of device configured to wiredly and/or wirelessly interface with at least one of the Remote Radio Heads (RRHs) 118a, 118b, Transmission and Reception Points (TRP)s 119a, 119b, and/or Roadside Units (RSUs) 120a and 120b to facilitate access to one or more communication networks, such as the core network 106/107/109, the Internet 110, other networks 112, and/or Network Services 113. Remote Radio Heads (RRHs) 118a, 118b can be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b can be any type of device configured to wirelessly interface with at least one of the WTRU 102d, to facilitate access to one or more communication networks, such as the core network 106/107/109, the Internet 110, Network Services 113, and/or other networks 112. Road Side Units (RSUs) 120a and 120b can be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b can be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a can be part of the Radio Access Network (RAN) 103/104/105, which can also include other base stations and/or network elements (not shown), such as a Base Station Controller (BSC), a Radio Network Controller (RNC), relay nodes, etc. Similarly, the base station 114b can be part of the RAN 103b/104b/105b, which can also include other base stations and/or network elements (not shown), such as a BSC, a RNC, relay nodes, etc. The base station 114a can be configured to transmit and/or receive wireless signals within a particular geographic region, which can be referred to as a cell (not shown). Similarly, the base station 114b can be configured to transmit and/or receive wired and/or wireless signals within a particular geographic region, which can be referred to as a cell (not shown). The cell can further be divided into cell sectors. For example, the cell associated with the base station 114a can be divided into three sectors. Thus, for example, the base station 114a can include three transceivers, e.g., one for each sector of the cell. The base station 114a can employ Multiple-Input Multiple Output (MIMO) technology and, therefore, can utilize multiple transceivers for each sector of the cell, for instance.

The base station 114a can communicate with one or more of the Wireless Transmit/Receive Units (WTRUs) 102a, 102b, 102c, and 102g over an air interface 115/116/117, which can be any suitable wireless communication link (e.g., Radio Frequency (RF), microwave, infrared (IR), ultraviolet (UV), visible light, cmWave, mmWave, etc.). The air interface 115/116/117 can be established using any suitable Radio Access Technology (RAT).

The base station 114b can communicate with one or more of the RRHs 118a and 118b, TRPs 119a and 119b, and/or RSUs 120a and 120b, over a wired or air interface 115b/116b/117b, which can be any suitable wired (e.g., cable, optical fiber, etc.) or wireless communication link (e.g., RF, microwave, IR, UV, visible light, cmWave, mmWave, etc.). The air interface 115b/116b/117b can be established using any suitable RAT.

The RRHs 118a, 118b, TRPs 119a, 119b and/or RSUs 120a, 120b, can communicate with one or more of the WTRUs 102c, 102d, 102e, 102f over an air interface 115c/116c/117c, which can be any suitable wireless communication link (e.g., RF, microwave, IR, ultraviolet UV, visible light, cmWave, mmWave, etc.) The air interface 115c/116c/117c can be established using any suitable RAT.

The WTRUs 102 can communicate with one another over a direct air interface 115d/116d/117d, such as Sidelink communication which can be any suitable wireless communication link (e.g., RF, microwave, IR, ultraviolet UV, visible light, cmWave, mmWave, etc.) The air interface 115d/116d/117d can be established using any suitable RAT.

The communications system 100 can be a multiple access system and can employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and/or RSUs 120*a* and 120*b* in the RAN 103*b*/104*b*/105*b* and the WTRUs 102*c*, 102*d*, 102*e*, and 102*f*, can implement a radio technology such as Universal Mobile Telecommunications System (UMTS) Terrestrial Radio Access (UTRA), which can establish the air interface 115/116/117 and/or 115*c*/116*c*/117*c* respectively using Wideband CDMA (WCDMA). WCDMA can include communication protocols such as High-Speed Packet Access (HSPA) and/or Evolved HSPA (HSPA+). HSPA can include High-Speed Downlink Packet Access (HSDPA) and/or High-Speed Uplink Packet Access (HSUPA).

The base station 114*a* in the RAN 103/104/105 and the WTRUs 102*a*, 102*b*, 102*c*, and 102*g*, or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, can implement a radio technology such as Evolved UMTS Terrestrial Radio Access (E-UTRA), which can establish the air interface 115/116/117 or 115*c*/116*c*/117*c* respectively using Long Term Evolution (LTE) and/or LTE-Advanced (LTE-A), for example. The air interface 115/116/117 or 115*c*/116*c*/117*c* can implement 3GPP NR technology. The LTE and LTE-A technology can include LTE D2D and/or V2X technologies and interfaces (such as Sidelink communications, etc.) Similarly, the 3GPP NR technology can include NR V2X technologies and interfaces (such as Sidelink communications, etc.)

The base station 114*a* in the RAN 103/104/105 and the WTRUs 102*a*, 102*b*, 102*c*, and 102*g* or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, 102*e*, and 102*f* can implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 1A can be a wireless router, Home Node B, Home eNode B, or access point, for example, and can utilize any suitable RAT for facilitating wireless connectivity in a localized area, such as a place of business, a home, a vehicle, a train, an aerial, a satellite, a manufactory, a campus, and the like. The base station 114*c* and the WTRUs 102, e.g., WTRU 102*e*, can implement a radio technology such as IEEE 802.11 to establish a Wireless Local Area Network (WLAN). Similarly, the base station 114*c* and the WTRUs 102, e.g., WTRU 102*d*, can implement a radio technology such as IEEE 802.15 to establish a wireless personal area network (WPAN). The base station 114*c* and the WTRUs 102, e.g., WRTU 102*e*, can utilize a cellular-based RAT (e.g., WCDMA, CDMA2000, GSM, LTE, LTE-A, NR, etc.) to establish a picocell or femtocell. As shown in FIG. 1A, the base station 114*c* can have a direct connection to the Internet 110. Thus, the base station 114*c* can not be required to access the Internet 110 via the core network 106/107/109.

The RAN 103/104/105 and/or RAN 103*b*/104*b*/105*b* can be in communication with the core network 106/107/109, which can be any type of network configured to provide voice, data, messaging, authorization and authentication, applications, and/or Voice Over Internet Protocol (VoIP) services to one or more of the WTRUs 102. For example, the core network 106/107/109 can provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, RAN 103/104/105 and/or RAN 103*b*/104*b*/105*b* and/or the core network 106/107/109 can be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which can be utilizing an E-UTRA radio technology, the core network 106/107/109 can also be in communication with another RAN (not shown) employing a GSM or NR radio technology.

The core network 106/107/109 can also serve as a gateway for the WTRUs 102 to access the PSTN 108, the Internet 110, and/or other networks 112. The PSTN 108 can include circuit-switched telephone networks that provide Plain Old Telephone Service (POTS). The Internet 110 can include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 can include wired or wireless communications networks owned and/or operated by other service providers. For example, the networks 112 can include any type of packet data network (e.g., an IEEE 802.3 Ethernet network) or another core network connected to one or more RANs, which can employ the same RAT as the RAN 103/104/105 and/or RAN 103*b*/104*b*/105*b* or a different RAT.

Some or all of the WTRUs 102*a*, 102*b*, 102*c*, 102*d*, 102*e*, and 102*f* in the communications system 100 can include multi-mode capabilities, e.g., the WTRUs 102*a*, 102*b*, 102*c*, 102*d*, 102*e*, and 102*f* can include multiple transceivers for communicating with different wireless networks over different wireless links. For example, the WTRU 102*g* shown in FIG. 1A can be configured to communicate with the base station 114*a*, which can employ a cellular-based radio technology, and with the base station 114*c*, which can employ an IEEE 802 radio technology.

Although not shown in FIG. 1A, a User Equipment can make a wired connection to a gateway. The gateway can be a Residential Gateway (RG). The RG can provide connectivity to a Core Network 106/107/109. Many of the embodiments contained herein can equally apply to UEs that are WTRUs and UEs that use a wired connection to connect to a network. For example, the ideas that apply to the wireless interfaces 115, 116, 117 and 115*c*/116*c*/117*c* can equally apply to a wired connection.

Figure 1B:
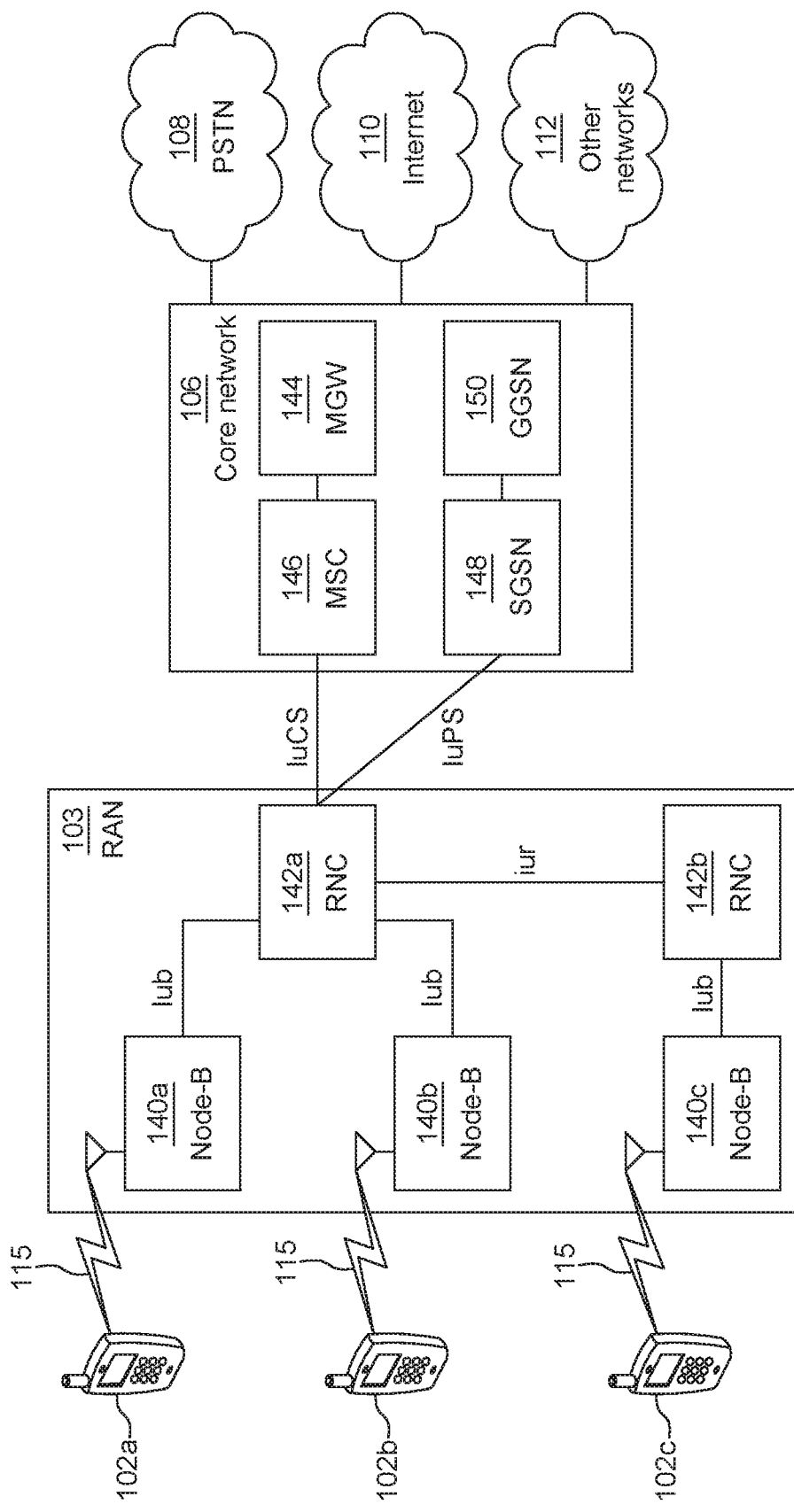
FIG. 1B is a system diagram that illustrates an example of a Radio Access Network (RAN) architecture and a core network architecture.

FIG. 1B is a system diagram of an example RAN 103 and core network 106. As noted above, the RAN 103 can employ a UTRA radio technology to communicate with the WTRUs 102*a*, 102*b*, and 102*c* over the air interface 115. The RAN 103 can also be in communication with the core network 106. As shown in FIG. 1B, the RAN 103 can include Node-Bs 140*a*, 140*b*, and 140*c*, which can each include one or more transceivers for communicating with the WTRUs 102*a*, 102*b*, and 102*c* over the air interface 115. The Node-Bs 140*a*, 140*b*, and 140*c* can each be associated with a particular cell (not shown) within the RAN 103. The RAN 103 can also include RNCs 142a, 142b. RAN 103 can include any number of Node-Bs and Radio Network Controllers (RNCs.)

As shown in FIG. 1B, the Node-Bs 140a, 140b can be in communication with the RNC 142a. Additionally, the Node-B 140c can be in communication with the RNC 142b. The Node-Bs 140a, 140b, and 140c can communicate with the respective RNCs 142a and 142b via an Iub interface. The RNCs 142a and 142b can be in communication with one another via an Iur interface. Each of the RNCs 142a and 142b can be configured to control the respective Node-Bs 140a, 140b, and 140c to which it can be connected. In addition, each of the RNCs 142a and 142b can be configured to carry out or support other functionality, such as outer loop power control, load control, admission control, packet scheduling, handover control, macro-diversity, security functions, data encryption, and the like.

The core network 106 shown in FIG. 1B can include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, any one of these elements can be owned and/or operated by an entity other than the core network operator.

The RNC 142a in the RAN 103 can be connected to the MSC 146 in the core network 106 via an IuCS interface. The MSC 146 can be connected to the MGW 144. The MSC 146 and the MGW 144 can provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 can also be connected to the SGSN 148 in the core network 106 via an IuPS interface. The SGSN 148 can be connected to the GGSN 150. The SGSN 148 and the GGSN 150 can provide the WTRUs 102a, 102b, and 102c with access to packet-switched networks, such as the Internet 110, to facilitate communications between and the WTRUs 102a, 102b, and 102c, and IP-enabled devices.

The core network 106 can also be connected to the other networks 112, which can include other wired or wireless networks that are owned and/or operated by other service providers.

Figure 1C:
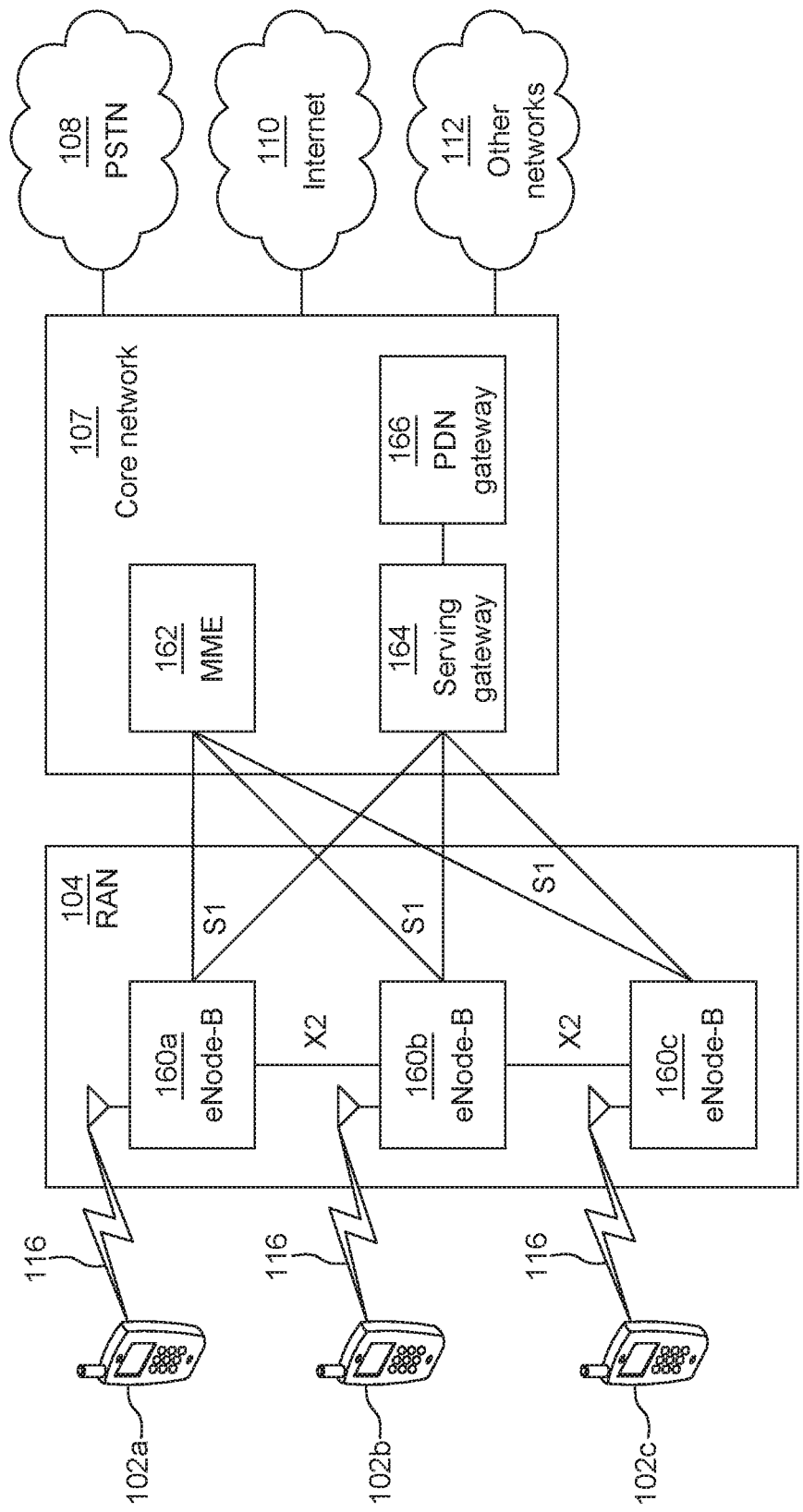
FIG. 1C is a system diagram that illustrates an example of a Radio Access Network (RAN) architecture and a core network architecture.

FIG. 1C is a system diagram of an example RAN 104 and core network 107. As noted above, the RAN 104 can employ an E-UTRA radio technology to communicate with the WTRUs 102a, 102b, and 102c over the air interface 116. The RAN 104 can also be in communication with the core network 107.

The RAN 104 can include eNode-Bs 160a, 160b, and 160c. The RAN 104 can include any number of eNode-Bs. The eNode-Bs 160a, 160b, and 160c can each include one or more transceivers for communicating with the WTRUs 102a, 102b, and 102c over the air interface 116. For example, the eNode-Bs 160a, 160b, and 160c can implement MIMO technology. Thus, the eNode-B 160a, for example, can use multiple antennas to transmit wireless signals to, and receive wireless signals from, the WTRU 102a.

Each of the eNode-Bs 160a, 160b, and 160c can be associated with a particular cell (not shown) and can be configured to handle radio resource management decisions, handover decisions, scheduling of users in the uplink and/or downlink, and the like. As shown in FIG. 1C, the eNode-Bs 160a, 160b, and 160c can communicate with one another over an X2 interface.

The core network 107 shown in FIG. 1C can include a Mobility Management Entity (MME) gateway 162, a serving gateway (S-GW) 164, and a Packet Data Network (PDN) gateway (P-GW) 166. While each of the foregoing elements are depicted as part of the core network 107, any one of these elements can be owned and/or operated by an entity other than the core network operator.

The MME 162 can be connected to each of the eNode-Bs 160a, 160b, and 160c in the RAN 104 via an Si interface and can serve as a control node. For example, the MME 162 can be responsible for authenticating users of the WTRUs 102a, 102b, and 102c, bearer activation/deactivation, selecting a particular serving gateway during an initial attach of the WTRUs 102a, 102b, and 102c, and the like. The MME 162 can also provide a control plane function for switching between the RAN 104 and other RANs (not shown) that employ other radio technologies, such as GSM or WCDMA.

The serving gateway 164 can be connected to each of the eNode-Bs 160a, 160b, and 160c in the RAN 104 via the Si interface. The serving gateway 164 can generally route and forward user data packets to/from the WTRUs 102a, 102b, and 102c. The serving gateway 164 can also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 can also be connected to the PDN gateway 166, which can provide the WTRUs 102a, 102b, and 102c with access to packet-switched networks, such as the Internet 110, to facilitate communications between the WTRUs 102a, 102b, 102c, and IP-enabled devices.

The core network 107 can facilitate communications with other networks. For example, the core network 107 can provide the WTRUs 102a, 102b, and 102c with access to circuit-switched networks, such as the PSTN 108, to facilitate communications between the WTRUs 102a, 102b, and 102c and traditional land-line communications devices. For example, the core network 107 can include, or can communicate with, an IP gateway (e.g., an IP Multimedia Subsystem (IMS) server) that serves as an interface between the core network 107 and the PSTN 108. In addition, the core network 107 can provide the WTRUs 102a, 102b, and 102c with access to the networks 112, which can include other wired or wireless networks that are owned and/or operated by other service providers.

Figure 1D:
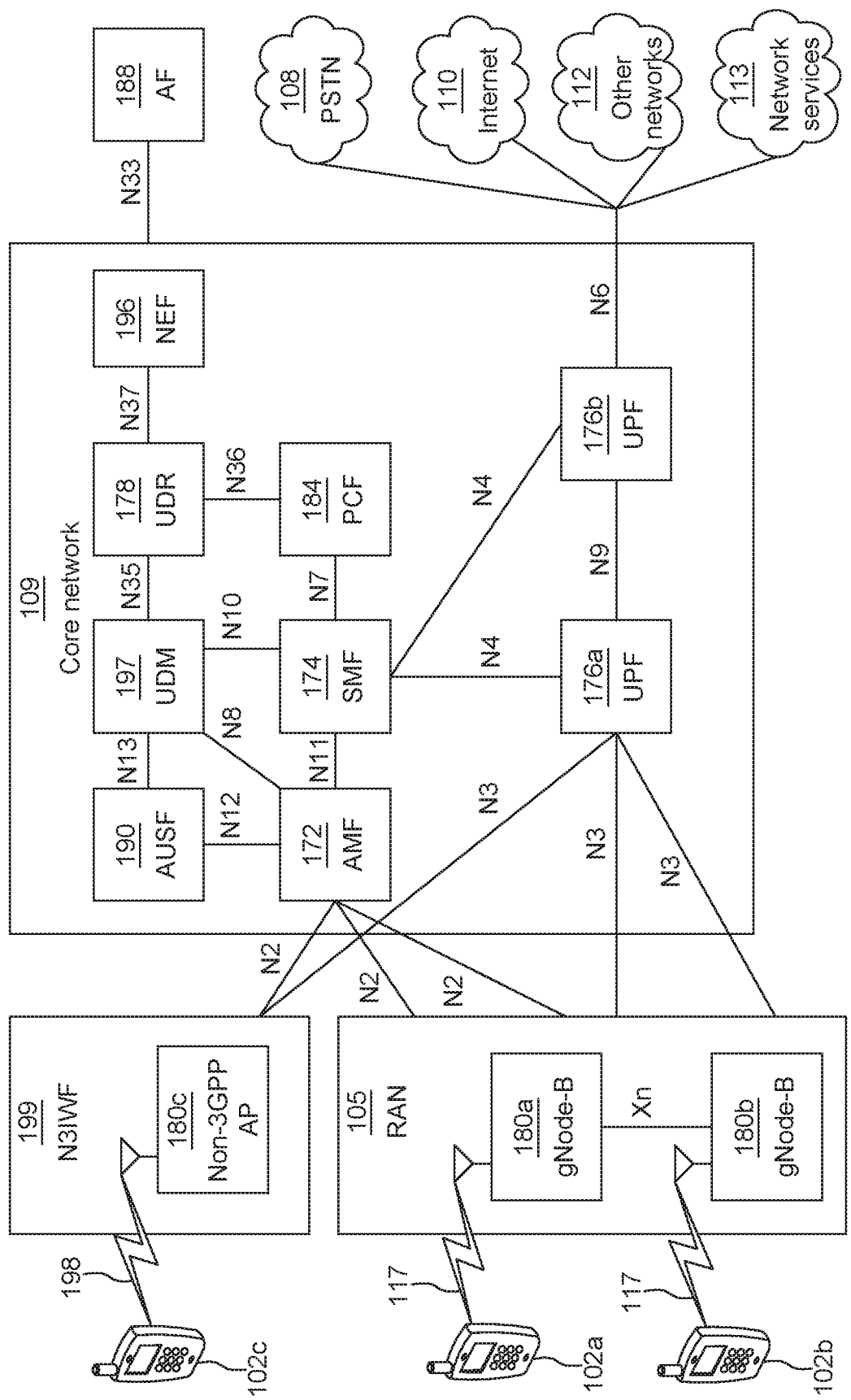
FIG. 1D is a system diagram that illustrates an example of a Radio Access Network (RAN) architecture and a core network architecture.

FIG. 1D is a system diagram of an example RAN 105 and core network 109. The RAN 105 can employ an NR radio technology to communicate with the WTRUs 102a and 102b over the air interface 117. The RAN 105 can also be in communication with the core network 109. A Non-3GPP Interworking Function (N3IWF) 199 can employ a non-3GPP radio technology to communicate with the WTRU 102c over the air interface 198. The N3IWF 199 can also be in communication with the core network 109.

The RAN 105 can include gNode-Bs 180a and 180b. The RAN 105 can include any number of gNode-Bs. The gNode-Bs 180a and 180b can each include one or more transceivers for communicating with the WTRUs 102a and 102b over the air interface 117. When integrated access and backhaul connection are used, the same air interface can be used between the WTRUs and gNode-Bs, which can be the core network 109 via one or multiple gNBs. The gNode-Bs 180a and 180b can implement MIMO, MU-MIMO, and/or digital beamforming technology. Thus, the gNode-B 180a, for example, can use multiple antennas to transmit wireless signals to, and receive wireless signals from, the WTRU 102a. It should be appreciated that the RAN 105 can employ of other types of base stations such as an eNode-B. It will also be appreciated the RAN 105 can employ more than one type of base station. For example, the RAN can employ eNode-Bs and gNode-Bs.

The Non-3GPP Interworking Function (N3IWF) 199 can include a non-3GPP Access Point 180c. The N3IWF 199 can include any number of non-3GPP Access Points. The non-3GPP Access Point 180c can include one or more transceivers for communicating with the WTRUs 102c over the air interface 198. The non-3GPP Access Point 180c can use the 802.11 protocol to communicate with the WTRU 102c over the air interface 198.

Each of the gNode-Bs 180a and 180b can be associated with a particular cell (not shown) and can be configured to handle radio resource management decisions, handover decisions, scheduling of users in the uplink and/or downlink, and the like. As shown in FIG. 1D, the gNode-Bs 180a and 180b can communicate with one another over an Xn interface, for example.

The core network 109 shown in FIG. 1D can be a 5G core network (5GC). The core network 109 can offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities can be logical entities that are implemented in the form of computer-executable instructions (software) stored in a memory of, and executing on a processor of, an apparatus configured for wireless and/or network communications or a computer system, such as system 90 illustrated in FIG. 1G.

In the example of FIG. 1D, the 5G Core Network 109 can include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, any one of these elements can be owned and/or operated by an entity other than the core network operator. It will also be appreciated that a 5G core network can not consist of all of these elements, can consist of additional elements, and can consist of multiple instances of each of these elements. FIG. 1D illustrates that network functions directly connect to one another, however, it should be appreciated that they can communicate via routing agents such as a diameter routing agent or message buses.

In the example of FIG. 1D, connectivity between network functions is achieved via a set of interfaces, or reference points. Network functions can be modeled, described, or implemented as a set of services that are invoked, or called, by other network functions or services. Invocation of a Network Function service can be achieved via a direct connection between network functions, an exchange of messaging on a message bus, calling a software function, etc.

The AMF 172 can be connected to the RAN 105 via an N2 interface and can serve as a control node. For example, the AMF 172 can be responsible for registration management, connection management, reachability management, access authentication, access authorization. The AMF can be responsible forwarding user plane tunnel configuration information to the RAN 105 via the N2 interface. The AMF 172 can receive the user plane tunnel configuration information from the SMF via an N11 interface. The AMF 172 can generally route and forward NAS packets to/from the WTRUs 102a, 102b, and 102c via an N1 interface. The N1 interface is not shown in FIG. 1D.

The Session Management Function (SMF) 174 can be connected to the AMF 172 via an N11 interface. Similarly, the SMF can be connected to the PCF (Policy Control Function) 184 via an N7 interface, and to the User Plane Functions (UPFs) 176a and 176b via an N4 interface. The SMF 174 can serve as a control node. For example, the SMF 174 can be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b can provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b can also provide the WTRUs 102a, 102b, and 102c with access to other types of packet data networks. For example, Other Networks 112 can be Ethernet Networks or any type of network that exchanges packets of data. The UPF 176a and UPF 176b can receive traffic steering rules from the SMF 174 via the N4 interface. The UPF 176a and UPF 176b can provide access to a packet data network by connecting a packet data network with an N6 interface or by connecting to each other and to other UPFs via an N9 interface. In addition to providing access to packet data networks, the UPF 176 can be responsible packet routing and forwarding, policy rule enforcement, quality of service handling for user plane traffic, downlink packet buffering.

The AMF 172 can also be connected to the N3IWF 199, for example, via an N2 interface. The N3IWF facilitates a connection between the WTRU 102c and the 5G core network 170, for example, via radio interface technologies that are not defined by 3GPP. The AMF can interact with the N3IWF 199 in the same, or similar, manner that it interacts with the RAN 105.

The PCF 184 can be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 can provide policy rules to control plane nodes such as the AMF 172 and SMF 174, allowing the control plane nodes to enforce these rules. The PCF 184, can send policies to the AMF 172 for the WTRUs 102a, 102b, and 102c so that the AMF can deliver the policies to the WTRUs 102a, 102b, and 102c via an N1 interface. Policies can then be enforced, or applied, at the WTRUs 102a, 102b, and 102c.

The UDR 178 can act as a repository for authentication credentials and subscription information. The UDR can connect to network functions, so that network function can add to, read from, and modify the data that is in the repository. For example, the UDR 178 can connect to the PCF 184 via an N36 interface. Similarly, the UDR 178 can connect to the NEF 196 via an N37 interface, and the UDR 178 can connect to the UDM 197 via an N35 interface.

The UDM 197 can serve as an interface between the UDR 178 and other network functions. The UDM 197 can authorize network functions to access of the UDR 178. For example, the UDM 197 can connect to the AMF 172 via an N8 interface, the UDM 197 can connect to the SMF 174 via an N10 interface. Similarly, the UDM 197 can connect to the AUSF 190 via an N13 interface. The UDR 178 and UDM 197 can be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure can occur on the N33 API interface. The NEF can connect to an AF 188 via an N33 interface and it can connect to other network functions in order to expose the capabilities and services of the 5G core network 109.

Application Functions 188 can interact with network functions in the 5G Core Network 109. Interaction between the Application Functions 188 and network functions can be via a direct interface or can occur via the NEF 196. The Application Functions 188 can be considered part of the 5G Core Network 109 or can be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102*a*, 102*b*, or 102*c* can connect to an AMF 172, via an N1 interface. The AMF 172 can be logically part of one or more slices. The AMF 172 can coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions can be part of the same slice or different slices. When they are part of different slices, they can be isolated from each other in the sense that they can utilize different computing resources, security credentials, etc.

The core network 109 can facilitate communications with other networks. For example, the core network 109 can include, or can communicate with, an IP gateway, such as an IP Multimedia Subsystem (IMS) server, that serves as an interface between the 5G core network 109 and a PSTN 108.

For example, the core network 109 can include, or communicate with a short message service (SMS) service center that facilities communication via the short message service. For example, the 5G core network 109 can facilitate the exchange of non-IP data packets between the WTRUs 102*a*, 102*b*, and 102*c* and servers or applications functions 188. In addition, the core network 170 can provide the WTRUs 102*a*, 102*b*, and 102*c* with access to the networks 112, which can include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities can be identified by other names and certain entities or functions can be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein can be embodied or implemented in any similar communication system, whether presently defined or defined in the future.

Figure 1E:
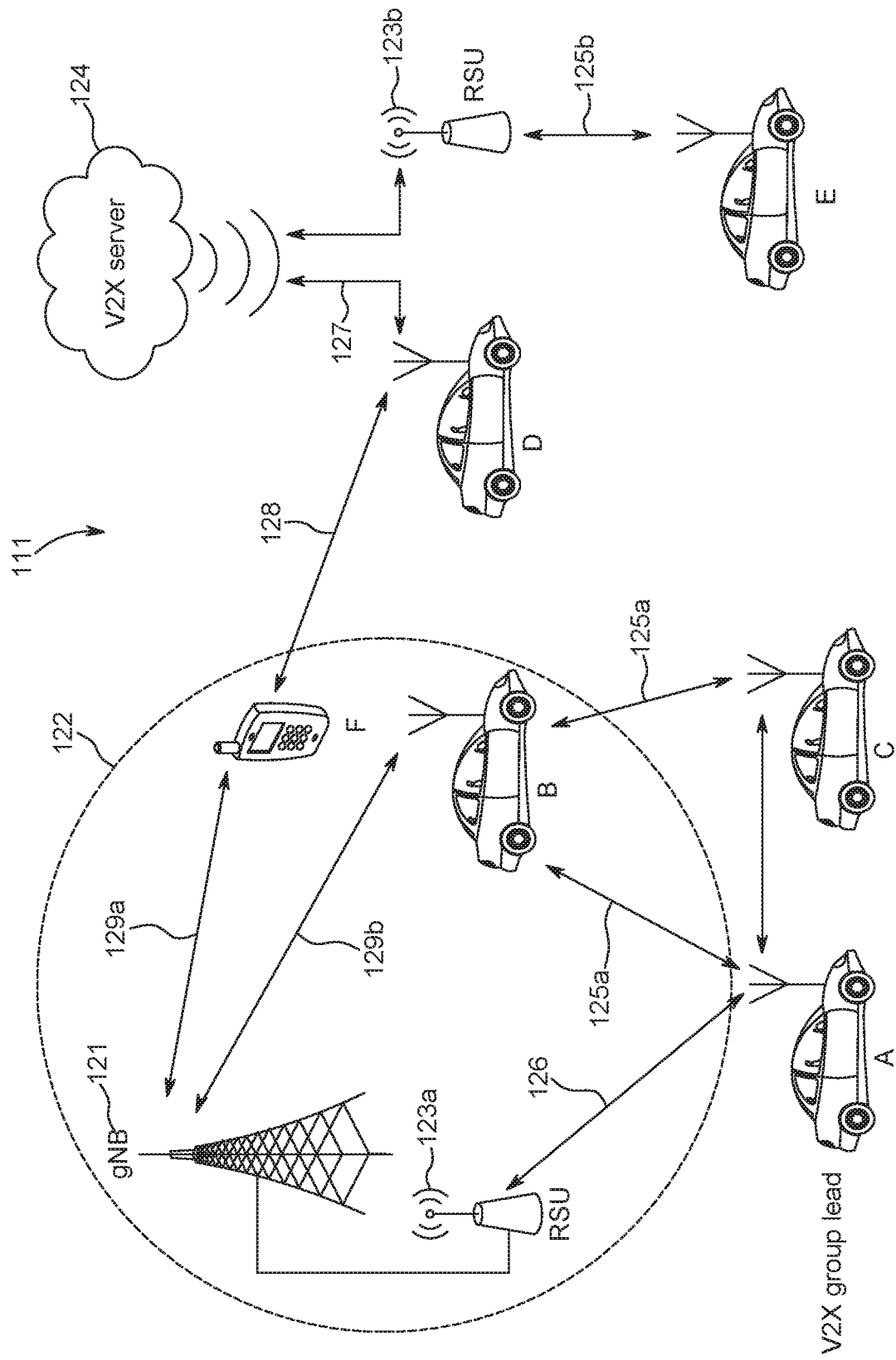
FIG. 1E is a system diagram that illustrates an example 3GPP architecture.

FIG. 1E illustrates an example communications system 111 in which the systems, methods, apparatuses described herein can be used. Communications system 111 can include Wireless Transmit/Receive Units (WTRUs) A, B, C, D, E, F, a base station gNB 121, a V2X server 124, and Road Side Units (RSUs) 123*a* and 123*b*. In practice, the concepts presented herein can be applied to any number of WTRUs, base station gNB s, V2X networks, and/or other network elements. One or several or all WTRUs A, B, C, D, E, and F can be out of range of the access network coverage 122. WTRUs A, B, and C form a V2X group, among which WTRU A can be the group lead and WTRUs B and C are group members.

WTRUs A, B, C, D, E, F can communicate with each other over a Uu interface 129*b* via the gNB 121 if they are under the access network coverage (only B and F are shown under the network coverage in FIG. 1E). WTRUs A, B, C, D, E, F can communicate with each other directly via a Sidelink (PC5 or NR PC5) interface 125 *a*, 125*b*, 128, if they are under or out of the access network coverage (e.g., A, C, WTRUs A, B, C, D, E, F can communicate with each other D and E are shown out of the network coverage in FIG. 1E).

WTRUs A, B, C, D, E, and F can communicate with RSU 123*a* or 123*b* via a Vehicle-to-Network (V2N) 126 or Sidelink interface 125*b*. WTRUs A, B, C, D, E, and F can communicate to a V2X Server 124 via a Vehicle-to-Infrastructure (V2I) interface 127. WTRUs A, B, C, D, E, and F can communicate to another UE via a Vehicle-to-Person (V2P) interface 128.

Figure 1F:
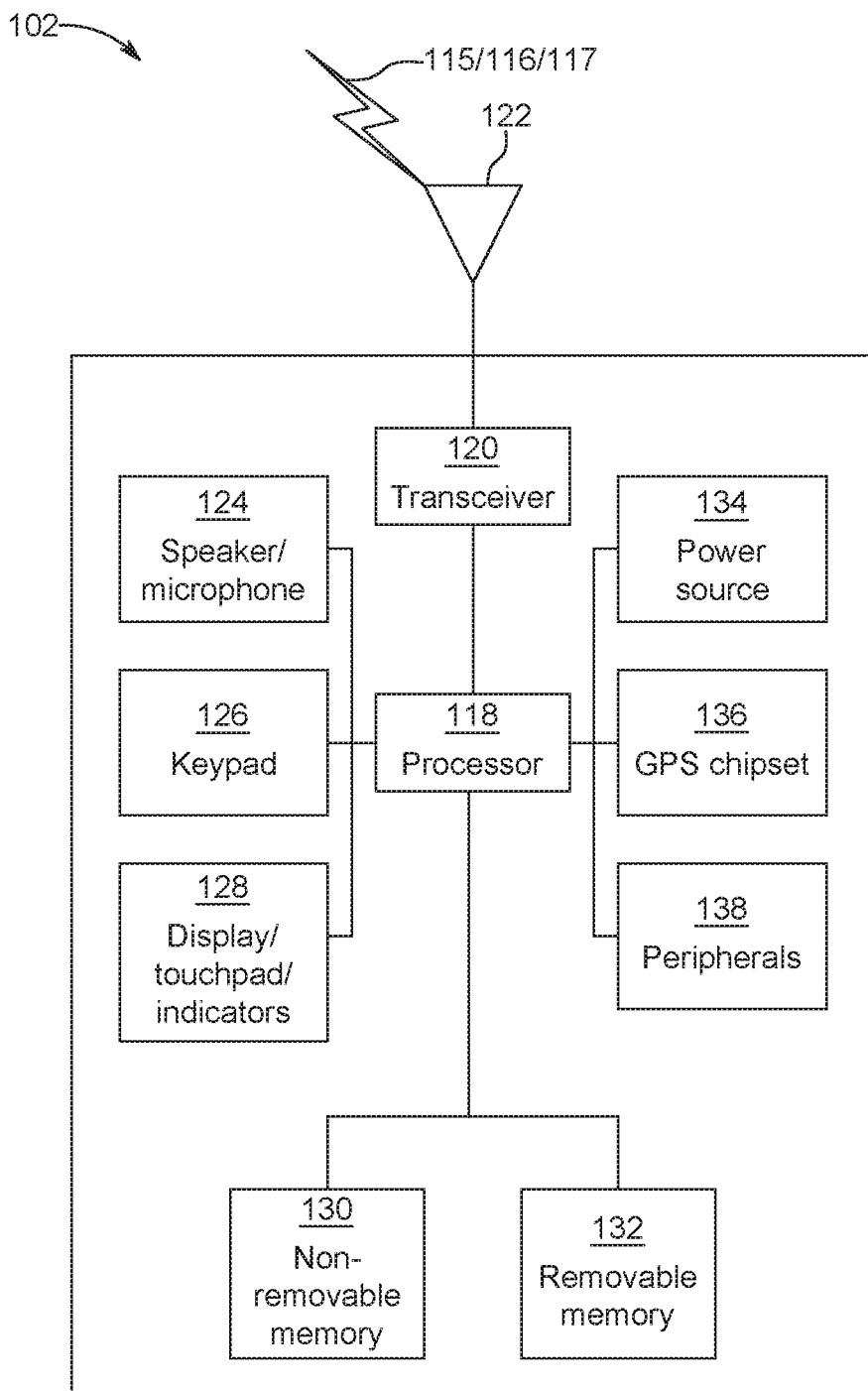
FIG. 1F is a system diagram of an example apparatus or device configured for wireless communications.

FIG. 1F is a block diagram of an example apparatus or device WTRU 102 that can be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 can include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. The WTRU 102 can include any sub-combination of the foregoing elements. Also, the base stations 114*a* and 114*b*, and/or the nodes that base stations 114*a* and 114*b* can represent, such as but not limited to Base Transceiver Station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, can include some or all of the elements depicted in FIG. 1F and described herein.

The processor 118 can be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 can perform signal coding, data processing, power control, input/output processing, and/or any other functionality that enables the WTRU 102 to operate in a wireless environment. The processor 118 can be coupled to the transceiver 120, which can be coupled to the transmit/receive element 122. While FIG. 1F depicts the processor 118 and the transceiver 120 as separate components, the processor 118 and the transceiver 120 can be integrated together in an electronic package or chip.

The transmit/receive element 122 of a UE can be configured to transmit signals to, or receive signals from, a base station (e.g., the base station 114a of FIG. 1A) over the air interface 115/116/117 or another UE over the air interface 115d/116d/117d. For example, the transmit/receive element 122 can be an antenna configured to transmit and/or receive RF signals. The transmit/receive element 122 can be an emitter/detector configured to transmit and/or receive IR, UV, or visible light signals, for example. The transmit/receive element 122 can be configured to transmit and receive both RF and light signals. The transmit/receive element 122 can be configured to transmit and/or receive any combination of wireless or wired signals.

In addition, although the transmit/receive element 122 is depicted in FIG. 1F as a single element, the WTRU 102 can include any number of transmit/receive elements 122. More specifically, the WTRU 102 can employ MIMO technology. Thus, the WTRU 102 can include two or more transmit/receive elements 122 (e.g., multiple antennas) for transmitting and receiving wireless signals over the air interface 115/116/117.

The transceiver 120 can be configured to modulate the signals that are to be transmitted by the transmit/receive element 122 and to demodulate the signals that are received by the transmit/receive element 122. As noted above, the WTRU 102 can have multi-mode capabilities. Thus, the transceiver 120 can include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 can be coupled to, and can receive user input data from, the speaker/microphone 124, the keypad 126, and/or the display/touchpad/indicators 128 (e.g., a liquid crystal display (LCD) display unit or organic light-emitting diode (OLED) display unit. The processor 118 can also output user data to the speaker/microphone 124, the keypad 126, and/or the display/touchpad/indicators 128. In addition, the processor 118 can access information from, and store data in, any type of suitable memory, such as the non-removable memory 130 and/or the removable memory 132. The non-removable memory 130 can include random-access memory (RAM), read-only memory (ROM), a hard disk, or any other type of memory storage device. The removable memory 132 can include a subscriber identity module (SIM) card, a memory stick, a secure digital (SD) memory card, and the like. The processor 118 can access information from, and store data in, memory that is not physically located on the WTRU 102, such as on a server that is hosted in the cloud or in an edge computing platform or in a home computer (not shown).

The processor 118 can receive power from the power source 134, and can be configured to distribute and/or control the power to the other components in the WTRU 102. The power source 134 can be any suitable device for powering the WTRU 102. For example, the power source 134 can include one or more dry cell batteries, solar cells, fuel cells, and the like.

The processor 118 can also be coupled to the GPS chipset 136, which can be configured to provide location information (e.g., longitude and latitude) regarding the current location of the WTRU 102. In addition to, or in lieu of, the information from the GPS chipset 136, the WTRU 102 can receive location information over the air interface 115/116/117 from a base station (e.g., base stations 114a, 114b) and/or determine its location based on the timing of the signals being received from two or more nearby base stations. The WTRU 102 can acquire location information by way of any suitable location-determination method.

The processor 118 can further be coupled to other peripherals 138, which can include one or more software and/or hardware modules that provide additional features, functionality, and/or wired or wireless connectivity. For example, the peripherals 138 can include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 can be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 can connect to other components, modules, or systems of such apparatuses or devices via one or more interconnect interfaces, such as an interconnect interface that can comprise one of the peripherals 138.

Figure 1G:
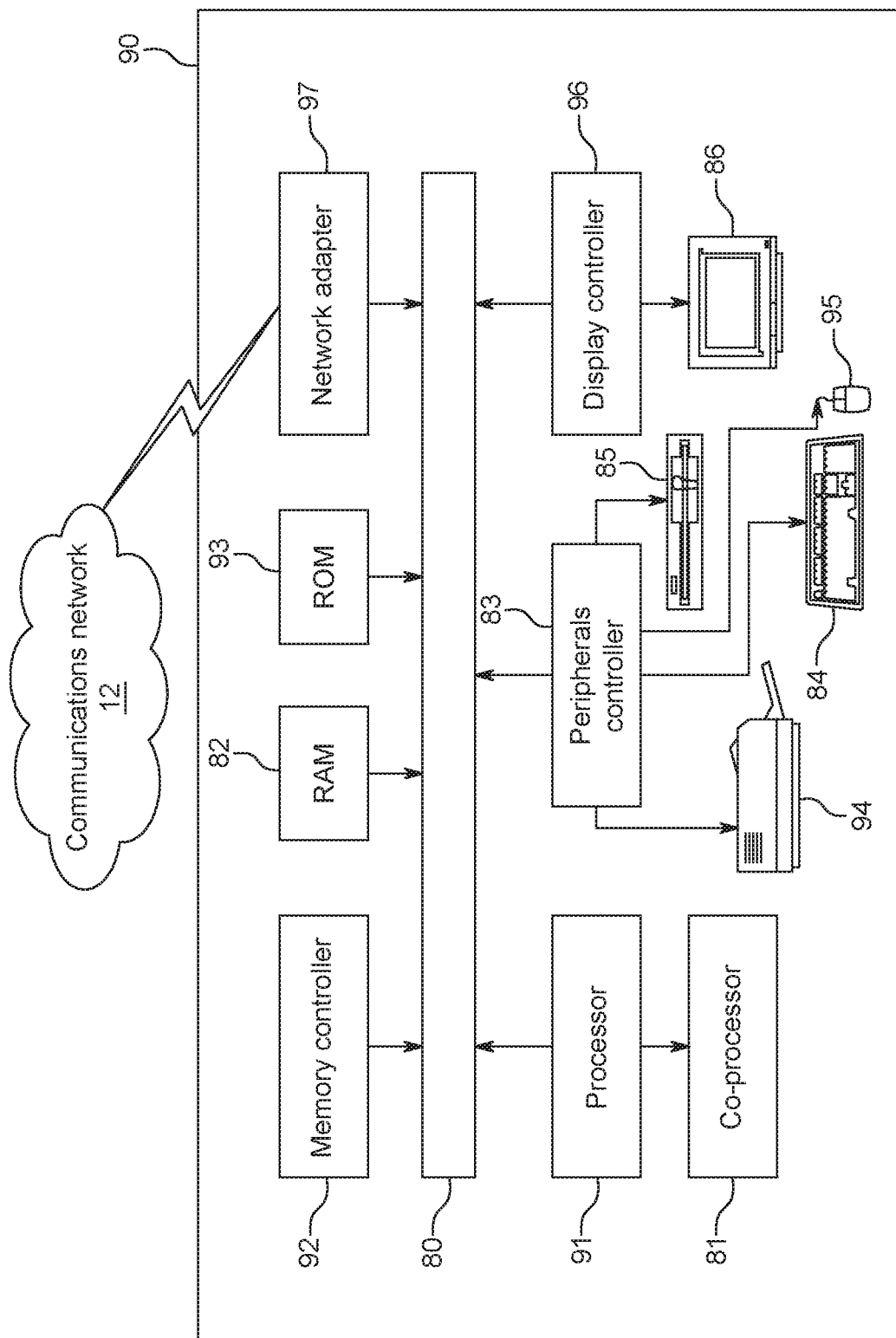
FIG. 1G is a system diagram that illustrates an example of a computing system used in a communication network.

FIG. 1G is a block diagram of an exemplary computing system 90 in which one or more apparatuses of the communications networks illustrated in FIGS. 1A, 1C, 1D and 1E can be embodied, such as certain nodes or functional entities in the RAN 103/104/105, Core Network 106/107/109, PSTN 108, Internet 110, Other Networks 112, or Network Services 113. Computing system 90 can comprise a computer or server and can be controlled primarily by computer readable instructions, which can be in the form of software, wherever, or by whatever means such software is stored or accessed. Such computer readable instructions can be executed within a processor 91, to cause computing system 90 to do work. The processor 91 can be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 can perform signal coding, data processing, power control, input/output processing, and/or any other functionality that enables the computing system 90 to operate in a communications network. Coprocessor 81 is an optional processor, distinct from main processor 91, that can perform additional functions or assist processor 91. Processor 91 and/or coprocessor 81 can receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 can be controlled by memory controller 92. Memory controller 92 can provide an address translation function that translates virtual addresses into physical addresses as instructions are executed. Memory controller 92 can also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 can contain peripherals controller 83 responsible for communicating instructions from processor 91 to peripherals, such as printer 94, keyboard 84, mouse 95, and disk drive 85.

Display 86, which is controlled by display controller 96, can be used to display visual output generated by computing system 90. Such visual output can include text, graphics, animated graphics, and video. The visual output can be provided in the form of a graphical user interface (GUI). Display 86 can be implemented with a CRT-based video display, an LCD-based flat-panel display, gas plasma-based flat-panel display, or a touch-panel. Display controller 96 includes electronic components required to generate a video signal that is sent to display 86.

Further, computing system 90 can contain communication circuitry, such as for example a wireless or wired network adapter 97, that can be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, can be used to perform the transmitting and receiving steps of certain apparatuses, nodes, or functional entities described herein.

It is understood that any or all of the apparatuses, systems, methods and processes described herein can be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein can be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

5G Cellular Network

Figure 2:
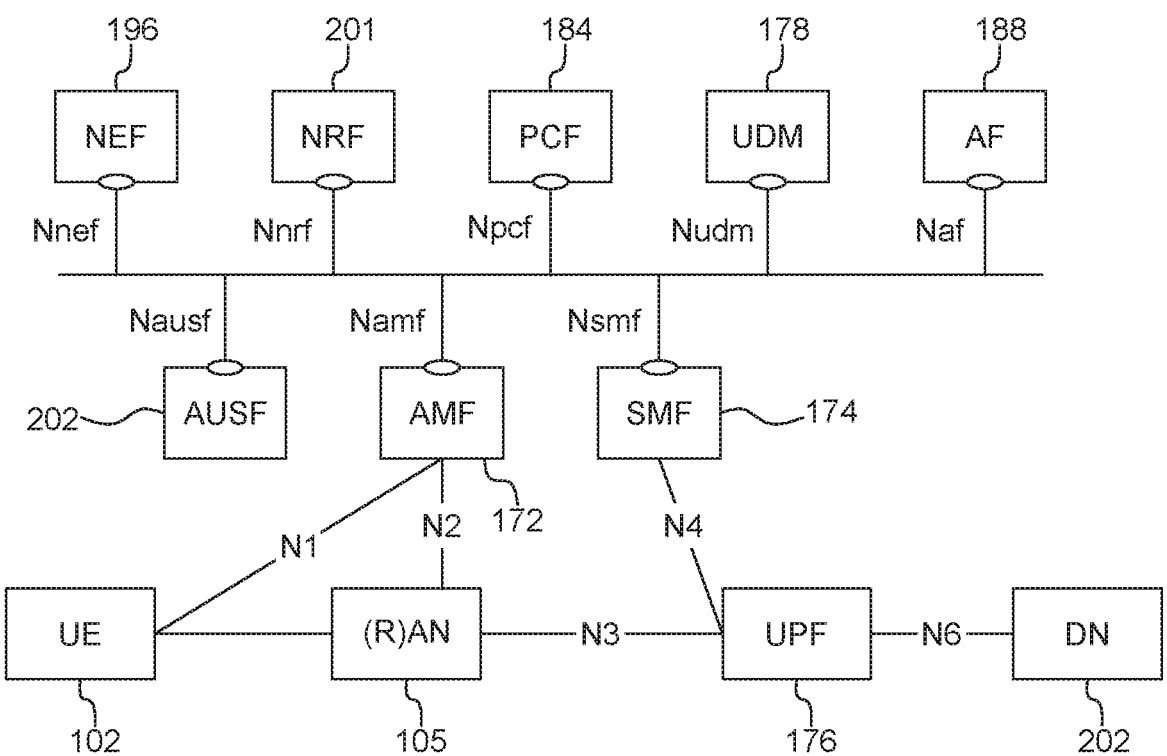
FIG. 2 illustrates a non-roaming 5G system architecture including service-based interfaces within a Control Plane in accordance with an exemplary embodiment.

FIG. 2 illustrates the 5G System in a non-roaming reference architecture example with service-based interfaces within the Control Plane in accordance with an example embodiment. In example embodiments described herein, a remote UE can be assisted by a relay UE or one or more intermediate UEs and a relay UE of a relay chain to access any of the service functions of the 5G system, as for example described in the 3GPP standard, and as illustrated in an embodiment in FIG. 2, via a relay UE or via one or more intermediate UEs and a relay UE. An example 5G non-roaming reference architecture includes a Network Exposure Function (NEF) 196, a New Repository Function NRF 201, a Policy Control Function (PCF) 184, a User Data Management function (UDM) 178, a an Application Function (AF) 188, an Authentication Server Function (AUSF) 201, an Access and Mobility Function (AMF) 172, a Session Management Function (SMF) 174, a radio Access Network (RAN) 103/104/105 function, a User Plane Function (UPF) 176, a Data Network (DN) function 208.

Figure 3:
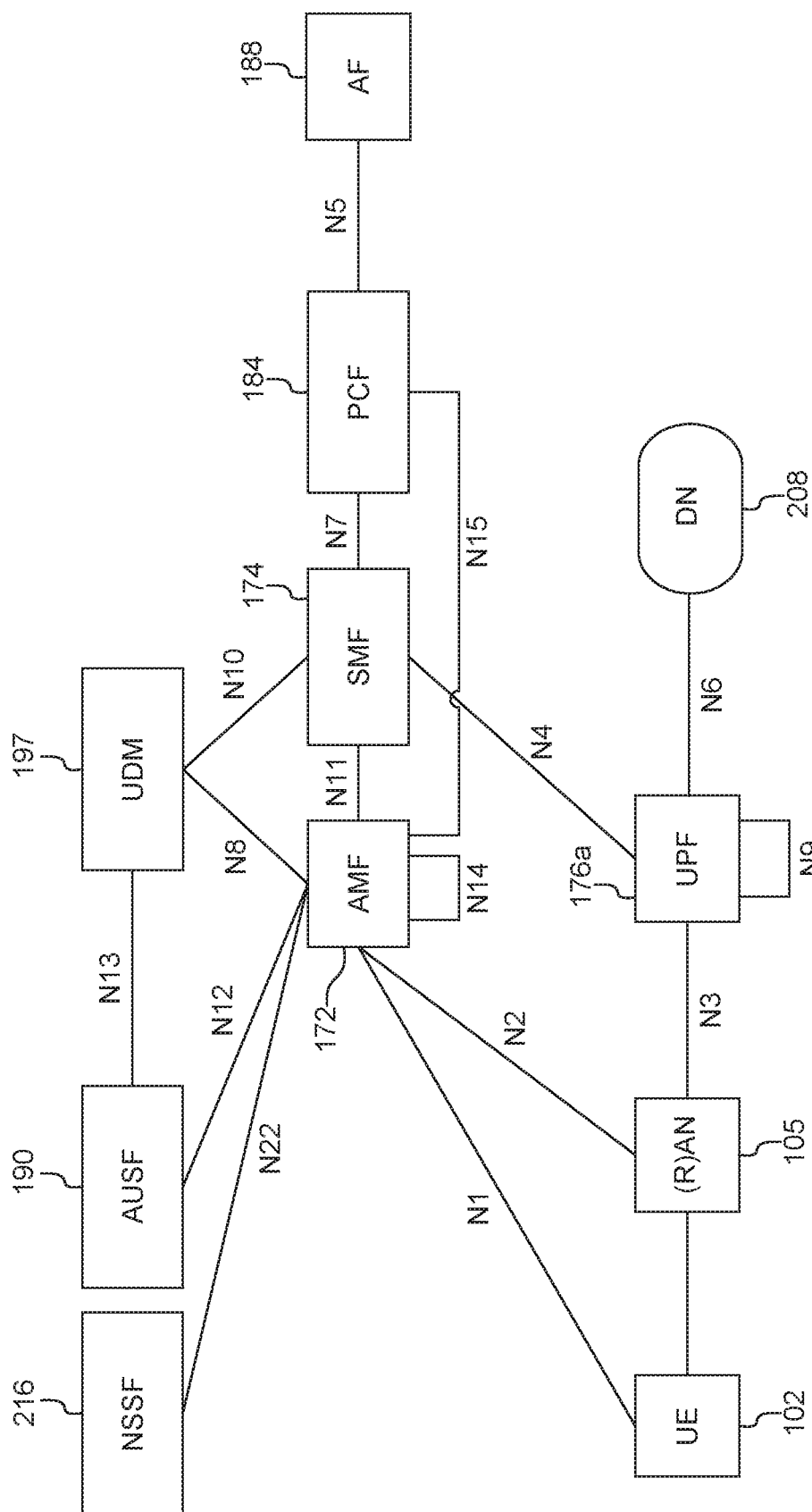
FIG. 3. illustrates a non-roaming 5G system architecture including a reference point representation showing how various network functions interact in accordance with an exemplary embodiment.

FIG. 3 illustrates the 5G System architecture in the non-roaming case, using the reference point representation showing how various network functions interact in accordance with an example embodiment. The end-to-end communications, between the Application in the UE and the Application in the external network, uses services provided by the 3GPP system, and optionally services provided by a Services Capability Server (SCS), which resides in the DN. FIG. 3 illustrates an architecture where various entities interact with each other over the indicated reference points. A User Equipment (UE) device 102 can send and receive data to and from a Data Network (DN) 208 such as the internet through the Radio Access Network (RAN) 105 and the User Plane Function (UPF) entities 176*a*. This data path is referred to as the 5G User Plane (UP).

Data traffic from the UE 102 is sent on PDU sessions that are created in the core network. The following network functions play a role in the PDU session management within the core network 106/107/109. FIG. 2 also includes Network Slice Selection Function (NSSF) 216.

Access and Mobility Function (AMF) 172: The UE 102 sends an N1 message through the RAN node 105 to the AMF 172 to initially establish a PDU session in the core network. The AMF 172 selects an appropriate SMF 174 to process the PDU Session Establishment request.

Session Management Function (SMF) 174: The SMF 174 is responsible for creating PDU sessions and can contact the UDM 197 for subscription information and PCF 184 for policy information to use in processing the PDU Session Establishment request. The SMF 174 can also communicate with the UPF 176*a* and the RAN node 105 to establishment tunneling information that can be used to route data from the UE 102 to the DN 208 and from the DN 208 back to the UE 102.

Policy and Control Function (PCF) 184: The PCF 184 makes authorization and policy decisions for establishing the PDU session.

User Plane Function (UPF) 176*a*: The UPF 176*a* allocates resources in the user plane to allow data traffic to flow from the UE 102 to the DN 208 and from the DN 208 back to the UE 102. One or more UPFs 176*a*, 176*b*, 176*c*, etc. in the core network can be utilized to route the data.

Radio Access Network (RAN) 105: The RAN node 105 offers communication access from the UE 102 to the core network for both control plane and user plane traffic.

Control Plane Protocol Stack

Figure 4:
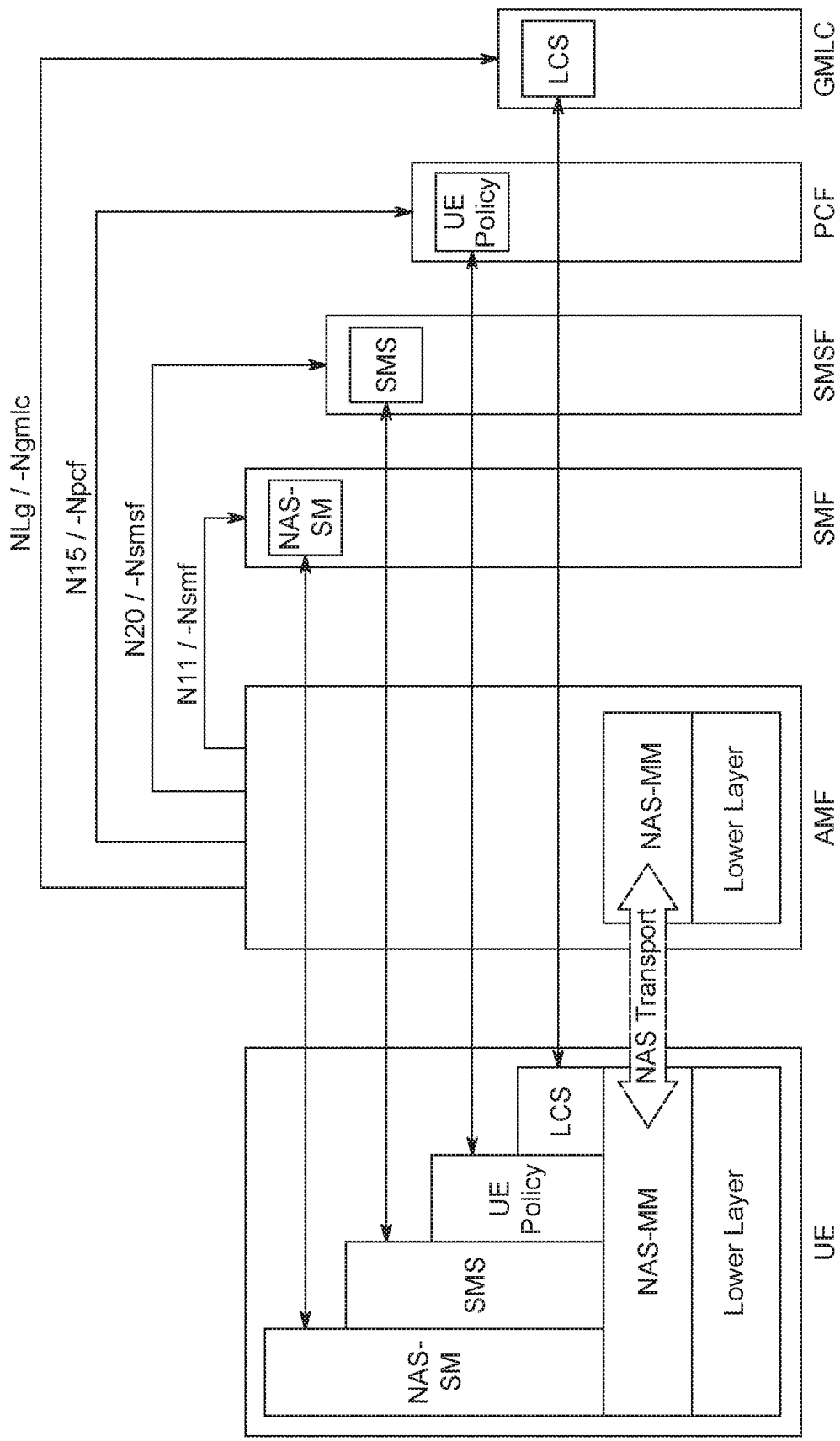
FIG. 4 illustrates NAS transport for SM, SMS, UE Policy and LCS. It is worth noting that the mobility management and session management functions can be separated in accordance with an exemplary embodiment.

FIG. 4 illustrates Non-Access Stratum (NAS) transport for Session Management (SM), Short Message Service (SMS) in accordance with an example embodiment, UE Policy and Location Service (LCS). The mobility management and session management functions can be separated. A single N1 NAS connection can be used for both Registration Management and Connection Management (RM/CM) and for SM-related messages and procedures for a UE. The single N1 termination point can be located in the AMF. The AMF can forward SM related NAS information to the SMF. AMF can handle the Registration Management and Connection Management of NAS signaling exchanged with the UE, while SMF can handle the Session management of NAS signaling exchanged with the UE.

In addition, the architecture includes several types of control signaling that can be transferred on top of NAS-MM protocol, such as UE policy between PCF and UE, Location Service (LCS) between Gateway Mobile Location Centre (GMLC) and UE.

Figure 5:
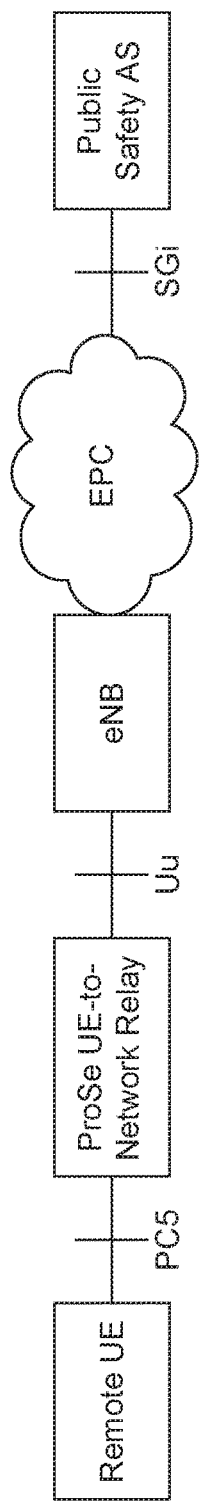
FIG. 5 illustrates an architecture model for a LTE ProSe UE-to-Network Relay in accordance with an exemplary embodiment.

FIG. 5 illustrates a simple architecture model using a Proximity Service (ProSe) UE-to-Network Relay in accordance with an example embodiment.

Figure 6:
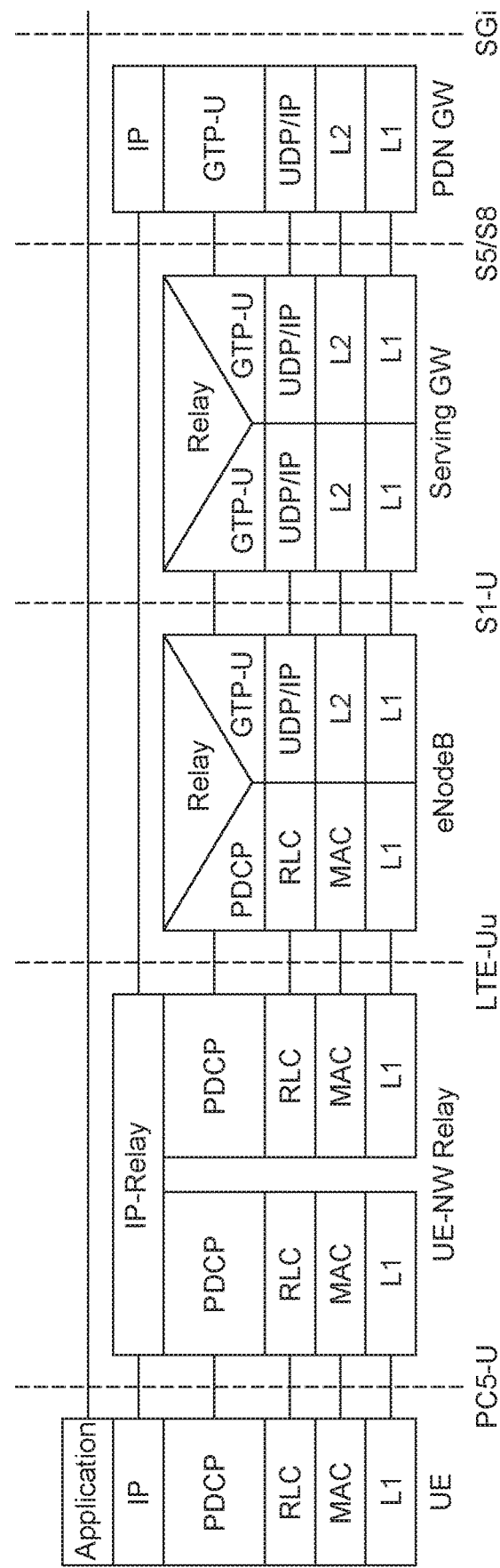
FIG. 6 illustrates a user plane protocol stack for LTE ProSe UE-to-Network relay, which applies layer-3 forwarding in accordance with an exemplary embodiment.

FIG. 6 illustrates a user plane protocol stack for UE-to-Network relay, which applies the layer-3 forwarding in accordance with an example embodiment. Referring to FIG. 5 and FIG. 6, LTE ProSe UE-to-Network Relay entity can provide functionality to support connectivity to the network for Remote UEs. The ProSe UE-to-Network Relay can relay unicast traffic (DL and UL) to remote UE, and the eMBMS traffic using one-to-many ProSe Direct Communication. A UE can be considered to be a Remote UE for a certain ProSe UE-to-Network relay if it has successfully established a PC5 link (e.g., LTE V2X, a one to many interface, etc.) to this ProSe UE-to-Network Relay. A Remote UE can be located within E-UTRAN coverage or outside of E-UTRAN coverage. If a Remote UE maintains both PC5 and Uu, the EPS core network entities on the Uu side of the Remote UE are not aware of the ProSe UE-to-Network Relay path via PC5.

Figure 7:
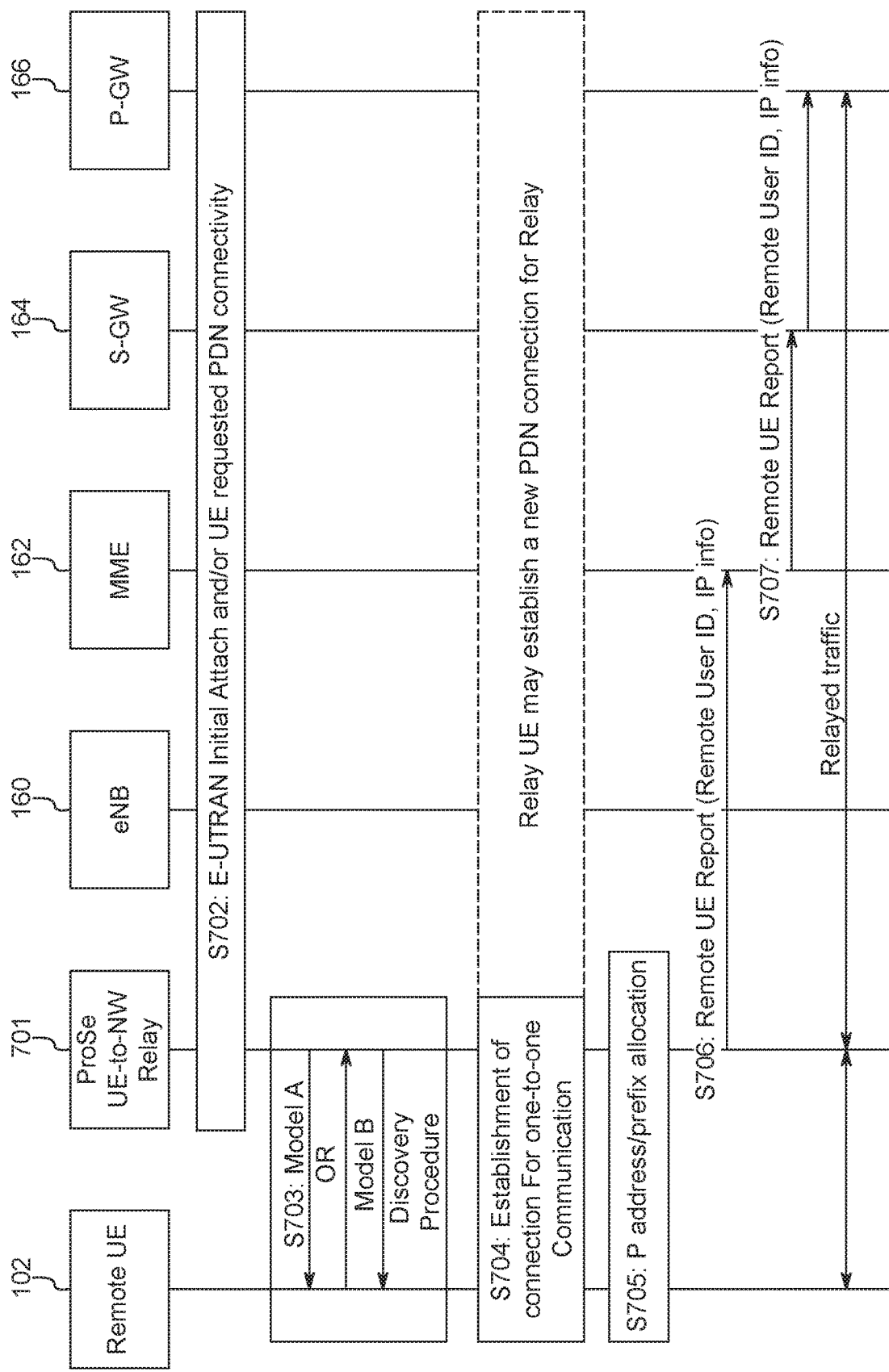
FIG. 7 illustrates a procedure for direct communication via relay for 3GPP LTE ProSe in accordance with an exemplary embodiment.

FIG. 7 illustrates an example procedure of direct communication via a relay UE 701 for 3GPP ProSe. A ProSe UE-to-Network Relay capable UE 701 can attach to the network (if it is not already connected) and connect to a PDN connection enabling the necessary relay traffic, or it can connect to additional PDN connection(s) in order to provide relay traffic towards Remote UE(s). PDN connection(s) supporting UE-to-Network Relay can only be used for Remote ProSe UE(s) relay traffic.

Step S702: The ProSe UE-to-Network Relay UE 701 performs initial E-UTRAN Attach (if not already attached) and/or establishes a PDN connection for relaying (if no appropriate PDN connection for this relaying exists).

Step S703. The Remote UE 102 performs discovery of a ProSe UE-to-Network Relay using Model A or Model B discovery.

Step S704. The Remote UE 102 selects a ProSe UE-to-Network Relay UE 701 and establishes a connection for One-to-one ProSe Direct Communication. If there is no PDN connection associated with the ProSe Relay UE ID or an additional PDN connection for relaying is needed, the ProSe UE-to-Network Relay UE 701 initiates a new PDN connection establishment procedure for relaying.

Step S705. IPv6 prefix or IPv4 address is allocated for the remote UE 102. From this point the uplink and downlink relaying can start.

Step S706. The ProSe UE-to-Network Relay UE 701 sends a Remote UE Report (Remote User ID, IP info) message to the MME 162 for the PDN connection associated with the relay chain. The Remote User ID is an identity of the Remote UE user (provided via User Info) that was successfully connected in step 704. The MME 162 stores the Remote User IDs and the related IP info in the ProSe UE-to-Network Relay's EPS bearer context for the PDN connection associated with the relay chain.

Step S707. The MME 162 forwards the Remote UE Report message to the S-GW 164 and the S-GW forwards the message to the P-GW 166 of the UE-to-Network Relay UE 701. The ProSe UE-to-Network Relay UE 701 can report multiple Remote UEs 102/102*s* in one Remote UE Report message.

Enhancements to ProSe (Proximity Service) UE-to-Network Relay

There was a study in 3GPP SA2 to enhance the ProSe UE-to-Network Relay with the following objectives:

Investigate and evaluate the necessary enhancements to the EPC to support a generic Layer 2 Evolved ProSe UE-to-Network Relay, including procedures for the network to identify, authenticate, authorize, control, address, and reach an Evolved ProSe Remote UE via an Evolved ProSe UE-to-Network Relay UE.

Investigate and study enhancements of the existing procedure to authorize a UE to act as an Evolved ProSe UE-to-Network Relay between an Evolved ProSe Remote UE and E-UTRAN.

Investigate and evaluate the necessary enhancements to the Evolved ProSe UE-to-Network Relay discovery and selection procedure.

Investigate and study the support for service continuity.

Investigate and study the support for power consumption efficiency of Evolved ProSe Remote UEs.

Investigate and study the support of Evolved ProSe Remote UEs optimized for small data delivery and triggering, e.g., CIoT UEs.

Figure 8:
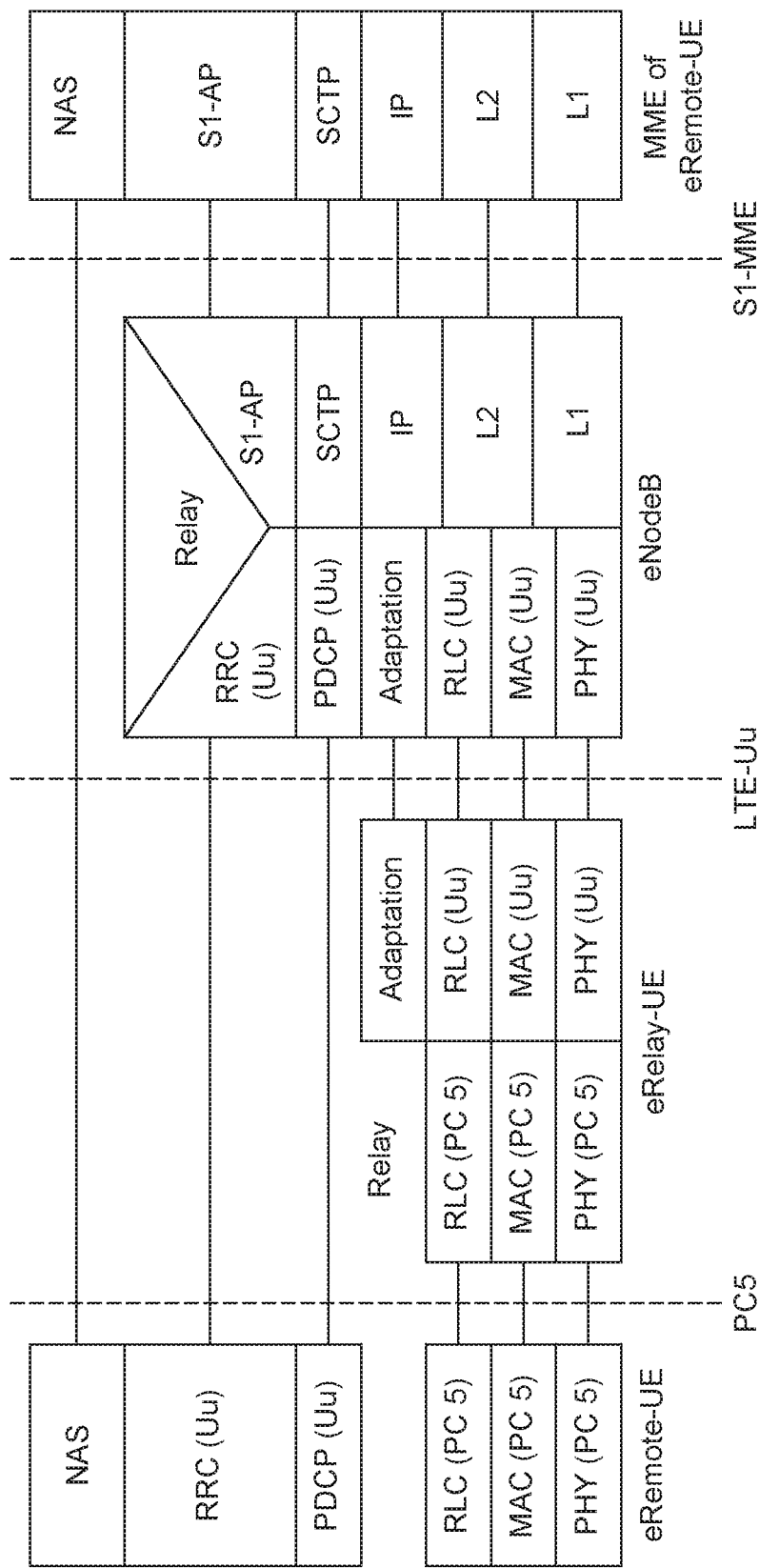
FIG. 8 illustrates a control plane protocol stack for enhanced UE-to-Network Relay in accordance with an exemplary embodiment.

FIG. 8 illustrates a control plane protocol stack for enhanced UE-to-Network Relay in accordance with an example embodiment.

Figure 9:
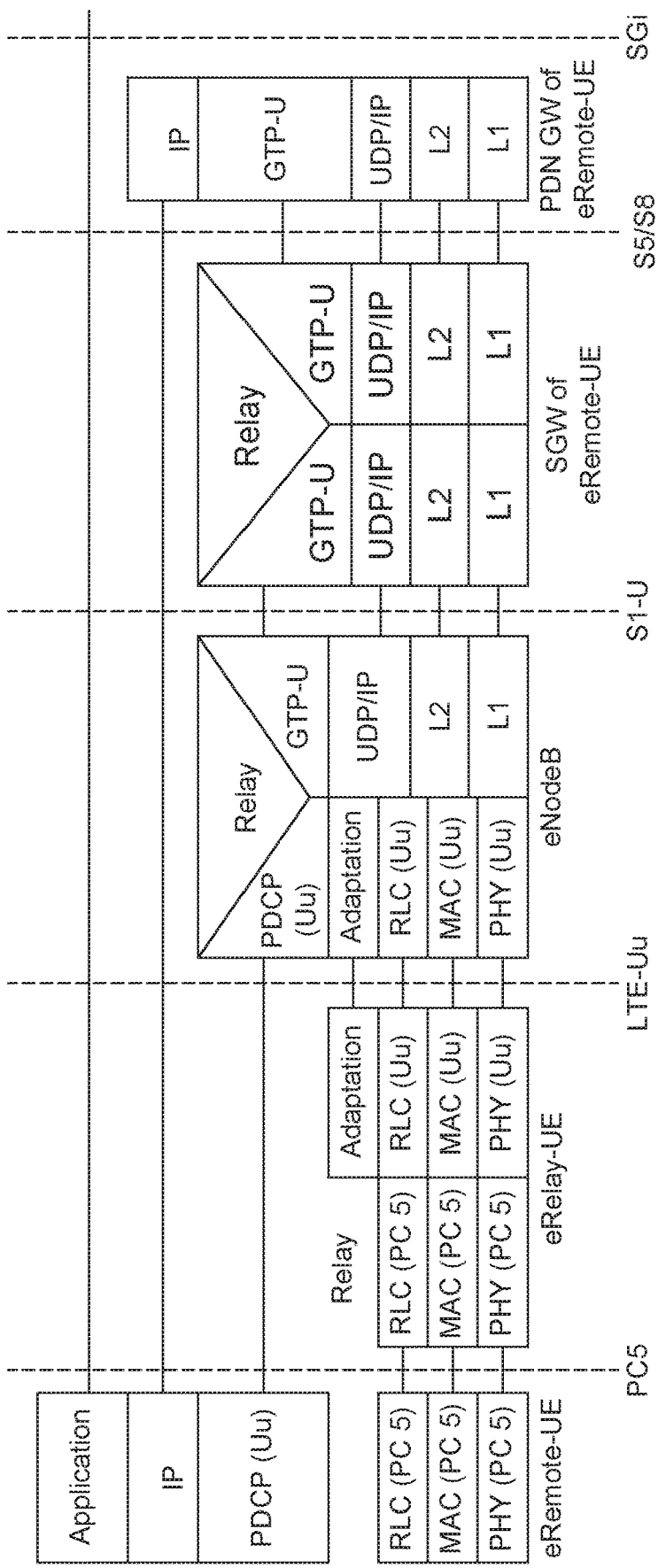
FIG. 9 illustrates a user plane protocol stack for layer-2 relay in accordance with an exemplary embodiment.

FIG. 9 illustrates the proposed user plane protocol stacks for layer-2 relay in accordance with an example embodiment.

For example, FIG. 8 and FIG. 9 include a proposed control plane and user plane protocol stacks for layer-2 relay, respectively, where the adaptation layer is FFS. Note that this example is based on LTE PC5, which does not include RRC in PC5-S stack.

Study on Enhanced Relays for Energy Efficiency and Extensive Coverage (FS_REFEC)

Recently, there is a study item in 3GPP SA1 The Study focuses on identifying new requirements for relays for energy efficiency and extensive coverage, especially driven by new use cases in 5G. 5G contemplates many different scenarios and verticals (inHome, SmartFarming, SmartFactories, Public Safety and others). Many of them are new while others have been already covered in earlier generations of mobile networks. What all of the studies have in common is that they can find use cases where better energy efficiency and more extensive coverage is needed in comparison to what earlier generations (3G, 4G) could offer. The study is targeting layer 2 relay.

Release 16 service requirements already include the possibility of having direct 3GPP communication or indirect 3GPP communication with the use of relays. Nevertheless, this may be not enough for the needs of the possible use cases from the area listed. Incorporating multi-hop relays into 5G can help to improve the energy efficiency and the coverage of the 5G system. Some example requirements are identified:

- The 5G system shall support UE relay selection based on instantaneous relay availability including the current relay mobility.
- The 5G system shall support gNB to allocate UE relay resource pool according to UE mobility.
- The 5G system shall support mobile UE relays to reconfigure its resource pool according their current location and mobility.
- The 5G system shall support gNB to assign and reconfigure UE routing ID according to UE mobility
- The 5G system shall support UE relay selection on hop-by-hop basis, based on both long-term cost metrics provided by gNB, and instantaneous relay availability decided by fast-changing channel status and buffer load.
- The 5G system shall support high power UEs to schedule the resource of low power UEs.

ProSe Discovery

Figure 10:
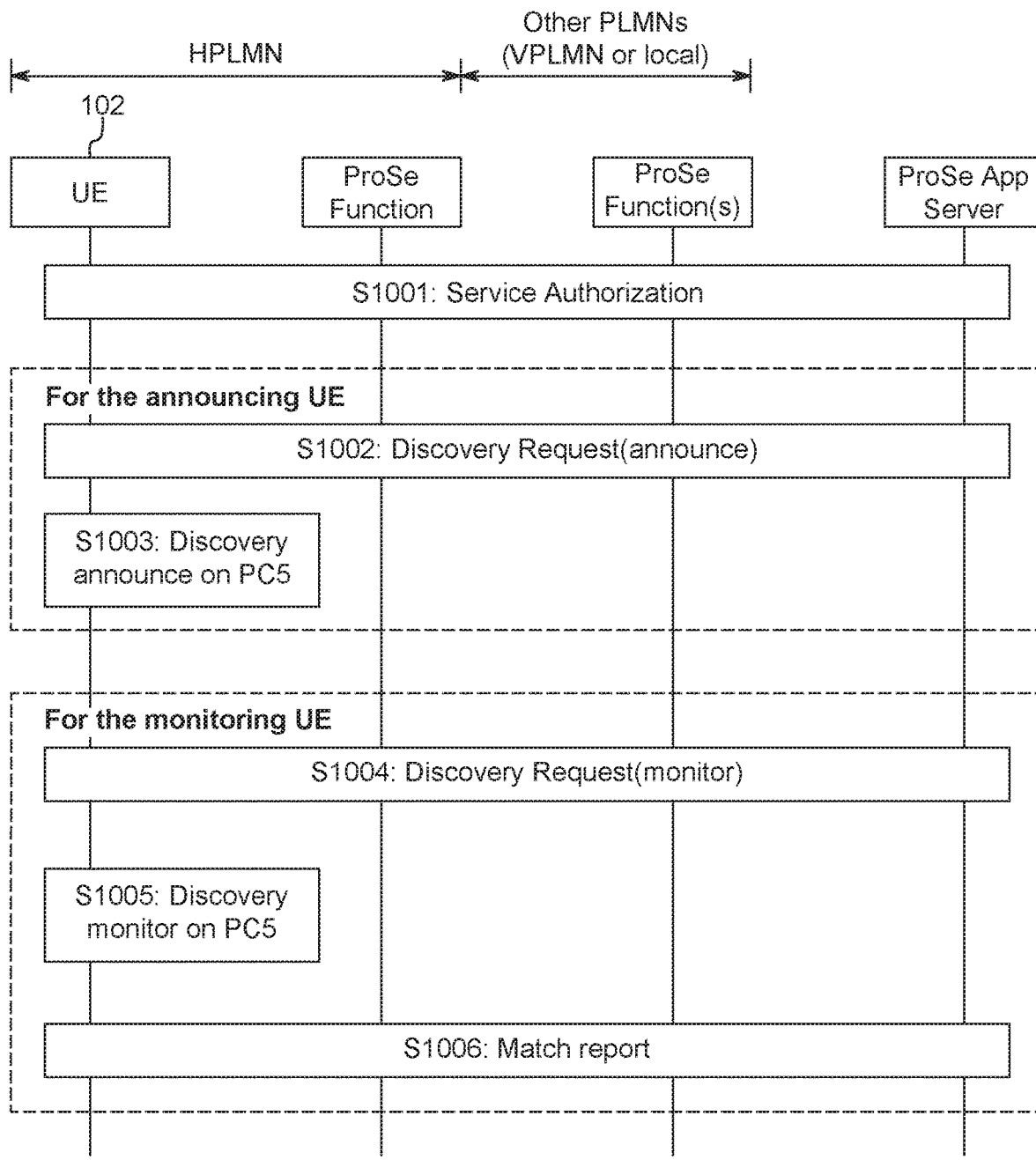
FIG. 10 illustrates an overall procedure for LTE ProSe discovery Model A in accordance with an exemplary embodiment.

FIG. 10 illustrates an overall procedure for ProSe discovery Model A in accordance with an exemplary embodiment. The PC5 discovery protocol stack can be defined for the D2D ProSe Direct Discovery mechanisms.

In LTE ProSe, there are two types of D2D ProSe Direct Discovery: open and restricted. Open is the case where there is no explicit permission that is needed from the UE being discovered, whereas restricted discovery only takes place with explicit permission from the UE that is being discovered.

Two discovery models are defined in LTE, discovery Model A and discovery Model B. Model A defines two roles for the participating UEs: announcing UE and monitoring UE. The announcing UE which announces certain information that could be used by UEs in proximity that have permission to discover and the monitoring UE which monitors certain information of interest in proximity of announcing UEs. Service authorization is accomplished (S1001). In this model the announcing UE e.g., UE 102 and/or UE 701 broadcasts discovery messages (S1002) at pre-defined discovery intervals. Example monitoring UEs e.g., UE 102 and/or UE 701 that are interested in these messages read them and process them (S1004). In this model, the announcing UE (e.g., 102) can broadcast information about itself advertising its presence ("I am here") and services it offered (S1005). A match report can be provided based upon the discovery results (S1006). Both open and restricted discovery types are supported by Model A. When a matched information is determined a report is generated (S1006).

Figure 11:
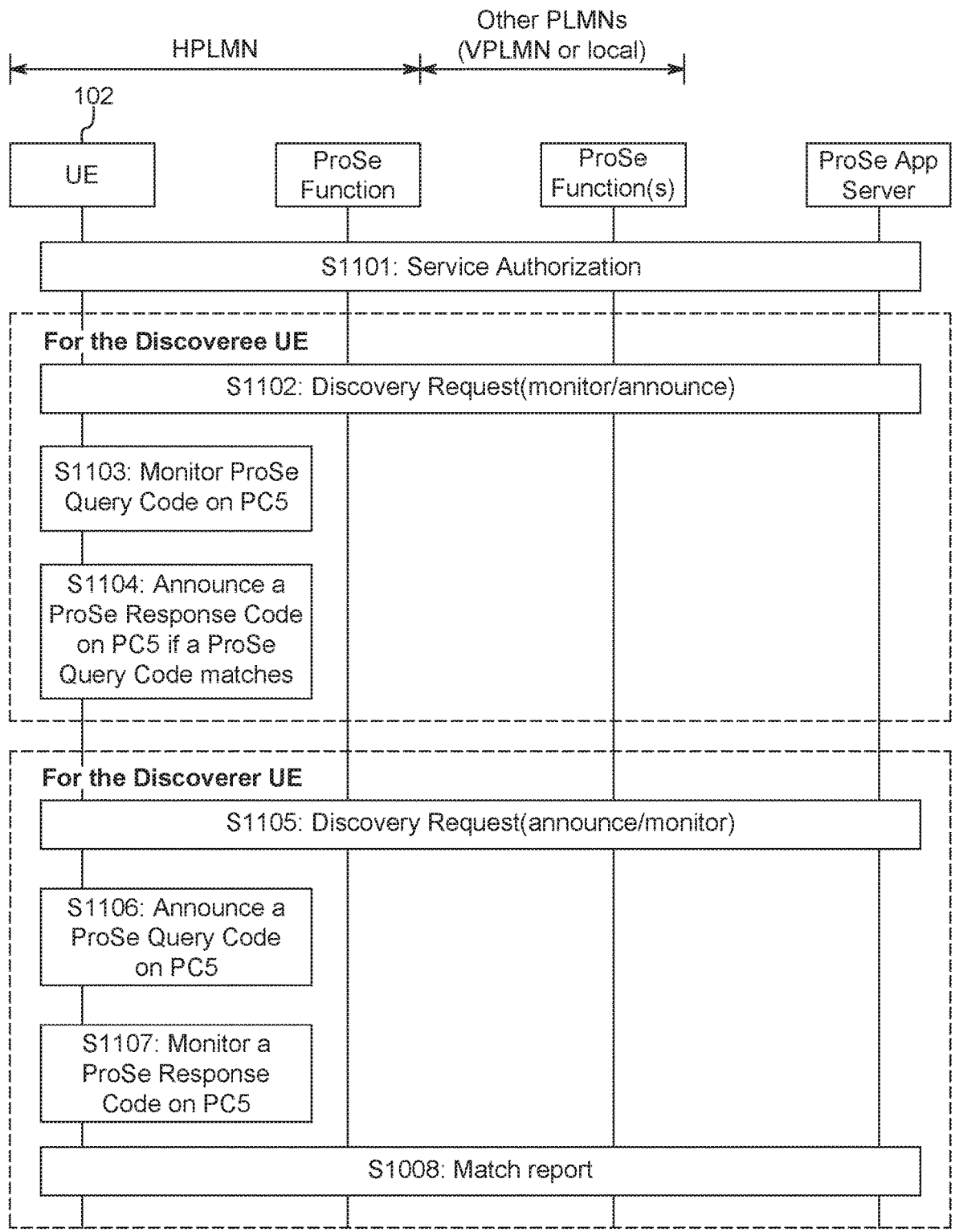
FIG. 11 illustrates an overall procedure for LTE ProSe discovery Model B in accordance with an exemplary embodiment.

FIG. 11 illustrates the overall procedure for ProSe (Proximity Service) discovery model B in accordance with an example embodiment. The discovery model B also defines two roles for the participating UEs: discoverer UE and discoveree UE. Service authorization is accomplished (S1101). The discoverer UE (e.g., 102) which transmits a request (S1102) containing certain information about what it is interested to discover and to determine whether a discoveree UE (e.g., 701) can offer certain services (S1103, S1104), and the discoveree UE UE (e.g., 701) which receives the request message (S1105) can respond with some information related to the discoverer's request (S1106, S1107). This model can be summarized as "who is there or are you there" since the discoverer UE sends information to other UEs. Only restricted discovery type is supported by Model B. When a matched information is determined a report is generated (S1108).

Example Use Case: Problem Statement

Embodiments described herein can be used to solve different use cases including 5G described use case. As an exemplary, non-limited use case, it can be considered that a company owns a large factory where precursor chemicals are converted into other chemicals to be used in highly specialized industries such as pharmaceutics, plastics, cosmetics etc. Many of the chemicals are dangerous as they are flammable, toxic to humans or both and are often corrosive.

To avoid hazard to workers as much as possible, the company uses remote controlled and semi-autonomous robots for much of the movement, storage and inspection of drums (containers) of chemicals between various warehouses and within the production floor itself.

In addition to the above, containers of chemicals as well as hazmat suits are equipped with communications devices which can transmit critical information such as temperature, humidity and the possible presence of certain chemicals in the air.

Much of the work is done inside metal enclosures which can seal off potential chemical leaks. The enclosure walls as well as the drums, also metallic, act as Electro-magnetic (EM) shields which make signal propagation difficult and unpredictable.

Rather than deploying multiple gNBs, the company has chosen to use UEs capable of embodiments of the multi-hop relay operation to relay messages between remote UEs 102s and gNBs 140s. While not all UEs can be used as relays, the large number of UEs of different types (mounted on vehicles, handheld, on drums) ensures sufficient coverage. In other words, a mesh network is formed within the factory, with at least one UE e.g., 701 connected to an application server through gNB and 5G network.

As introduced herein, some architectures and mechanisms were defined in 3GPP specifications for relaying. However, many issues related to multi-hop relay have not been addressed in 5G. Incorporating multi-hop relays into 5G can help to improve the energy efficiency and the coverage of the 5G system. Since the 5G network is expected to support a wide range of applications and use cases, with requirements such as improving energy efficiency and extending network coverage, multi-hop relay should be considered as a potential way to meet those requirements. There are some major problems and challenges for deploying the multi-hop relay in 5G networks.

Multi-hop relay chain formation: once UEs (e.g., 102s, 701s) discover each other in proximity, a general issue is how to form a multi-hop relay chain and to what degree the network manages, or controls, the multi-hop relay chain formation. Keep in mind that some UEs in the chain can be out of coverage.

As discussed herein, this disclosure provides embodiments that enable layer 2 multi-hop relay. In other words, each UE can attach to or register with the network directly or indirectly, and it can be determined how the registration and connection management can be performed for each UE in a relay chain.

Each UE can perform periodic tracking area updates and registration updates. If individual UEs 102s start these procedures at different times and rely on a relay UE 701 to exchange the messages with the network, there the relay UE 701 would need to deal with an excessive about of control signaling. In other words, the control signaling overhead can be high over PC5 connection and the NAS connection between relay UE 701 and the AMF 172.

Regarding the power saving (e.g., PSM (Power Saving Mode) and Discontinuous Reception (DRX) and paging, with different cycles assigned to different UEs in a relay chain, there can be an excessive amount of control signaling to handle for the relay UE 701. This is especially true when the relay UE 701 needs to listen to incoming paging messages on behalf of remote UEs 102s and to forward the paging message from the network to a remote UE 102 that is paged.

For the network, when the paging messages are sent out to different UEs in a relay chain, some new mechanisms can be defined to reduce the paging overhead in the network, so that paging operation could be more efficient for both network and relay UE 701 in the context of multi-hop relay.

Multi-hop relay chain maintenance: in the case that a UE in the middle of a relay chain, which can be described as an intermediate UE, becomes unreachable (e.g., enters IDLE mode, move away or is turned off), a UE 102 needs to be aware of the change and to pair itself with another UE (intermediate or relay). This means that the remote UE 102 should try to join another relay chain or stay in the same relay chain by pairing with a different UE in the chain. It needs to be determined which party (i.e., core network, gNB, relay UE directly connecting to gNB) is responsible for maintaining the reachability status of UEs in the relay chain, or multiple parties collaborate with each other for different roles. Some solutions for embodiments of how to switch the affected UEs to a new or an existing relay chain, and whether and how the relay UE 701 is given a certain degree of freedom to manage the relay chain in a distributed manner are described herein.

5G network is expected to support a wide range of applications and use cases, with requirements such as improving energy efficiency and extending network coverage. Multi-hop relay can be implemented to meet those requirements.

The following description focuses on embodiments for enabling multi-hop relay operation capable of improving energy efficiency and extending network coverage in 5G network.

Registration process for a UE which wants to enable the multi-hop relay service. New information elements and the multi-hop relay policy are proposed. In addition, a UE can register with network directly or indirectly via another UE.
  the multi-hop relay policy can be sent to a UE from PCF Procedures of joining and forming a multi-hop relay chain.
  PC5 discovery procedures can be re-used by a UE to discover and select the relay UE and decide whether there is an existing multi-hop relay chain.
  The remote UE can initiate a PC5 link establishment process with the selected relay UE by requesting to either join an existing relay chain or to form a new relay chain. As a requirement of layer 2 relay, registration process for the UE can take place along with the process. Moreover, depending on the network configuration and multi-hop relay policy, a network can participate in the process of forming a new multi-hop relay chain, which is proposed as the network assisted relay chain formation.

Methods of maintaining a multi-hop relay chain when a UE in the middle of relay chain or the relay UE becomes unreachable, e.g., the UE is turned off or moves away Methods of registration management and connection management for UEs in a multi-hop relay chain are presented for more efficient operations. According to the network configuration and multi-hop relay policy, the following procedures are presented:
  Methods that Network pages multiple UEs in a relay chain over N2 interface, where the N2 connection is shared by those UEs.
  Methods for a remote UE to perform registration update process with relay UE over PC5 connection, and the relay UE will report the registration update status on behalf of one or more UEs to the network at a pre-configured time point.

Additionally, it should be appreciated that the following embodiment includes the following assumptions:
  At least 1 UE in a relay chain is in coverage of the gNB.
  The relay is Layer-2 relay, i.e., each UE is required to register with network.
  All UEs in a relay chain are served by the same network slice and AMF.

Registration for Enabling Multi-hop Relay
Direct Registration

Layer 2 relay requires every UE to register with network and establish a NAS connection. In addition, a UE needs to be authenticated and authorized by the network for using the multi-hop relay service as a relay UE, a remote UE or an intermediate UE. In an embodiment this can be accomplished through the registration procedure.

Figure 12A:
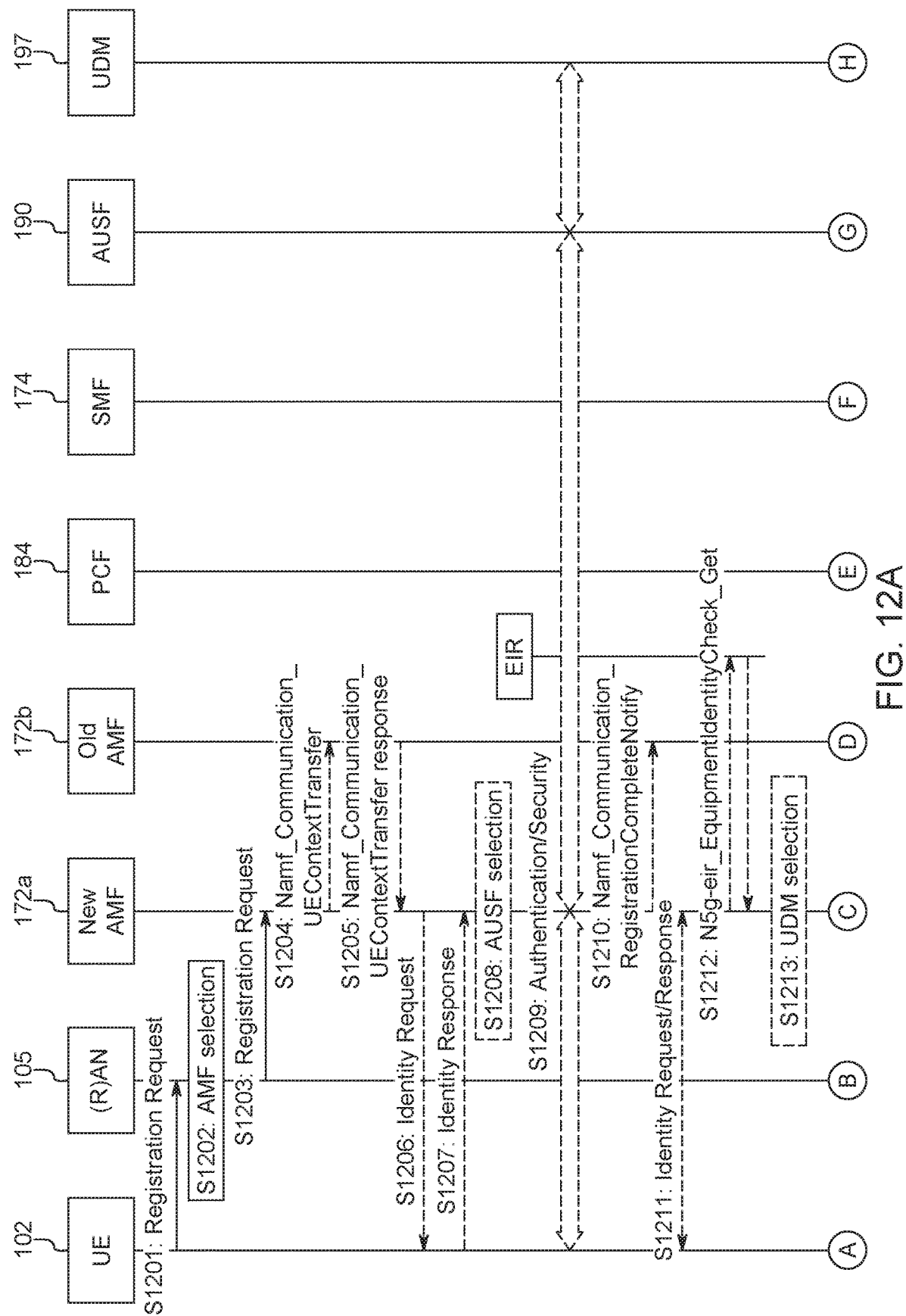
FIG. 12 (FIGS. 12A-12C) illustrates a general registration procedure where multi-hop relay can be enabled in accordance with an exemplary embodiment.
Figure 12B:
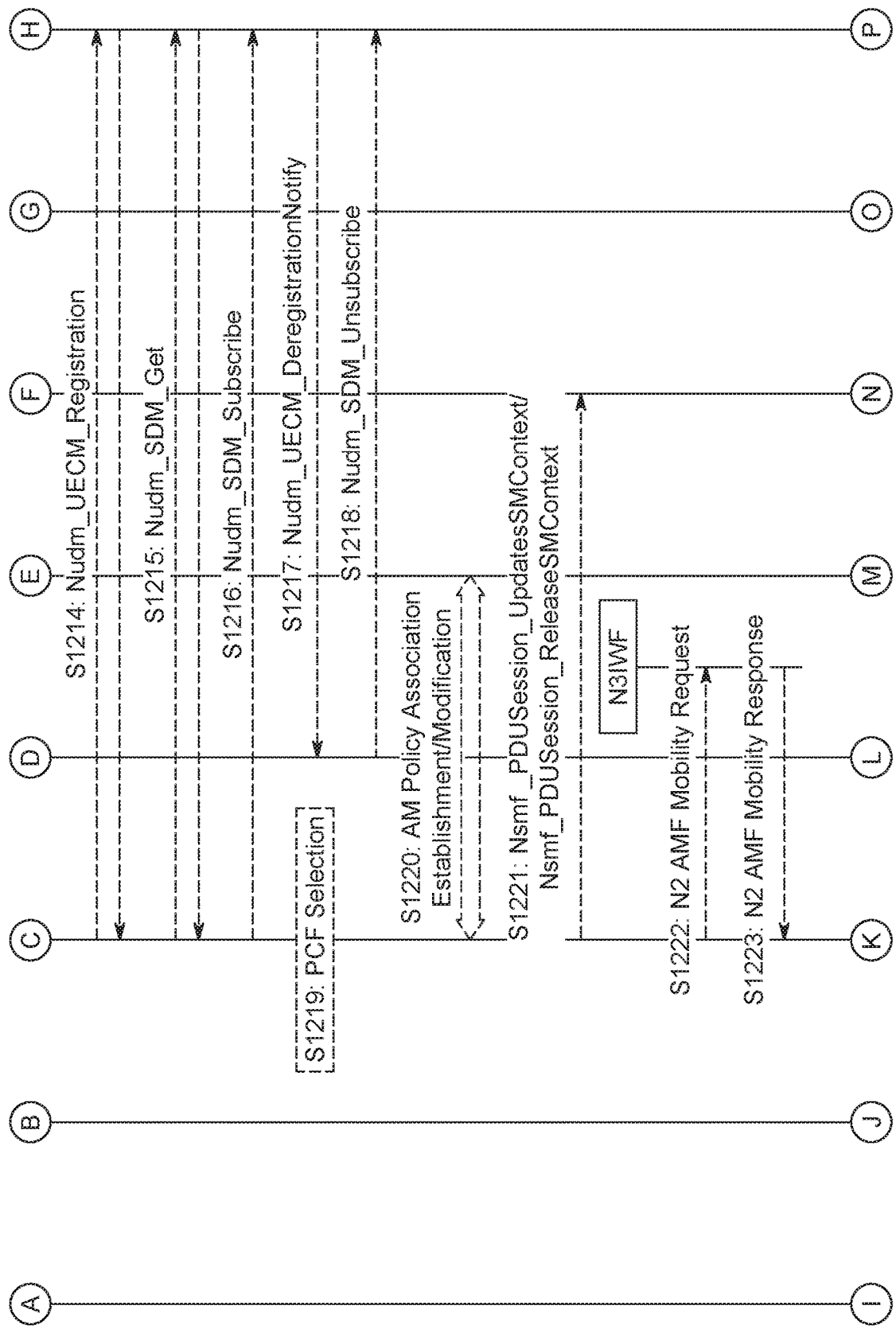
Figure 12C:
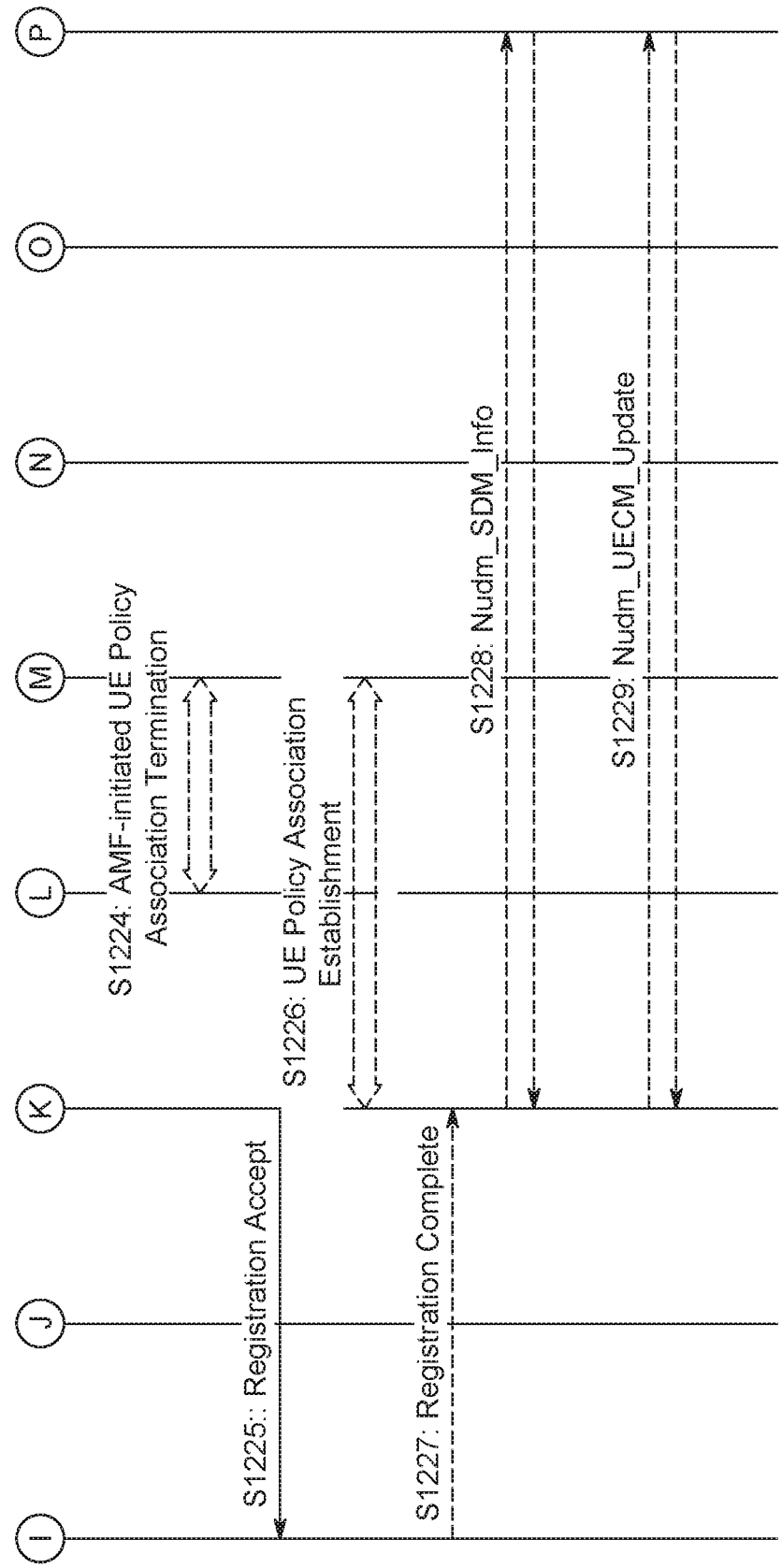

FIG. 12 (FIGS. 12A-12C) illustrates a general registration process where multi-hop relay can be assisted. The general registration procedure described in "5G; Procedures for the 5G System (3GPP TS 23.502 version 15.2.0 Release 15), herein "Release 15")" including section 4.2.2.2.2, is incorporated by reference herein in its entirety, and can be applied as described and as modified and described herein. Steps 1201-S1226 are described in Release 15. In an embodiment, registration of a UE can be enabled with the following procedures:
  Before forming or joining a multi-hop relay chain, a UE can indicate to network that it wants to enable the multi-hop relay capability, and what role (i.e., remote, intermediate, or relay UE) it wants to play. The network can decide to ask RAN node to configure the role for the UE. This information can be inserted in the registration request message in step S1201.

Assuming the UE initiates the registration procedure by directly communicating with the core network via a RAN node, e.g., UE 102 needs to provide the following information if it wants to act as a remote UE:

- The direction of relayed traffic, i.e., UL, DL, or both.
- Application service information, such as application ID and application service provider ID that is associated with the relay traffic
- Expected traffic characteristics, such as periodic traffic with start and end time, IP or non-IP type traffic
- QoS requirements for the relayed traffic, such as data rates and maximum tolerable latency
- Preferred Radio Access Technology (RAT), e.g., 5G NR, LTE radio, or non-3GPP access (e.g., satellite and WiFi). The UE can also indicate the precedence of each of possible RAT.
- Supported PC5 protocol stack: indicate the type of PC5 protocol stack it supports, such as LTE PC5, NR PC5 or both.
- Area information for relaying traffic: indicate an area where the relaying is expected to happen or indicate that the relaying is restricted only within the area. Out of the area, the UE can be able to directly connect to RAN node, or UE prefers direct connection with RAN node.

The UE (e.g., 701) needs to provide the following information if it wants to act as a relay UE or an intermediate UE:

- Relay capability, such as data rates and amount of data that can be relayed for remote UEs, schedule availability for the relay, relaying area (only UEs in the area can use this UE as a relay) or relaying range (indicating the maximum distance between this relay UE and any remote UE, buffering capability for the relay data, whether data aggregation is supported for UL (Uplink), DL (Downlink) or both directions)
- Application service information, such as application ID and application service provider ID, indicating what application and service traffic can be relayed by this relay UE
- Maximum number of remote UEs and/or intermediate UEs that can connect to this relay UE
- Available RAT for relay, such as 3GPP access or non-3GPP access.
- Supported PC5 protocol stack: indicate the type of PC5 protocol stack it supports, such as LTE PC5, NR PC5 or both.
- Discovery assistance information, such as supported discovery mechanism (e.g., LTE PC5 discovery, NR PC5 discovery, network assisted discovery, model A and model B discovery, etc.), group discovery is supported or not, whether time synchronization is required among UEs in the relay chain or is required only between the relay UE and a UE in the relay chain, whether data communication is allowed between any 2 UEs in the relay chain or only between a UE and relay UE.
- If the UE is to operate as a relay UE, the UE needs to provide some more information about the overall relay chain, such as maximum number of UEs in a relay chain, broadcast/multicast capability, maximum area the relay chain can cover. In addition, the relay UE can indicate whether it supports or requires distributed relay chain management.
- Registration/connection management capability, indicating if the relay UE can manage the registration status or connection status of a remote UE, or if a UE has to attach to network, i.e., the UE supports layer 3 relay, layer 2 relay or both.

In addition, regardless of its intended role (i.e., remote/relay/intermediate UE), a UE can include a UE policy container in the registration request message. Specifically, a policy section ID (PSD) can be included and used to identify the type of a policy, so that network knows the UE is requesting the multi-hop relay policy. In addition, an indication is included to indicate that the UE supports multi-hop relay policy. This can trigger the network to create/update UE policy association in later steps, and then PCF (Policy Control Function) can determine and send a multi-hop relay policy to the UE.

The UE can provide the above information in the registration request message (i.e., step S1201), or provide part of information in step S1201, and provides additional information in the continued interaction with the network such as step S1227 based on request from the network.

After the AMF receives the UE policy container information, it triggers UE policy association establishment/modification procedure with the PCF 184 depending on whether this is initial registration or registration update procedure. In step S1219, AMF needs to consider whether a PCF is able to select and provide the multi-hop relay policy during the PCF selection process. AMF invokes Npcf_U-EPolicyControl service with Create or Update operation to request PCF to determine the multi-hop relay policy for UE. AMF can perform this in step S1226. Alternatively, AMF) can decide to initiate UE policy association establishment/modification along with step S1220.

PCF will determine a multi-hop relay policy as a result of Npcf_UEPolicyControl service initiated by AMF. The policy can be sent to UE on top of NAS connection that is established between UE and AMF as the result of the registration procedure, i.e., step S1225.

Table 1 lists some information that could be included in a multi-hop relay policy, where a multi-hop relay policy could be classified into several categories: registration management (RM) related, connection management (CM) related, multi-hop relay chain formation and maintenance related.

TABLE 1

Multi-hop Relay Policy

| Category | Information name | Description |
| --- | --- | --- |
| | policy ID | Used to identify a multi-hop relay policy within core network and UE |
| | Reference ID | Used as a reference to a multi-hop relay policy |
| RM (Radio Management) related | Registration update option | Indicate how the registration update can be done, i.e., UEs in the relay chain has to do that with AMF, or relay UE can do that on behalf of the UEs in the relay chain. More detailed discussion is described herein. |
| | PC5 registration update option | Indicate if remote UE can do registration update over PC5 with relay UE, and then relay UE reports to network. More detailed discussion is described herein. |
| CM (Connection Management) related | Paging strategy | Indicate how paging is done, e.g., relay UE listens to paging for all UEs in a relay chain, and all UEs in the relay chain will have the same DRX cycle. More detailed discussion is described herein. |
| | N2 configuration option | Indicate whether network will setup a N2 connection for each UE in the relay chain, or only one N2 connection is established and shared by UEs. More detailed discussion is described herein. |

TABLE 1-continued

Multi-hop Relay Policy

| Category | Information name | Description |
|---|---|---|
| Multi-hop relay chain formation and maintenance related | Max number of UEs | Indicate the maximum number of UEs allowed in a relay chain |
| | Hop limits | Indicate the maximum number of hops allowed in a relay chain from a remote UE to RAN (Radio Access Network) node |
| | Role configuration | Indicate whether the network, RAN node or relay UE is responsible for configuring the role for a UE in the relay chain. The role configuration responsibility could be given to multiple entities. |
| | Broadcast/multicast support | Indicate whether broadcast/multicast communication support is required |
| | Dynamic change of relay UE | Indicate whether the relay UE of a relay chain can be dynamically changed during the operation |
| | Distributed relay chain management | Indicate whether the relay UE can manage the relay chain in a distributed manner without network interaction. E.g., independently decide if allow a UE to join the relay chain |
| | Session and service continuity (SSC) mode | Indicate SSC mode that is provided for UEs in the relay chain |
| | DNNs | Indicate the data networks that is associated with traffic relay by the relay chain |
| | Area information | Indicate the area information where the UEs can join the relay chain |
| | Supported PC5 protocol stack | Indicate the supported PC5 protocol stack, i.e., such as LTE PC5, NR PC5 or both |
| | QoS of relayed traffic | Indicate some QoS parameters for the relayed traffic, such as max data rate, max tolerable latency |
| | Data aggregation | Indicate whether data from/to UEs in the relay chain can be aggregated |
| | Failsafe timer | Timer used by an intermediate UE or a remote UE that if it cannot reach an upstream UE in the relay chain before the timer expires, the UE will initiate the process to recover the relay chain by either connecting to another upstream UE or a RAN node. |
| | Max number of relay UE/intermediate UE that a UE can connect | Indicate the maximum number of relay/intermediate UEs that a UE can connect to reach the network. In other words, this implies the number of relay chain a UE can join |

Indirect Registration Via a Relay UE

FIG. 12 (FIGS. 12A-12C) shows a remote UE 102, wherein information originates from the remote UE 102. In another embodiment, FIG. 12 (FIGS. 12A-12C) can have the UE 102 be replaced by a relay UE 701. For easier understanding, FIG. 12 (FIGS. 12A-12C) shows UE 102 as identified, however any UE, remote, intermediate, or relay, can be substituted for UE 102.

The registration request can be sent by the UE in FIG. 12 (FIGS. 12A-12C) to originate from a remote UE 102, which cannot or determined not to directly contact the RAN node 105. In other words, the UE shown in FIG. 12 (FIGS. 12A-12C) can be a relay UE 701 which forwards the registration request message on behalf of a remote UE 102. Assuming that the relay UE 701 already completes its own registration process, and the same AMF will serve UEs in a multi-hop relay chain, the relay UE 701 needs to provide the following information when forwarding the registration request message received from the remote UE 102 in step S1201.

Relay UE ID, such as 5G Global Unique Temporary UE Identity (5G-GUTI), 5G globally unique Subscription Permanent Identifier (SUPI), 5G S-Temporary Mobile Subscription Identifier (S-TMSI): based on this information, network can create the association between the relay UE and the remote UE.

S-NSSAI(s) and Network Slice Instance (NSI) ID(s): identify the network slices and network slice instances that are assigned by the network to serve the relay UE during the registration. Note that in an embodiment it is desired that the network assigns the same network slice to serve the UEs in a relay chain, however, if this can't be achieved, the network can try to make sure that the same AMF is selected to serve UEs in the same relay chain.

Multi-hop relay policy ID, or reference ID to a multi-hop relay policy: based on the policy information, the network can determine a multi-hop relay policy for the remote UE. The policy can affect the multi-hop relay operation from various aspects, such as UEs' registration update, paging, session management, relay chain formation and management, etc.

Multi-hop relay chain ID if any: identify a multi-hop relay chain that the relay UE joins Relay capability of the relay UE, such as data rates and amount of data that can be relayed for remote UEs, schedule availability for the relay, relaying area (only UEs in the area can use this UE as a relay) or relaying range indicating the maximum distance between this relay UE and any remote UE, buffering capability for the relay data, whether data aggregation is supported for UL (Uplink), DL (Downlink) or both directions, Relay UE's registration management configuration: used by AMF to determine those configurations for the remote UE, such as registration area, and timer value for periodic registration update. The network can want to setup the same configuration for UEs joining the relay chain.

Relay UE's Discontinuous Reception (DRX) and paging configuration: used by AMF to decide DRX parameters and paging configuration for the remote UE, such as DRX cycle, paging options, paging timers.

When the AMF completes the registration procedure for the remote UE, it will return registration accept message (i.e., step S1225) to the relay UE (i.e., the UE shown in FIG. 12 (FIGS. 12A-12C)) via RAN node, and then the relay UE will forward the message to the remote UE over PC5 connection.

Multi-Hop Relay Chain Formation

When the UEs complete registration with the network, they are authorized to form or join a multi-hop relay chain. A UE can start the process to join a multi-hop relay chain by connecting to a relay UE or an intermediate UE to reach the core network. This section focuses on those procedures, which are always initiated by a UE that wants to connect to base station and core network via a relay UE or an intermediate UE. In general, the following processes can be performed:

Discovery: A UE needs to discover one or more UEs in proximity and select one of discovered UE as the relay/intermediate UE towards the network. In addition, UE can discover one or more existing relay chains during the discovery process.

PC5 link establishment: after selecting the relay/intermediate UE, the UE will request to establish a PC5 link New Information in PC5 Discovery for Relay Selection This following describes what information can be used in PC5 discovery process for enabling multi-hop relay selection. The PC5 discovery procedures described herein can be re-used to discover relay/intermediate UE and/or any existing multi-hop relay chain. The following new information can be included in the discovery procedure in the context of multi-hop relay:

UE ID: If either UE has completed the registration, this is the ID that is assigned by network, such as 5G-S-TMSI and 5G-GUTI.

Layer 2 link ID: This is ID used for ProSe PC5 communication

Multi-hop relay chain ID: If a UE has joined or been assigned a relay chain, it can include this ID in the discovery message, so that other UE that is looking for relay/intermediate UE is able to identify and request to join the existing multi-hop relay chain.

Supported PC5 protocol stack: indicate the type of PC5 interface the UE supports, i.e., LTE PC5, NR PC5 or both.

Multi-hop relay policy ID: This can be the policy applied to the relay chain (identified by multi-hop relay chain ID) that the UE has joined. The UE can insert this information into the discovery message. Even if the UE has not joined any relay chain but is authorized during the registration by network to act a potential intermediate or relay UE, it can also insert this information into discovery message. This can be helpful for a UE that is out of coverage, since the UE can establish PC5 link before registering with network.

With the discovered information, a UE can select a relay/intermediate UE and a multi-hop relay chain by considering the following factors:

Application/service type

Location information

Supported PC5 protocol stack

Method of Establishing PC5 Connection to Join/Form Multi-Hop Relay Chain

The following describes mechanisms for a remote UE to join or form a multi-hop relay chain. It can be assumed that the relay UE has registered with the network regardless of whether a multi-hop relay chain has been formed or not. A multi-hop relay chain ID can be assigned by network, base station or relay UE when the relay chain is formed.

Figure 13:
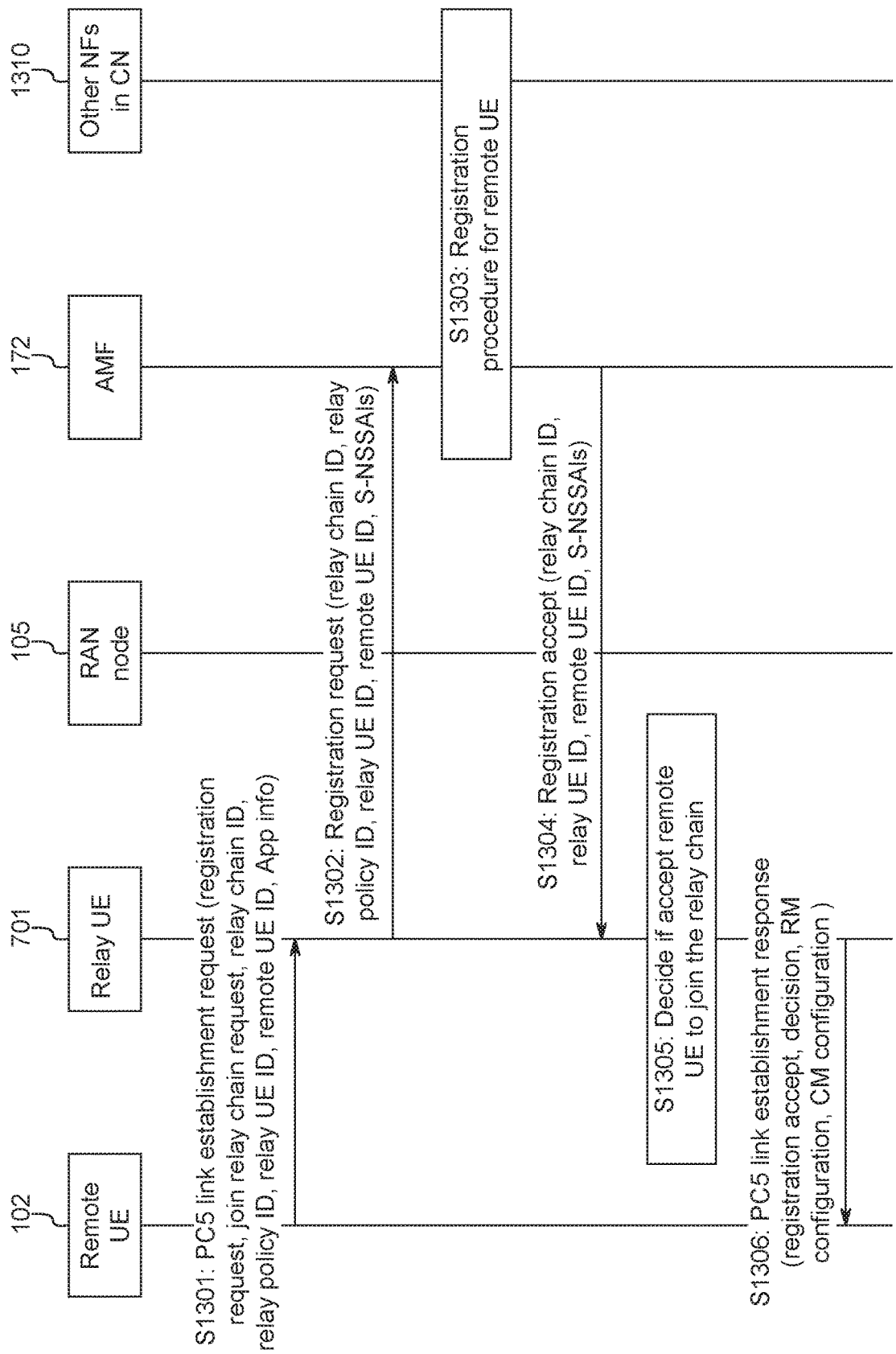
FIG. 13 illustrates a procedure where registration can be performed first in accordance with an exemplary embodiment.
Figure 14:
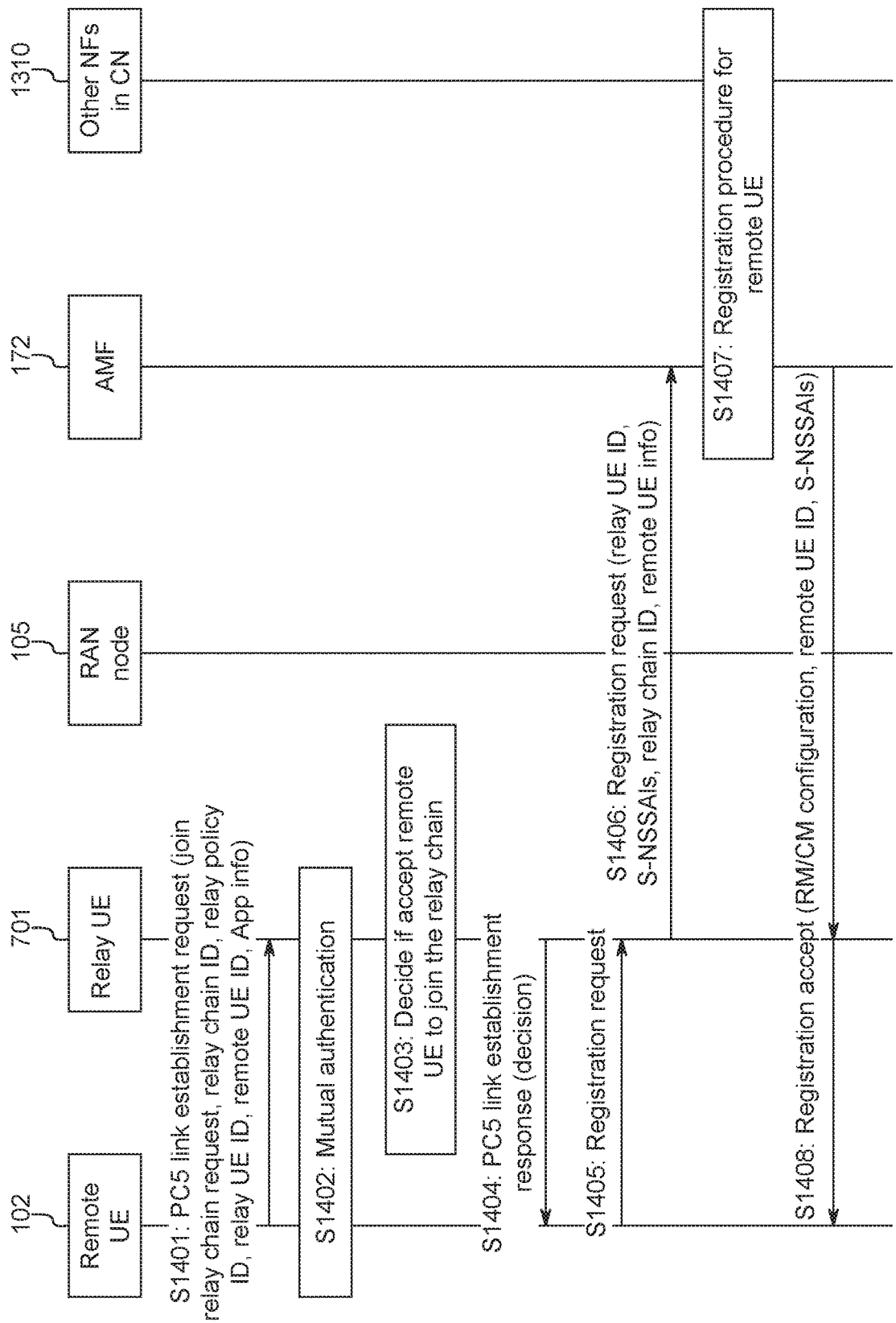
FIG. 14 illustrates a procedure wherein a PC5 link is established first in accordance with an exemplary embodiment.

Regarding joining an existing relay chain, During the discovery procedure, a UE can discover an existing multi-hop relay chain and one or more UEs in proximity. The UE will initiate PC5 link establishment procedure to connect to the selected UE and join the multi-hop relay chain. There are 2 scenarios to consider:

1. The remote UE has not registered with the network: in this case, the remote UE sends registration request together with the PC5 link establishment request, and the relay UE can forward the registration request to network. There could be 2 options:
   a. Therefore, the registration is done by network first, and then PC5 link is established based on the configuration as a result of registration. FIG. 13 illustrates the procedure for this embodiment.
   b. The second option is to establish the PC5 link first, and registration is performed. FIG. 14 illustrates the procedure for this embodiment.

Figure 15:
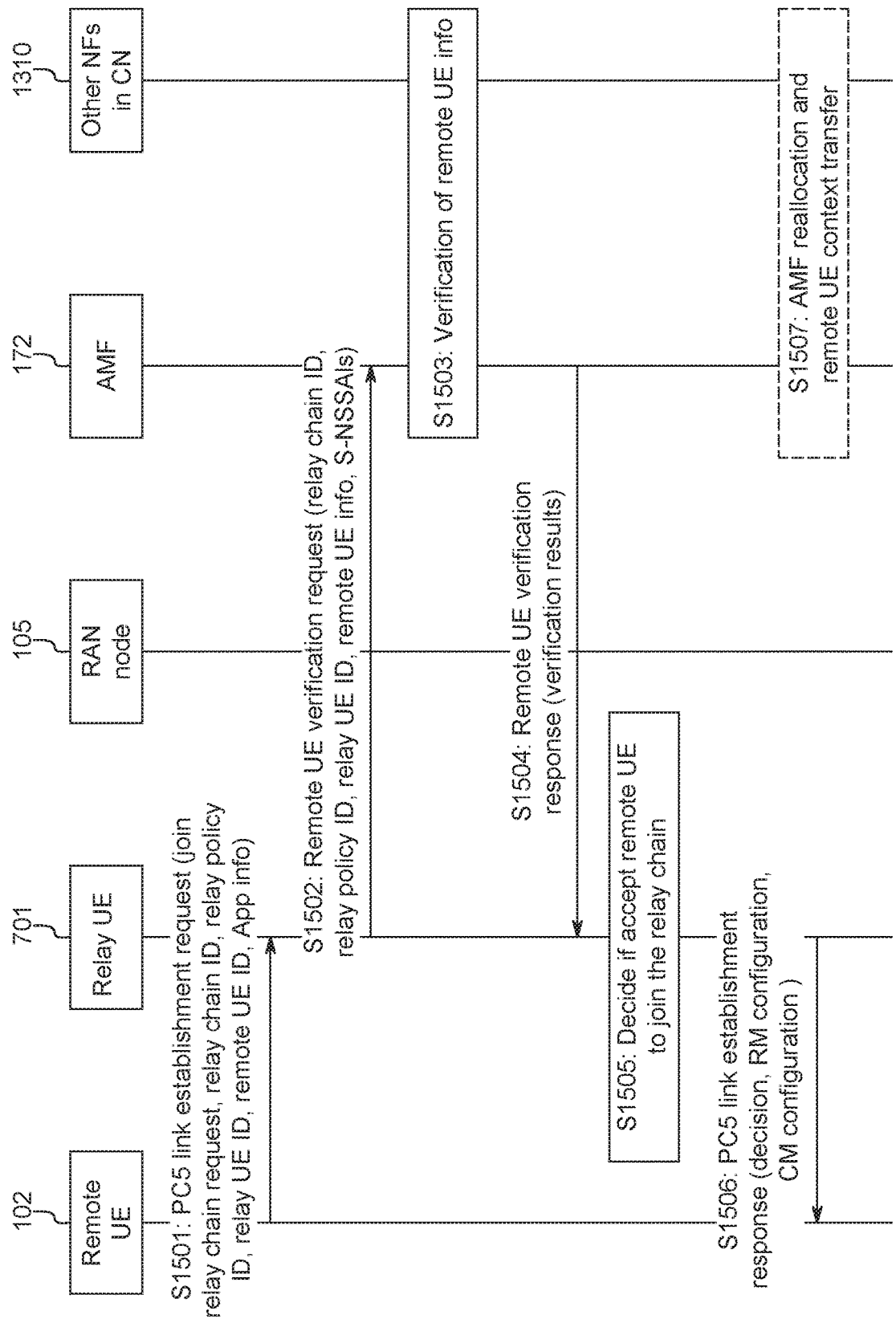
FIG. 15 illustrates a procedure of joining an existing relay chain in accordance with an exemplary embodiment.

2. The remote UE already registered with the network: FIG. 15 illustrates the procedure for this scenario embodiment.

FIG. 13 illustrates a procedure where registration is performed first with the assumptions that the relay UE 701 had already registered with the network and had been assigned a multi-hop relay chain ID.

Step S1301: Remote UE 102 sends a PC5 link establishment request to the selected relay UE 701 by including the following information:

Registration request is encapsulated. The registration request can include the information elements that are specified herein for enabling the multi-hop relay service.

A join relay chain request indicating that the remote UE wants to join the existing relay chain via the relay UE Relay chain ID that the remote UE discovered during the PC5 discovery procedure Relay policy ID: if remote UE has some pre-configured relay policy, it will send the policy ID to relay UE Relay UE ID: this could be the ID used during the PC5 discovery procedure, such as layer 2 ID, 5G-GUTI, 5G-SUPI and 5G-S-TMSI.

Remote UE ID: this is the layer 2 ID. Because remote UE has not registered with network, it does not have any network assigned UE IDs.

Application and service information: indicate the types of application service which the relay traffic is associated with, such as Application ID, Application service provider ID.

DNN: indicate which data network the traffic from the remote UE is relayed to

Step S1302: Since the figure illustrates the scenario that registration is performed first, relay UE 701 decapsulates the registration request and forwards the message to the served AMF 172. Relay UE 102 can append some more information to the remote UE's registration request as discussed in herein to facilitate the registration procedure at the AMF 172.

Step S1303: Upon receiving the registration request message, AMF 172 starts the regular registration procedure for the remote UE 102 by communicating with other NFs within the core network.

Step S1304: If the registration is successful, the AMF 172 returns the registration accept to the relay UE 701. The message can include remote UE IDs assigned by the network, S-NSSAIs assigned to serve the remote UE 102, relay UE ID and relay chain ID. Therefore, the AMF 172 and network knows that the remote UE 102 can be reached via the relay UE 701. AMF 172 can also return some policies the UE 102 needs to store, such as URSP and/or multi-hop relay policy depending on the role of the remote UE 102. In addition, AMF 172 can send some configuration about CM and RM operations, such as DRX cycle, paging options, and registration update timer value.

Step S1305: Once the relay UE 701 receives the registration accept message for the remote UE 102 from AMF 172, it will decide whether to allow the remote UE 102 to join the existing relay chain. The relay UE 701 can consider the following factors:

Its own relay capability as further described herein.

The relaying load of an existing relay chain, such as the number of UEs 102s that have already join the relay chain, total amount of relay traffic in terms of data rate.

configuration posed by the relay policy, such as max number of hops from the core RAN node 105.

Its power consumption and remaining battery level for relaying traffic by considering the traffic characteristic of the remote UE Operational characteristics such as DRX cycle, paging options, and registration update timer value of the Remote UE 102 are aligned with the Relay UE's 701.

Some security requirements from the remote UE 102 for the multi-hop relay communication, such as end-to-end encryption.

Note that the core network can help to make this decision. For example, the Network Data Analytics Function (NWDAF) in the core network can provide some analytics information such as load information in the relay chain and project the future traffic and mobility patterns for the UEs in the relay chain.

Step S1306: relay UE 701 sends PC5 link establishment response to the remote UE 102, which includes the registration accept message from the core network, and the decision whether remote UE 102 can join the relay chain. If remote UE 102 is accepted, relay UE 701 can send some more information about CM and RM configuration, such as registration update timer and paging operation options. If relay UE 701 refuses to accept remote UE 102 in the relay chain, it will forward the registration accept message, and notifies the remote UE 102 a rejection decision for joining the relay chain with the reason for the rejection in the response message.

It is possible that a remote UE 102 selects more than one relay UE 701 and sends its registration request to network through each of the relay UEs 701s. In other words, remote UE 102 requests to join multiple relay chain by sending PC5 link establishment request combined with the registration request and would expect registration accept from selected relay UEs 701s. In the response, PCF and relay UEs 701s can accept the remote UE into different relay chains and return the response with different multi-hop relay policy. In that case, different relay UEs 701s are served by different AMFs 172s, i.e., registration request is received by multiple AMFs 172s, the remote UE 102 will notify network by giving AMF ID and its UE ID to resolve the conflict when it receives multiple registration accept message.

FIG. 14 illustrates the procedure that PC5 link is established first with the assumptions that the relay UE registers with network and that a relay chain has been formed.

Step 1401: Remote UE 102 sends a PC5 link establishment request to the selected relay UE 701. This step is the same as step S1301 in FIG. 13. This figure illustrates the scenario that PC5 link is established first and mutual authentication is required since the remote UE 102 has not registered with the network.

Step S1402: Upon receiving the request, relay UE 701 decides whether to accept the remote UE's 102 request to join the relay chain, which is similar to step S1305 in FIG. 13.

Step S1403: Relay UE 701 returns the response to the remote UE 102 indicating if remote UE 102 is accepted to join the relay chain. In case that remote UE 102 joins the relay chain, a PC5 link is established, and the relay UE 701 can provide some information about the PC5 link to the remote UE 102, such as layer 2 ID, QoS parameters of the PC5 link, broadcast/multicast capability.

Step S1404: The PC5 link establishment decision is received by the remote UE 102.

Steps S1405-S1407: Remote UE 102 initiates the indirect registration process by sending the registration request message over the PC5 link to the relay UE 701 as has been further described herein, for example in the section describing registration illustrated by FIG. 12.

FIG. 15 illustrates the procedure of joining an existing relay chain by establishing a PC5 link with the assumptions that both UEs have completed registration with the network and that a relay chain has been formed.

Step S1501: remote UE 102 sends a PC5 link establishment request to the selected relay UE 701. In addition to the information discussed in Step S1301 of FIG. 13, remote UE 102 can include its UE ID assigned by network such as 5G-GUTI, 5G-S-TMSI and 5G-SUPI since it has already registered with the network. Moreover, remote UE 102 can provide some information about its RM/CM configuration, such as registration update timer, DRX cycle.

Note that mutual authentication is not necessary in this embodiment because both UEs 102 and 701 are authenticated and authorized by network during the registration process. The network-assigned UE ID (e.g., 5G-S-TMSI) and layer 2 ID for a UE can be used in the PC5 communication without any potential address conflict.

Step S1502: relay UE 701 sends a request to the serving AMF 172 to verify the remote UE 102, and optionally to retrieve information for making a determination of whether to accept the remote UE's 102 request to join the relay chain.

Step S1503: AMF 172 initiates the process within other NFs 1310 (e.g., UDM/UDR, NWDAF and PCF) to verify the remote UE 102 information and collect the information for the relay UE 701.

Step S1504: AMF '172 returns the results and the information to the relay UE 701.

Step S1505: once the relay UE 701 receives the response from AMF 172, it will decide whether to allow the remote UE 102 to join the existing relay chain.

Step S1506: relay UE 701 notifies the remote UE 102 of the decision. If remote UE 102 is accepted to join the relay chain, the PC5 link information is provided. The relay UE 701 can also send some information about CM and RM configuration updates since remote UE 102 will join the relay chain, which requires some coordination among UEs in the relay chain. In the case of non-acceptance, no PC5 link is established.

Step S1507: in case that the remote UE 102 and relay UE 701 are served by different AMFs, the serving AMF 172 will initiate the AMF re-allocation process and move the UE context. This is possible because the remote UE 102 and relay UE 701 registered with network individually before remote UE 102 wants to establish a PC5 link Note that FIGS. 13-15 show the 1-hop relay case, while the procedures are general and can be applied to multi-hop cases. In other words, the relay UE 102 could be an intermediate UE that forwards the message to another intermediate or relay UE 701 that manages the relay chain.

Regarding forming a new relay chain, if a UE does not find any existing relay chain during discovery, then the request to establish a PC5 connection can trigger the procedure of forming a new relay chain. Depending on the configuration (e.g., relay policy, network operator configuration), a relay UE 701 can communicate with core network and request to create a new relay chain with an assigned relay chain ID (network assisted relay chain formation), or without any assistance from the core network (distributed relay chain formation).

Figure 16A:
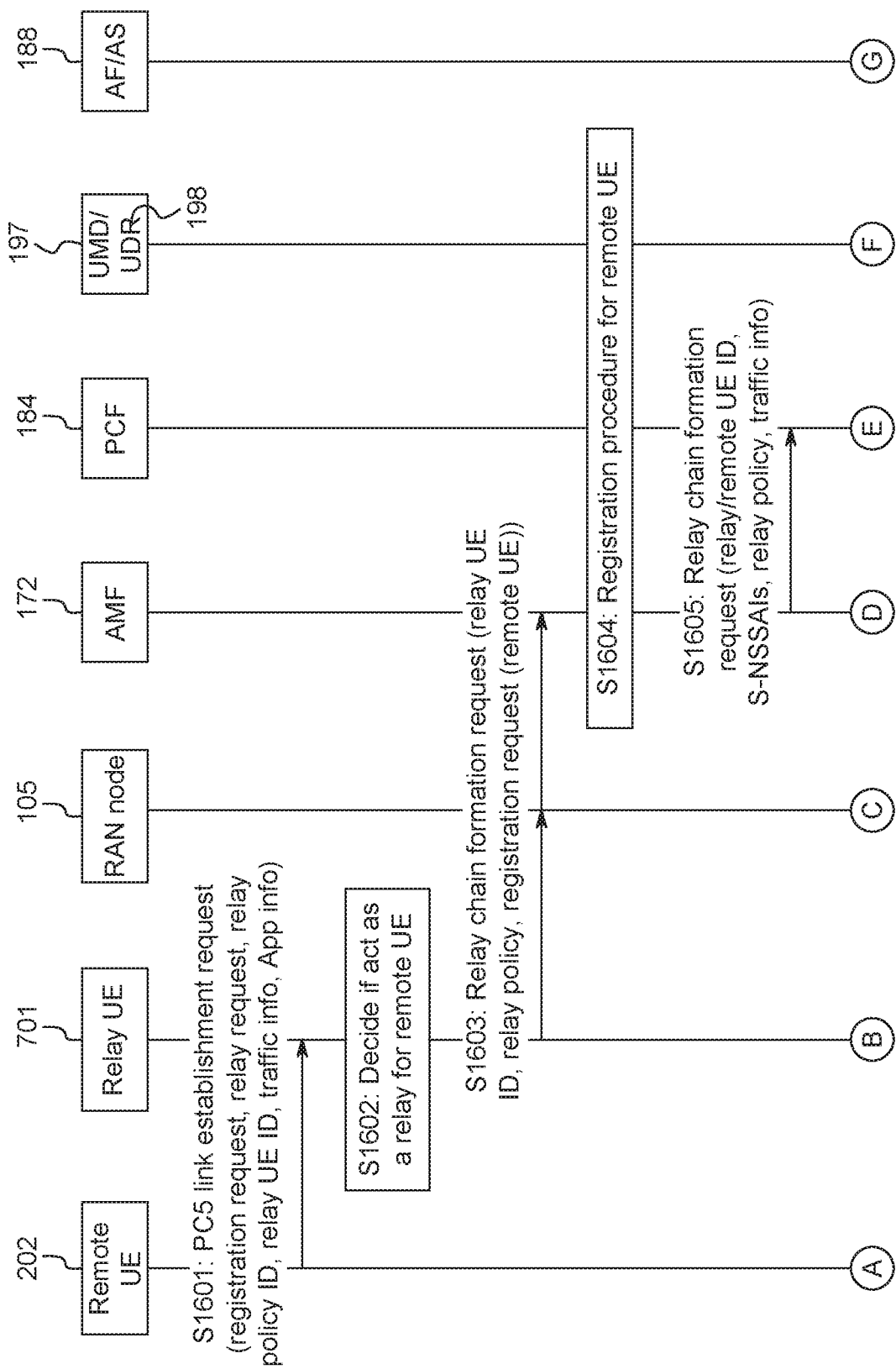
FIG. 16 (FIGS. 16A-16B) illustrates a procedure of network assisted relay chain formation in accordance with an exemplary embodiment.
Figure 16B:
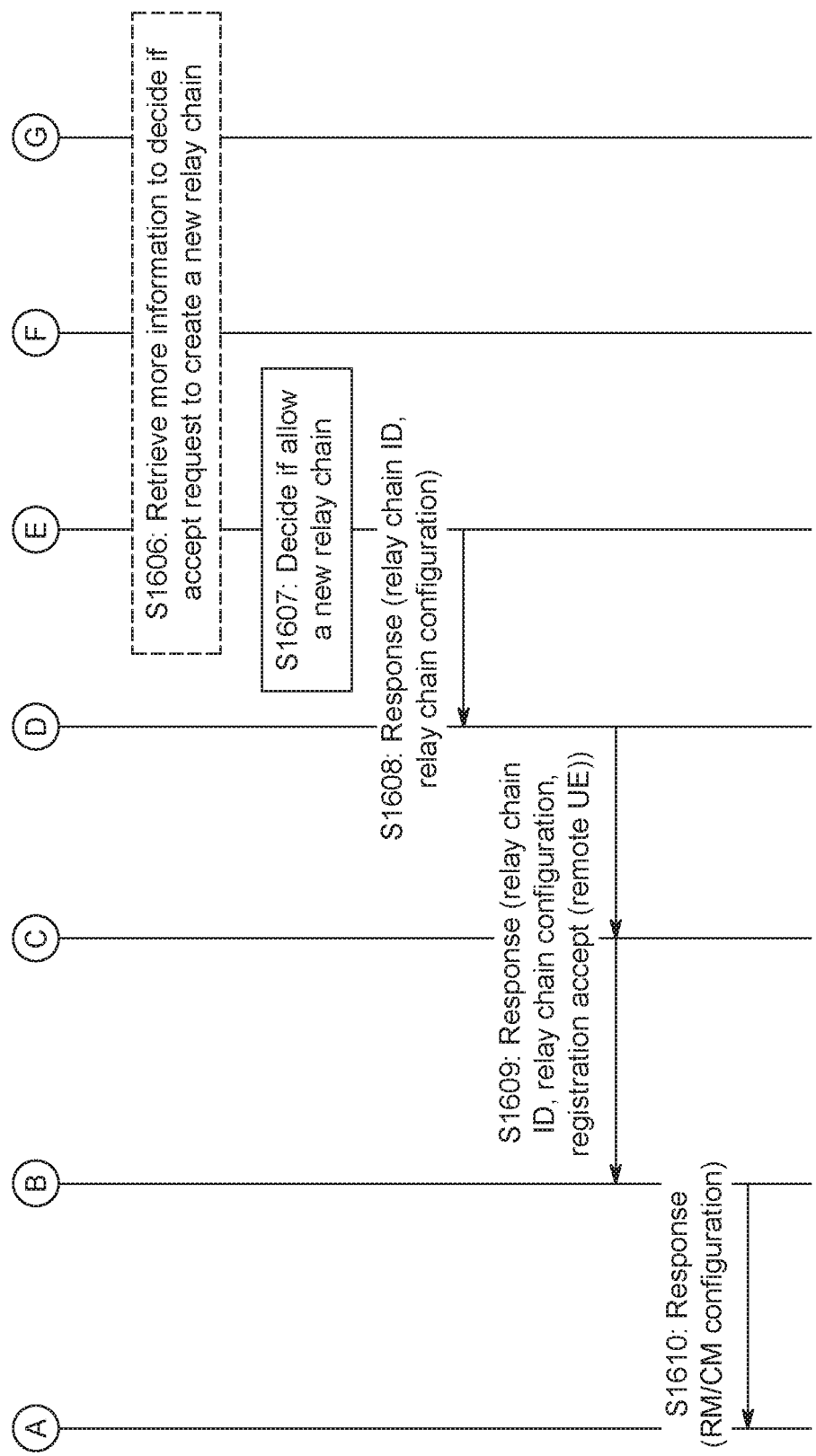

FIG. 16 (FIGS. 16A-16B) illustrates the procedure of network assisted relay chain formation triggered by the PC5 link establishment procedure, which is initiated by a remote UE. It is assumed that the remote UE has not register with the network yet.

Step S1601: A remote UE 102 sends PC5 link establishment request to the selected UE 701. In the request message, the remote UE 102 encapsulates the registration request and an indication to request the selected UE 701 to relay traffic for it. Some other information can be included, which is similar to those included in step S1301 of FIG. 13.

Step S1602: Once the selected UE 701 receives the request, it will first determine whether it wants to act as a relay for the remote UE 102. The relay UE 701 will consider several factors as discussed in Step S1305 of FIG. 13.

Step S1603: If relay UE 701 decides to relay traffic for the remote UE 102, the relay UE 701 forwards remote UE's registration request to its serving AMF 172 together with a message indicating that the relay UE 701 requests to establish a new relay chain. In the relay request, the relay UE 701 can include the following information:
- Relay UE ID and S-NSSAI assigned to serve the relay UE
- Relay UE's relay capability
- Relay policy ID or policy reference ID indicating the relay configuration and policy the relay UE is going to apply for the requested relay chain Step S1604: AMF 172 starts the registration process with other NFs for remote UE 102 and will get more remote UE information when the registration is done. For example, remote UE ID, subscription information.

Step S1605: AMF 172 sends PCF a relay chain formation request on behalf of the relay UE 701 by including several information, such as remote/relay UE information, relay policy ID, relay traffic characteristic and service/application ID.

Step S1606: Optionally, PCF contacts UDM/UDR and AF/AS to retrieve some subscription information of the UEs and service application related information. If AF/AS is not reachable directly, NEF can be involved.

Step S1607: Based on the information received from steps S1605 and S1606, PCF 184 makes decision if the relay UE 701 can form a new relay chain. At the same time, PCF 184 will determine some relay chain configuration, such as the max number of UEs in the relay chain, whether the relay UE 701 can be dynamically changed with or without notifying network, area information for relaying traffic, service application information involved in the relay (such as DNN, application ID, ASP ID), whether the relay UE 701 can manage the UEs in the relay chain in a distribute manner, registration update timer, DRX cycle, whether UEs in the relay chain need to have the same time period for DRX or registration update, etc.

Step S1608: PCF 184 returns the decision and configuration parameters in a response to AMF 172, where AMF 172 will associate the remote/relay UE together with relay chain ID.

Step S1609: AMF 172 sends the response to relay UE 701 with the above information along with the registration accept for the remote UE 102.

Step S1610: Relay UE 701 forwards the registration accept to remote UE 102 as well as some relay chain related configuration information.

It should be appreciated that FIGS. 13-16 assume that the same AMF serves both remote and relay UEs. It is possible that UEs are served by different AMFs if UEs completed registration individually before joining or forming a new relay chain. In this scenario, AMF re-allocation process can be performed by moving all the UEs' context to one AMF, which serves all the UEs in the relay chain. This could make relay operation more efficient and reduce unnecessary signaling among AMFs.

Additionally, in the case that PCF rejects the request to form a new relay chain, it can indicate the reason (e.g., relay UE 701 is overloaded, policy conflict, AS providers does not allow this), and figure out an alternative way for the remote UE 102 to reach the AF/AS through core network, such as selecting another relay UE 701 or direct the remote UE 102 to a non-3GPP access to reach the core network.

In order to enable the distributed relay chain formation, the relay UE 701 can get authentication and authorization from core network to do so. This could be done during registration or registration update process for the relay UE 701. PCF 184 can determine to what extent the relay UE 701 can manage the relay chain. For example, relay UE 701 can add or remove any UE to or from the relay chain but is not allowed to form any additional relay chain. PCF 184 can also select and send a multi-hop relay policy to the relay UE 701. Moreover, network can require relay UE 701 to perform periodic update about the relay chain status with the network. The relay chain ID can be assigned by the network. In case that relay UE 701 is out of coverage when it is necessary to form a new relay chain, the relay UE 701 will follow the multi-hop relay policy to allocate a relay chain ID, and report to network when possible. The multi-hop relay policy can be pre-configured as default policy for this case.

Multi-Hop Relay Chain Maintenance

When an intermediate UE in the middle of a multi-hop relay chain is turned off or moves away, other remaining UEs in the relay chain or the network need to find/form an alternative relay path for those UEs to reach the network. This is especially critical for UEs which have ongoing traffic to/from the network. In other words, it is expected to provide the service continuity for those UEs. This section present example embodiments of methods to address how the UEs in the relay chain and the network can adapt to the multi-hop relay chain interruption, and how to find a new relay path for those affected UEs.

Figure 17:
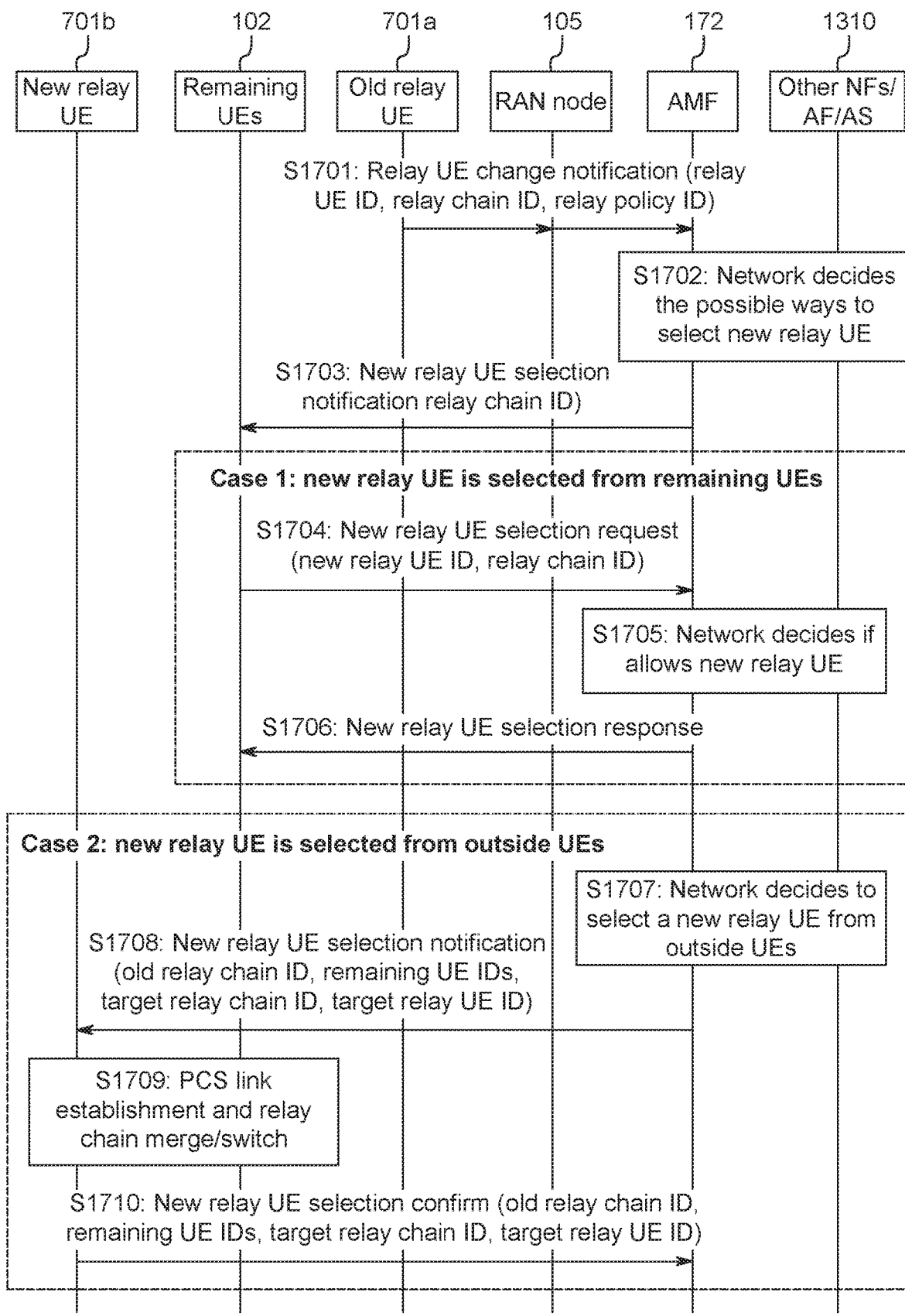
FIG. 17 illustrates a procedure of selecting a new relay UE in accordance with an exemplary embodiment.

Specifically, different solutions can be applied for different scenarios as follows:
- Relay UE 701 is not changed: In this case, only UE in the middle of the relay chain (e.g., intermediate UE) changes, so the relay UE 701 can re-organize the relay chain by sending PC5 link establishment message to connect the remaining UEs. Depending on the multi-hop relay policy, relay UE 701 can perform this re-organization of relay chain without any interaction with the network. If policy requires some interaction with the network, the relay UE 701 can send a message to AMF 172 and PCF 184 so that network functions can participate in the decision-making process and notify the relay UE 701 whether it is allowed to do so. In the end, the relay UE 701 needs to notify the AMF 172 and PCF 184 about the new structure of the multi-hop relay chain, so that network knows which UE is reachable through which relay chain.
- Relay UE 701 is changed: This is more complicated since a new relay UE 701 needs to be selected by the network, base station or the remaining UEs. In addition, the new relay UE 701 can be selected from the remaining UEs in the relay chain, or from a set of outside UEs. FIG. 17 illustrates the procedure that a new relay UE is selected, where 2 cases are illustrated:
  - A new relay UE is selected from the remaining UEs that are a part of the relay chain.
  - A new relay UE is selected from outside UEs that are not a part of the relay chain. In this case, the new relay UE could be a relay UE of another relay chain, or a regular UE does not participate in any relay activity.

FIG. 17 illustrates the following steps:

Step S1701: the old relay UE 701a notifies the AMF 172 and other core network functions that it will not be the relay UE 701 for the relay chain anymore. The notification message includes the relay UE ID, relay chain ID, and relay policy ID. Optionally, the relay UE 701a can include a timer indicating the remaining time period it acts as a relay, and application/service information related to the relayed traffic.

Step S1702: AMF 172 and other NFs (e.g., PCF, UDM/UDR, NWDAF) decides the possible ways to select a new relay UE 701b based on multi-hop relay policy, subscription information of remaining UEs. Optionally, AF 1310 and application server (i.e., AS) can be contacted for some application service information regarding the relay UE selection.

Step S1703: AMF 172 sends notification message to the remaining UEs via old relay UE 701a with relay chain ID and optional application service information. If the old relay UE indicates the remaining time that it can serve as relay UE in step S1701, AMF 172 can also include this time value. Moreover, AMF 172 can indicate that a new relay UE 701b is expected. AMF 172 can also include a list of UE IDs among the remaining UEs that could act as the relay UE 701.

Step S1704: In case that a UE from the remaining UEs is selected or can serve as the relay UE, it will send the request message to AMF 172 to become the new relay UE 701b. In the request, the UE ID and its relay capability are included. Specific information in the relay capability is further described herein.

Step S1705: Upon receiving the request from the new relay UE 701b, network will decide if to accept the request.

Step S1706: AMF 172 returns the response to the UE that sends the request message in step S1704 by indicating whether the request to act as the new relay UE is accepted. If the new relay UE 701b is accepted, the AMF 172 will include a list of UE IDs that remain in the relay chain, and some other configurations, such as RM/CM parameters, whether the relay UE 701 can perform certain relay chain management in a distributed manner Step S1707: In case that network does not receive any new relay UE request from the remaining UEs, and after a pre-configured time period, network can decide that a new relay UE should be selected from outside UEs. Therefore, network functions (e.g., AMF, PCF, UDM/UDR and NWDAF) will coordinate with each other to come up a list of UEs that could be new relay UE 701b candidate. Then AMF 172 sends the message to the newly selected relay UE. AMF 172 can include the following information in the message: remaining UE IDs, target relay chain ID (in case that the new relay UE acts as the relay UE of another relay chain), target relay UE (i.e., new relay UE) ID, old relay chain ID, and old relay policy ID. With this information, the new relay UE 701b can help the remaining UE to switch from the old relay chain to a new relay chain. Effectively, the old relay chain is merged into the relay chain that the new relay UE serves.

Step S1708: The new relay UE 701b initiates PC5 link establishment procedure with those remaining UEs. If the new relay UE 701b already acts as a relay UE 701 for another relay chain identified by the target relay chain ID, then the old relay chain is merged with the target relay chain effectively S1709.

Step S1710: New relay UE 701b sends confirmation to AMF 172 to notify that all the remaining UEs have successfully switch to the new relay UE 701b and can be reached via the new relay UE 701b. AMF 172 and other network functions will create the association between new relay UE 701b and those UEs.

Alternatively, the network or RAN node 105 can allow a UE to join multiple relay chains by connecting to multiple relay UEs 701s. When the main relay chain breaks up, the remote UE 102 can redirect its traffic via those back up relay UEs without any service interruption.

Registration and Connection Management for UEs in a Multi-Hop Relay Chain

The following description presents example embodiments of methods of configuring registration management (RM) and connection management (CM) for UEs in a relay chain, and how these RM/CM procedures are performed. Based on the multi-hop relay policy, a network can decide to update the RM/CM configuration of the UEs in a relay chain for better coordination and simple operation, such as the paging options, power saving cycle, and registration update timer. This can be triggered by one of the following events:

One or more UEs join or leave an existing relay chain

A new relay chain is formed

A UE in the relay chain requests to update certain CM/RM parameters

Figure 18:
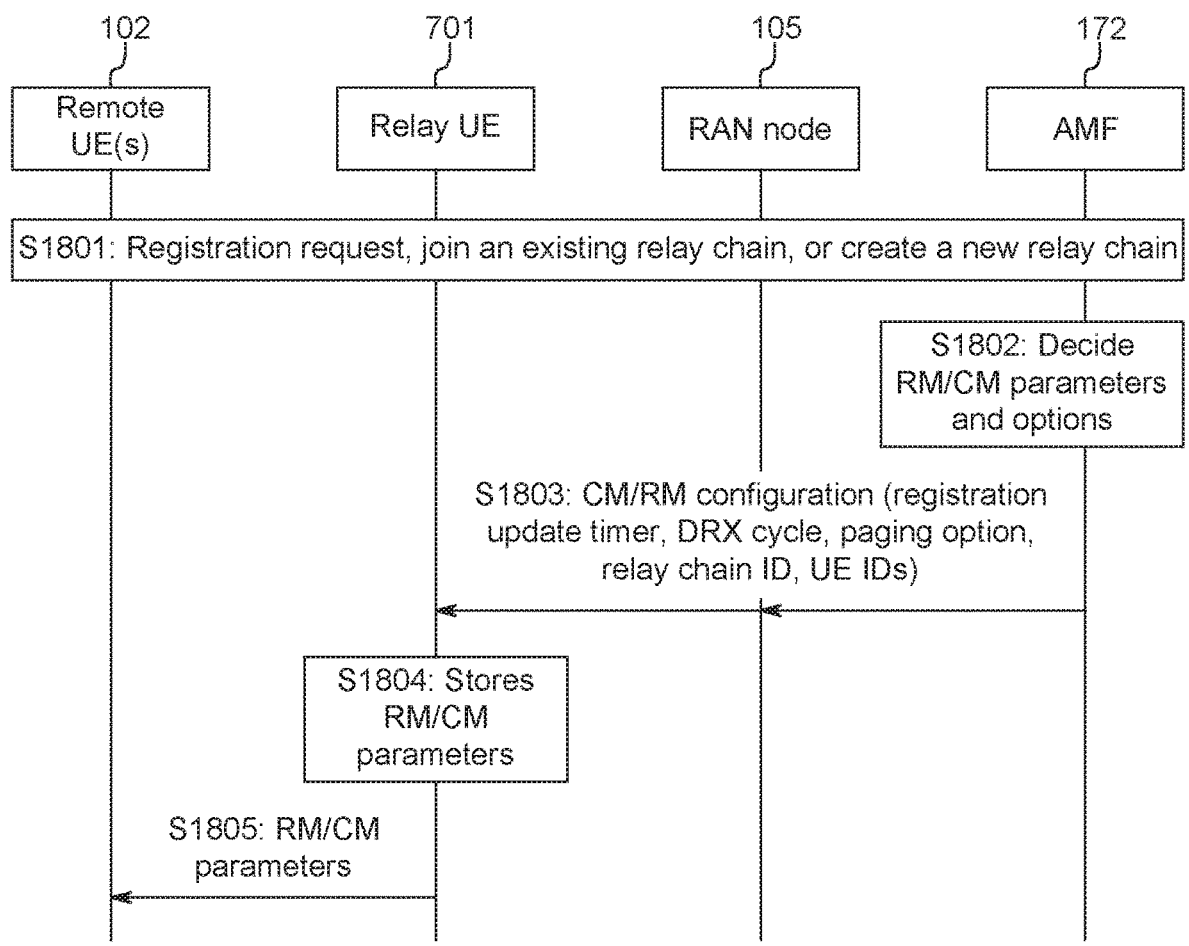
FIG. 18 illustrates a procedure wherein AMF sets up RM/CM configuration for UEs in a relay chain in accordance with an exemplary embodiment.

Application server or application service provider that the relayed traffic is associated with requests to do so FIG. 18 illustrates an example embodiment procedure wherein AMF 172 can set up RM/CM configuration for UEs in a relay chain.

Step S1801: As discussed above, when one of the triggering events takes place, the AMF 172 can be requested to update the configuration for connection management and registration management operation. When the request is forwarded to AMF 172, the relay chain ID is included so that AMF 172 knows which UEs are involved.

Step S1802: AMF 172 decides the options and parameters for CM/RM based on the relay chain ID and the UE contexts it stores. AMF 172 can contact other NFs to get more information, such as subscription information of UEs from UDM/UDR, relay policy applied to the relay chain from PCF, session management information from SMF, and some analytics data generated by NWDAF.

Step S1803: AMF 172 sends the latest configuration to relay UE 701 via the RAN node. The configuration update can include the parameters for registration update timer and DRX cycle. In addition, the relay chain ID can be included as well as relay UE ID. Optionally, the AMF 172 can specify some other UE IDS that join the relay chain, and the relay UE 701 can forward the configuration update to those UEs. If AMF 172 does not include any specific UEs other than relay UE 701, it can be assumed by default that every UE in the relay will update the configuration.

Step S1804: Relay UE 701 can store these connection management and registration management configuration parameters.

Step S1805: Relay UE 701 sends these configurations to all UEs in the relay chain, or a set of UEs based on UE IDs specified in the message transferred in step S1803.

The procedure shown in FIG. 18 can be performed together with several core network procedures, such as UE Configuration Update, Service Request, and Registration Update.

Paging Multiple UEs in a Relay Chain Over N2

According to multi-hop relay policy, network or relay UE 701 can decide to set up the same paging cycle or paging timer for the UEs in the relay chain for simple operation. In other words, those UEs 102s will listen to the paging message at approximately the same time, and the relay UE 701 will forward the paging message to respective downstream UEs.

There are two embodiments described herein of options for AMF 172 to send the N2 paging message to the RAN node 105 targeted at one or more UEs in a relay chain:

1. A group based N2 message transfer: Only one N2 connection is established between AMF 172 and RAN node 105 for the relay UE 701 and all other UEs in the relay chain. In other words, AMF 172 does not create a N2 connection for each UE in the relay chain. Instead, the N2 connection between AMF 172 and RAN node 105 for the relay UE 701 can be shared for transferring any N2 message to the UEs in the relay chain. Since a UE in a relay chain is required to register with network, the UE ID (e.g., 5G-GUTI, 5G-S-TMSI, SUPI) and relay chain ID can be used to identify the target destination UE in a N2 message. In the scenario that network determines to page all the UEs in a relay chain, AMF 172 can insert the relay chain ID into the N2 paging message, and the relay UE 701 can broadcast the paging message to UEs over PC5 link. If AMF determines to page a specific UE or a set of UEs in the relay chain, AMF 172 would include the relay chain ID along with individual UE IDs in the N2 paging message, so that the relay UE 701 and the intermediate UE knows which UE the target destination is. For UL N2 message transfer, individual remote UE 102 or intermediate UE 102 is transparent to the N2 message transfer, since they do not have direct connection with RAN node 105. Therefore, the proposed group based N2 message transfer is only for DL. In addition, AMF 172 can indicate why a UE is paged in the N2 paging message, such as DL data arrival, UE configuration update needed, or expected change in the relay chain. In case that a remote UE 102 can be reached via multiple relay UEs (i.e., the remote UE is involved in multiple relay chains), the AMF 172 will decide which relay UE 701 to forward the paging message to the remote UE 102 by considering different factors, such as number of hops between relay UE 701 and remote UE 102, DRX cycle of relay UE, relay UE's relay capability. AMF 172 would include the relay chain ID and UE ID in the paging message when sending the N2 paging message to the selected relay UE.
2. AMF 172 creates one N2 connection for each UE in the relay chain and use the individual N2 identifier in the message sent to the RAN node 105. In case that AMF 172 wants to page multiple UEs in a relay chain at one, AMF 172 needs to include each corresponding N2 identifier of UE in the N2 message sent to RAN node 105.

In an embodiment, relay UE 701 listens to the paging message on behalf of UEs in the relay chain. Specifically, relay UE 701 can get the remote UE IDs such as 5G SUPI, S-TMSI, so that it is able to calculate paging occasions of the remote UE 102 and monitor the paging message for remote UE 102. Relay UE 701 can derive this information from remote UE 102 when establishing PC5 link, or from network when the network accepts remote UE 102 to join the relay chain, or when remote UE 102 performs the indirect registration via the relay UE 701. Once it receives the paging message, it will find out which specific UEs are paged and forward the paging message to each UE over PC5 link Registration Update with Relay UE Over PC5

The following describes an example embodiment wherein the remote UE 102 can perform the registration update procedure by sending the request message to the relay UE 701, and then relay UE 701 will report the registration update status of one or more UEs to network at a pre-configured time. Usually, when registration update timer expires, the UE will initiate registration update procedures by sending the request message to AMF 172 over NAS connection. In the context of multi-hop relay, before the timer expires, it the remote UE 102 can alternatively choose to send the request message to the relay UE 701 over the PC5 link. This can help to reduce the signaling overhead for the cases that there is not any change or any new requests from the remote UE 102.

The relay UE 701 can report to AMF 172 when its own registration update procedure is performed, or at a pre-configured time. For example, remote UE 102 can specify a time instant along with the registration update message that relay UE 701 reports to AMF 172 when the remote UE 102 wakes up and is available to receive any control message or user data. Core network can configure the relay UE 701 that report any registration update on behalf of UEs in the relay chain when the relay UE 701 initiates its own registration update procedure. This effectively implies that the registration update process is aggregated by the relay UE 701, and relay UE 701 reports to network at once.

Alternatively, relay UE 701 or the core network can decide that the relay UE 701 can do the registration update for all the UEs or some UEs in the relay chain led by the relay UE. Therefore, the relay UE 701 and the corresponding remote UEs 102s can perform some PC5 procedures for registration update purpose at the configured time, and relay UE 701 can report the registration update status to core network on behalf of those UEs at the configured time point. Note that the two time points can be different, and not necessarily sequential.

The remote UE 102 can include the following information in the registration update message sent to the relay UE 701 over PC5 link:

Remote UE ID

Registration update timer: if relay UE will report the registration update status of remote UE to network, remote UE will tell the relay UE its timer, so that the relay UE can let network know the remote UE's registration status in time.

Any status update of the remote UE

Any request to change the network configuration at remote UE

Remote UE 102 can choose to use PC5 control plane or user plane to send the registration update request message. If the control plane is used, the regular control message is transferred with type setting to the registration update request. If the user plane is used, the registration update request can be encapsulated in a regular data message, and remote UE indicates to relay UE that the registration update request is encapsulated as payload.

Core network functions (e.g., AMF, PCF) can enable/disable this feature by configuring the multi-hop relay policy and the registration management configuration at the time that the remote UE 102 joins the relay chain or when the relay chain was formed. For example, the AMF 172 can indicate to the remote UE 102 and relay UE 701 whether remote UE 102 is allowed to do registration update with relay UE over PC5, and specify some conditions, for example, only when there is no status change and no request from remote UE 102. In addition, AMF 172 can assign 2 different timers to the remote UE 102, which are used for registration update with relay UE 701 and AMF 172 respectively. Alternative, core network can assign 1 timer regardless of the way the remote UE 102 determined.

Core network can do this configuration through various procedures, such as registration, service request, and UE configuration update procedures.

User Interface

Figure 19:
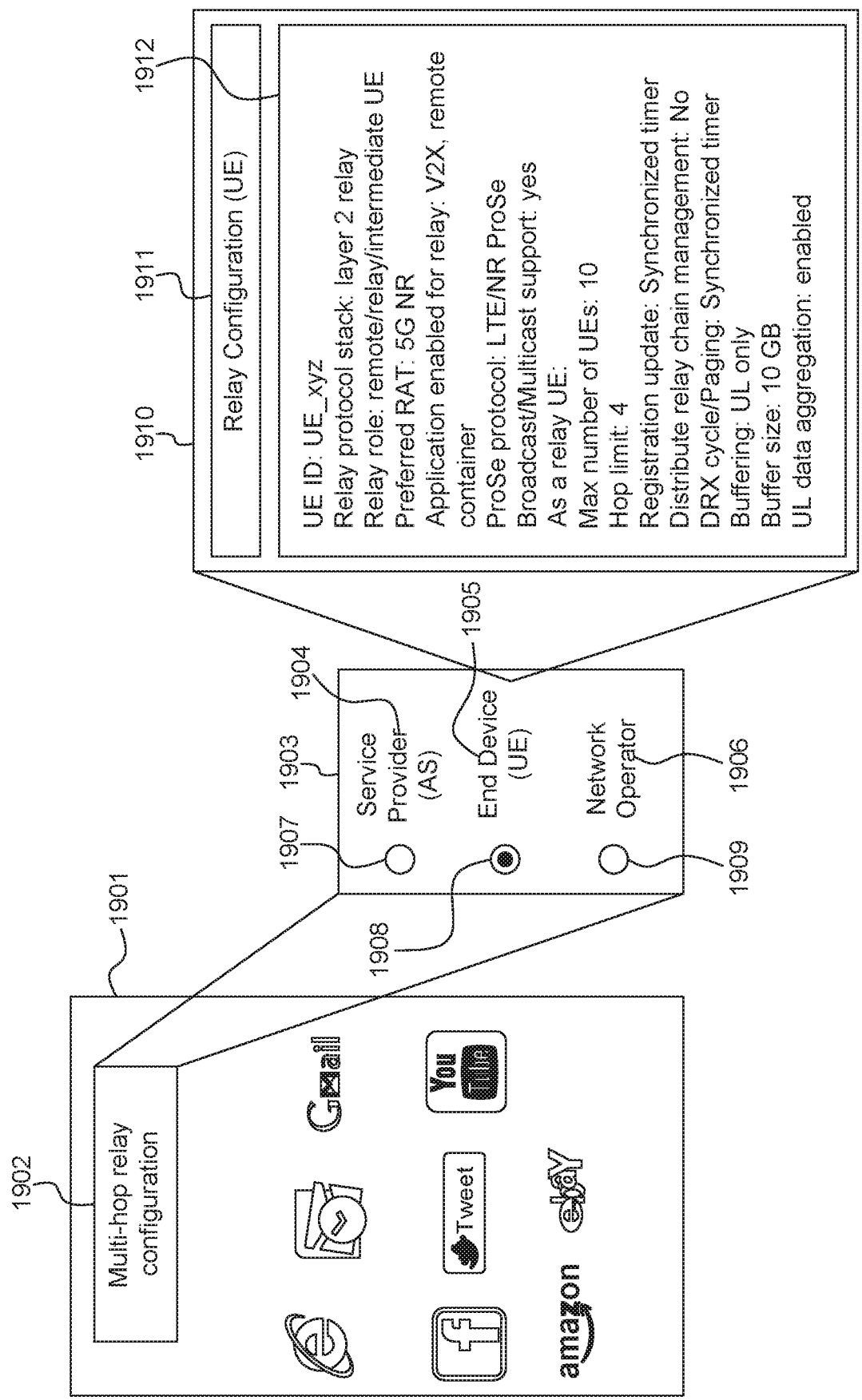
FIG. 19 illustrates an exemplary user interface in accordance with an exemplary embodiment.

FIG. 19 illustrates an exemplary user interface in accordance with an example embodiment. The parameters defined for multi-hop relay configuration can be provisioned by the end user, network operator, or application service provider through a user interface. In addition, the relay UE 701 or network operator could retrieve and display the relay statistics through the user interface 1901. The user interface screen instance 1901 can be presented for configuring or programming those parameters with default values, as well as enabling or disabling relay service. A user may select a multi-hop configuration display screen instance input selection 1902. The selection 1902 can produce a new display screen instance 1903 including user type options including Service Provider option 1904, End Device option 1905, and Network Operator option 1906. Each presented option can be presented with a respective selection input, 1907, 1908, and 1909. Upon receipt of a r3espective selection input, a Relay Configuration screen instance 1910 can be presented. The Screen instance 1910 can include a heading 1911 and details 1912 of configuration.

It will be understood that any of the methods and processes described herein can be embodied in the form of computer executable instructions (i.e., program code) stored on a computer-readable storage medium, and when the instructions are executed by a machine, such as a computer, server, M2M terminal device, M2M gateway device, or the like, perform and/or implement the systems, methods and processes described herein. Specifically, any of the steps, operations or functions described above can be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information, and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or can be acquired from practicing of the disclosure, without departing from the breadth or scope. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within a scope of the invention to produce additional embodiments. Furthermore, certain features can sometimes be used to advantage without a corresponding use of other features. Accordingly, Applicant(s) intend(s) to embrace all such alternatives, modifications, equivalents, and variations that are within the spirit and scope of the disclosed subject matter.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone can be present in an embodiment, B alone can be present in an embodiment, C alone can be present in an embodiment, or that any combination of the elements A, B and C can be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus. A scope of the invention is indicated by the appended claims. Scopes include all embodiments covered by the description. Scopes that cover the meaning and range and equivalence are intended to be embraced therein.

The term "UE" can be interchanged in this specification with the broader term "electronic device" and vice versa, so that applications and functionally enabled by this disclosure can be covered.

In an exemplary embodiment, a method of multi-hop relay chain formation in a wireless communication network includes discovering, via a remote user equipment (UE), one or more other UEs in communication range of the remote UE; selecting one of the discovered UEs as an intermediate UE for communicating in the multi-hop relay chain; after selecting the intermediate UE, transmitting, via the remote UE, a request to join or form a multi-hop relay chain; and joining an existing or forming a new the relay chain by establishing a PC5 link with the remote UE within the wireless communication network.

In an exemplary embodiment, the method further includes discovering an existing multi-hop relay chain and the one or more other UEs; and initiating the PC5 link to join the intermediate UE to the multi-hop relay chain.

In an exemplary embodiment, the method further includes determining whether the remote UE has registered with the network; and in response to a determination that the remote UE is not registered with the network, sending a registration request together with the PC5 link request.

In an exemplary embodiment, the method further includes registering the remote UE with the network; and after registering the remote UE with the network, establishing the PC5 link as a result of the registration.

In an exemplary embodiment, the method further includes after establishing the PC5 link, registering the remote UE with the wireless communication network.

In an exemplary embodiment, a method for registering a user equipment (UE) to enable a multi-hop relay service in a wireless communication network, including transmitting a registration request message to the wireless communication network, the registration request message requesting that the network enable the multi-hop relay service; providing an indication to the network of a role that the UE requests to perform in the multi-hop relay service, the role being one of a remote UE and an intermediate UE; in a condition that the role for the UE is to be the remote UE, transmitting from the UE a first set of predetermined information regarding remote UE characteristics; and in a condition that the role for the UE is to be the intermediate UE, transmitting from the UE a second set of predetermined information regarding intermediate UE characteristics.

In an exemplary embodiment, the method, wherein the transmitting includes transmitting the request message directly or indirectly via another UE.

In an exemplary embodiment, the method, wherein the transmitting the registration request message to the network includes transmitting a policy container in the registration request message.

In an exemplary embodiment, the method including receiving at the UE a multi-hop relay policy via a non-access stratum (NAS) connection.

In an exemplary embodiment, a method of maintaining a multi-hop relay chain in a wireless communication network, including reorganizing the multi-hop relay chain by an intermediate user equipment (UE), the reorganizing including sending a PC5 link establishment message to include at least another intermediate UE in the multi-hop relay chain; and relaying information from a remote UE to a network via the at least another intermediate UE.

In an exemplary embodiment, a method of maintaining a multi-hop relay chain in a wireless communication network, including selecting an alternative user equipment (UE) to replace an existing intermediate UE in providing communications from a remote UE to the wireless communication network via the multi-hop relay chain, the selecting including selecting from remaining UEs in the multi-hop relay chain or UEs that are outside of the multi-hop relay chain, wherein the selecting includes selecting by at least one of a core network, a base station, and the remaining UEs.

In an exemplary embodiment, a method of registration management and connection management in a wireless communication network, including in response to a registration request for a new multi-hop relay chain or for joining an existing multi-hop relay chain, updating connection management and registration management parameters at a core network asset; sending a configuration update to an intermediate user equipment (UE); storing, by the intermediate UE, connection management and registration management parameters; and sending, from the intermediate UE, the connection management and registration management parameters to other UEs in the new or existing multi-hop relay chain.

In an exemplary embodiment, the method, wherein the core network asset hosts an Access and Mobility Management Function (AMF).

The method further including receiving, by the intermediate UE, a multi-hop relay policy; and sending an N2 paging message to a RAN node targeted at one or more UEs in the new or existing multi-hop relay chain.

In an exemplary embodiment, the method, wherein the N2 paging message is a group-based N2 message transfer where only one N2 connection is established between the core network asset and the RAN node for the intermediate UE and all other UEs in the new or existing multi-hop relay chain.

In an exemplary embodiment, the method, wherein the N2 paging message creates one N2 connection for each intermediate UE in the new or existing multi-hop relay chain.

In an exemplary embodiment, the method, wherein the intermediate UE calculates paging occasions of a remote UE and monitors each paging message for the remote UE.

In an exemplary embodiment, a method of multi-hop relay chain formation includes discovering, via a remote UE, one or more other UEs in communication range; selecting one of the discovered UEs as an intermediate UE for communicating in a network; after selecting the intermediate UE, transmitting, via the remote UE, a request to establish a PC5 link; and establishing the PC5 link with the remote UE to join or form a multi-hop relay chain within the network.

In an exemplary embodiment, a User Equipment (UE) (e.g., relay UE) assists a remote UE, which is more remote than the UE with respect to a signal coverage range of a wireless communication network, to have access to a relay service provided by the wireless communication network (e.g., FIG. 13, FIG. 14, FIG. 15, FIG. 16 (FIGS. 16A-16B)). The relay UE can receive (e.g., FIG. 1E: 125a, 125b, 128) a PC5-link-establishment request message from the remote user equipment (e.g., FIG. 13, FIG. 14, FIG. 15, FIG. 16 (FIGS. 16A-16B)). Receipt can occur via a Sidelink interface. The relay UE can determine whether there is a relay chain association for the remote UE including (e.g., FIG. 13, FIG. 14, FIG. 15, FIG. 16 (FIGS. 16A-16B)) by determining whether to accept the remote UE to join a relay chain (e.g., FIG. 13, FIG. 14, FIG. 15) or determining whether to take on the role of a relay UE for the requesting remote UE (e.g., FIG. 16 (FIGS. 16A-16B)]. The relay UE can then transmit, to the remote UE, a PC5-link-establishment response message based upon the relay chain association determination.

In an exemplary embodiment, the relay UE can transmit, to the wireless communication network, a join-relay-chain request message, wherein the join-relay-chain request message includes a registration request message (e.g., FIG. 13) requesting the network enable a multi-hop relay service for the remote UE. The relay UE can provide an indication to the wireless communication network of a role the UE requests to perform in the multi-hop relay service, the role being a remote UE role or relay UE role. The relay UE can determine whether to accept the remote UE to join the relay chain and then establish a PC-5 link with the remote UE. The relay UE can receive a join-relay-chain response from the wireless communication network via a non-access stratum (NAS) connection.

In an exemplary embodiment, when the relay UE determines whether there is a relay chain association for the remote UE, the relay UE can (e.g., FIG. 13, FIG. 14, FIG. 15, FIG. 16 (FIGS. 16A-16B)) determine, by its control circuitry, whether to accept the remote UE to join the relay chain (e.g., FIG. 13, FIG. 14, FIG. 15). In this case, the PC5-link-establishment request message can include an encapsulated join-relay-chain request indicating a request to join the relay chain that is an existing relay chain that was existing prior to the receiving the PC5-link-establishment request message and the existing relay chain was discovered by the remote UE, (e.g., FIG. 10 or FIG. 11). The PC5-link-establishment request message can include a relay chain ID indicating the existing relay chain. The PC5-link-establishment request message can include an encapsulated network registration request indicating a layer 2 ID for the remote UE (e.g., FIG. 13, FIG. 14).

In an exemplary embodiment, the PC5-link-establishment request message can include a relay policy ID, a relay UE ID, an application ID or an application service provider ID, and a Data Network Name (DNN). (FIG. 13, FIG. 14).

In an exemplary embodiment, determining whether to accept the remote UE to join the relay chain includes considering any one or more of: a relay capability, a relaying load status of an existing relay chain, a configuration of a relay policy, a power consumption, having operational characteristics aligned with remote UE, a security requirement. (e.g., 184-189, FIG. 13, FIG. 14).

In an exemplary embodiment, the relay UE can set up a paging procedure for UEs which are part of the existing relay chain including sending a page message to one or more UEs that is unreachable in the multi-hop relay chain including messaging across an N2 interface (e.g., FIG. 2-3).

In an exemplary embodiment, the relay UE can receive a registration update message from the remote UE and forward the registration update message to network on behalf of the remote UE, and receive a registration update response from network, and report a registration update status to UEs in the relay chain.

In an exemplary embodiment, determining whether there is a relay chain association for the remote UE includes transmitting information indicated in the PC5-link-establishment request message directly to a network node of the wireless communication network, and the relay service can be a 1-hop relay service or a multi-hop relay service (e.g., FIG. 13, FIG. 14, FIG. 15, FIG. 16 (FIGS. 16A-16B)). In the case where there are intermediate UEs in the relay chain, the relay service can be designated as being a multi-hop relay service.

In an exemplary embodiment, determining whether there is a relay chain association for the remote UE includes transmitting information indicated in the PC5-link-establishment request message indirectly, via another UE, to network node circuitry of the wireless communication network, and the relay service is a multi-hop relay service (e.g., FIG. 13, FIG. 14, FIG. 15, FIG. 16 (FIGS. 16A-16B)).

In an exemplary embodiment, the relay UE can send a notification message indicating updated relay chain status information.

In an exemplary embodiment, determining whether there is a relay chain association for the remote UE includes (e.g., FIG. 13, FIG. 14, FIG. 15, FIG. 16 (FIGS. 16A-16B)) a network assisted relay chain formation procedure (e.g., FIG. 16 (FIGS. 16A-16B)) or distributed relay chain formation procedure (e.g., FIG. 13, FIG. 14, FIG. 15).

In an exemplary embodiment, a network node of a wireless communication network can perform a method including communicating with a relay UE or an intermediate UE to assist a remote UE, which is more remote than the UE with respect to a signal coverage range of the wireless communication network, to have access to a relay service that enables access to other services provided by the wireless communication network (e.g., FIG. 13, FIG. 14, FIG. 15, FIG. 16 (FIGS. 16A-16B)). The method further includes receiving a registration request message with information that originated from a PC5-link-establishment request message transmitted by the remote UE, the registration request message including remote UE new chain information for a request to establish a new relay chain (e.g., FIG. 16 (FIGS. 16A-16B)) for use by the remote UE, and remote UE registration information to request to register the remote UE with the wireless communication network. The method further includes processing a registration procedure for the remote UE based on the remote UE registration information, and processing a new relay chain formation procedure for the remote UE based on the remote UE new chain information, including obtaining a relay chain configuration including information identifying a role for the UE and the remote UE, and obtaining service application information for the new relay chain. The method further includes transmitting the relay chain configuration information, to the UE, including an accepted role for the UE and the remote UE including a multi-hop relay policy obtained via a non-access stratum (NAS) connection (e.g., FIG. 16 (FIGS. 16A-16B)).

In an exemplary embodiment, the remote UE registration information can include a relay UE ID and a relay UE capability and a requested relay policy ID (e.g., FIG. 16 (FIGS. 16A-16B)) and determining whether to accept the remote UE into the relay chain can include obtaining any one or more of: load information for the relay chain, current and projected future traffic of the UEs in the relay chain, or mobility patterns of the UEs in the relay chain (e.g., FIG. 16 (FIGS. 16A-16B)).

In an exemplary embodiment, a network node can send a notification message indicating updated relay chain status information (e.g., FIG. 17).

In an exemplary embodiment, a remote UE, which is more remote than a potential relay UE with respect to a signal coverage range of a wireless communication network, can perform a method to gain access to a relay service provided by the wireless communication network (e.g., FIG. 13, FIG. 14, FIG. 15, FIG. 16 (FIGS. 16A-16B)), the method including discovering one or more potential relay UEs capable of providing access to a relay chain service (e.g., FIG. 10, FIG. 11). The method can include selecting one of the one or more potential relay UEs as a target relay UE. The method can include transmitting a join-relay-chain request message to the target relay UE. The method can include receiving a join-relay-chain response from the target relay UE that originates from wireless communication network via a non-access stratum (NAS) connection.

In an exemplary embodiment, the method can include establishing a connection to the relay chain via the target relay UE connecting to a node in the wireless communication network, wherein the join-relay chain response message includes any or more of: a relay chain ID, a relay policy ID, a remote role indication for the remote UE.

In an exemplary embodiment, the method can include when none of the one or more potential relay UEs are part of an existing relay chain, the join-relay-chain request message can include a request for a new relay chain (e.g., FIG. 17, FIG. 18).

In an exemplary embodiment, the join-relay chain response message cam include a relay policy originating from a (PCF) node across a non-access stratum (NAS) connection.

In an exemplary embodiment, the method can include triggering a PC5 link establishment between the remote UE and the target relay UE and triggering a registration procedure for the remote UE, by the transmitting the join-relay-chain request message.

What is claimed is:
1. A method comprising:
  receiving a PC5-link-establishment request message from a remote electronic device;
  determining whether there is a relay chain association for the remote electronic device comprising:

determining whether to accept the remote electronic device to join a relay chain or determining whether to take on a role of a relay electronic device for the remote electronic device;

transmitting, to the remote electronic device, a PC5-link-establishment response message based upon the relay chain association determination;

transmitting, to a wireless communication network, a join-relay-chain request message, wherein the join-relay-chain request message comprises a registration request message requesting the wireless communication network enable a multi-hop relay service;

providing an indication to the wireless communication network of a role that the electronic device requests to perform in the multi-hop relay service, the role being a remote electronic device role or a relay electronic device role;

determining whether to accept the remote electronic device to join the relay chain;

establishing a PC-5 link with the remote electronic device; and receiving a join-relay-chain response from the wireless communication network via a non-access stratum (NAS) connection.

2. The method of claim 1, wherein the determining whether there is the relay chain association for the remote electronic device comprises determining whether to accept the remote electronic device to join the relay chain; and
wherein the PC5-link-establishment request message comprises:
an encapsulated join-relay-chain request indicating a request to join the relay chain that is an existing relay chain that was existing prior to the receiving the PC5-link-establishment request message and the existing relay chain was discovered by the remote electronic device,
a relay chain ID indicating the existing relay chain, and
an encapsulated network registration request indicating a layer 2 ID for the remote electronic device.

3. The method of claim 1, wherein the PC5-link-establishment request message comprises:
a relay policy ID, a relay electronic device ID, an application ID or an application service provider ID, and a Data Network Name (DNN).

4. The method of claim 1, wherein the determining whether to accept the remote electronic device to join the relay chain comprises considering any one or more of:
a relay capability,
a relaying load status of an existing relay chain,
a configuration of a relay policy,
a power consumption,
having operational characteristics aligned with remote electronic device,
a security requirement.

5. The method of claim 1, further comprising:
setting up a paging procedure for electronic devices which are part of the existing relay chain including sending a page message to one or more electronic devices that is unreachable in the multi-hop relay chain including messaging across an N2 interface.

6. The method of claim 1, further comprising:
receiving a registration update message from the remote electronic device;
forwarding the registration update message to the wireless communication network on behalf of the remote electronic device,
receiving a registration update response from the wireless communication network, and
reporting a registration update status to electronic devices in the relay chain.

7. The method of claim 1, wherein the determining whether there is the relay chain association for the remote electronic device comprises transmitting information indicated in the PC5-link-establishment request message directly to a network node of the wireless communication network, and a relay service is a 1-hop relay service or a multi-hop relay service.

8. The method of claim 1, wherein the determining whether there is the relay chain association for the remote electronic device comprises transmitting information indicated in the PC5-link-establishment request message indirectly, via another electronic device, to network node circuitry of the wireless communication network, and a relay service is a multi-hop relay service.

9. The method of claim 1, further comprising:
sending a notification message indicating updated relay chain status information.

10. The method of claim 1, wherein the determining whether there is the relay chain association for the remote electronic device comprises a network assisted relay chain formation procedure or distributed relay chain formation procedure.

11. A method performed by a remote electronic device, which is more remote than a potential relay electronic device with respect to a signal coverage range of a wireless communication network, to gain access to a relay service provided by the wireless communication network, the method comprising:
discovering one or more potential relay electronic devices capable of providing access to a relay chain service;
selecting one of the one or more potential relay electronic devices as a target relay electronic device;
transmitting a join-relay-chain request message to the target relay electronic device;
receiving a join-relay-chain response from the target relay electronic device with information that originated from the wireless communication network via a non-access stratum (NAS) connection; and
establishing a connection to the relay chain via the target relay electronic device connecting to a node in the wireless communication network;
wherein the join-relay chain response message comprises any or more of:
a relay chain ID,
a relay policy ID,
a remote role indication for the remote electronic device.

12. The method of claim 11, further comprising:
when none of the one or more potential relay electronic devices are part of an existing relay chain, the join-relay-chain request message comprises a request for a new relay chain.

13. The method of claim 11, wherein the join-relay chain response message comprises a relay policy originating from a (PCF) node across a non-access stratum (NAS) connection.

14. The method of claim 11, further comprising:
triggering a PC5 link establishment between the remote electronic device and the target relay electronic device and triggering a registration procedure for the remote electronic device, by the transmitting the join-relay-chain request message.

15. A wireless transmit/receive unit (WTRU) comprising a processor configured to:

receive a PC5-link-establishment request message from a remote electronic device;

determine whether there is a relay chain association for the remote electronic device, wherein the WTRU is further configured to determine whether to accept the remote electronic device to join a relay chain or determine whether to take on a role of a relay electronic device for the remote electronic device;

transmit, to the remote electronic device, a PC5-link-establishment response message based upon the relay chain association determination;

transmit, to a wireless communication network, a join-relay-chain request message, wherein the join-relay-chain request message comprises a registration request message requesting the wireless communication network enable a multi-hop relay service;

provide an indication to the wireless communication network of a role that the electronic device requests to perform in the multi-hop relay service, the role being a remote electronic device role or a relay electronic device role;

determine whether to accept the remote electronic device to join the relay chain;

establish a PC-5 link with the remote electronic device; and receive a join-relay-chain response from the wireless communication network via a non-access stratum (NAS) connection.

16. The WTRU of claim 15, wherein the determination on whether there is the relay chain association for the remote electronic device comprises determination on whether to accept the remote electronic device to join the relay chain; and wherein the PC5-link-establishment request message comprises:

an encapsulated join-relay-chain request indicating a request to join the relay chain that is an existing relay chain that was existing prior to the receiving the PC5-link-establishment request message and the existing relay chain was discovered by the remote electronic device, a relay chain ID indicating the existing relay chain, and an encapsulated network registration request indicating a layer 2 ID for the remote electronic device.

17. The WTRU of claim 15, wherein the PC5-link-establishment request message comprises:

a relay policy ID, a relay electronic device ID, an application ID or an application service provider ID, and a Data Network Name (DNN).

18. The WTRU of claim 15, wherein the determination on whether to accept the remote electronic device to join the relay chain comprises considering any one or more of:

a relay capability, a relaying load status of an existing relay chain, a configuration of a relay policy, a power consumption, having operational characteristics aligned with remote electronic device, a security requirement.

19. The WTRU of claim 15, wherein the WTRU is further configured to:

set up a paging procedure for electronic devices which are part of the existing relay chain including sending a page message to one or more electronic devices that is unreachable in the multi-hop relay chain including messaging across an N2 interface.

20. The WTRU of claim 15, wherein the WTRU is further configured to:

receive a registration update message from the remote electronic device;

forward the registration update message to the wireless communication network on behalf of the remote electronic device;

receive a registration update response from the wireless communication network; and report a registration update status to electronic devices in the relay chain.

\* \* \* \* \*